US012766498B2

(12) United States Patent
Findlater et al.

(10) Patent No.: US 12,766,498 B2
(45) Date of Patent: Oct. 20, 2026

(54) PLATFORM FOR THE RECOVERY OF TRANSITION METAL CATALYSTS

(71) Applicant: Texas Tech University System, Lubbock, TX (US)

(72) Inventors: Michael Findlater, Merced, CA (US); Guigen Li, Lubbock, TX (US)

(73) Assignee: Texas Tech University System, Lubbock, TX (US)

(*) Notice: Subject to any disclaimer, the term of this patent is extended or adjusted under 35 U.S.C. 154(b) by 739 days.

(21) Appl. No.: 18/161,048

(22) Filed: Jan. 28, 2023

(65) Prior Publication Data

US 2023/0241597 A1 Aug. 3, 2023

Related U.S. Application Data

(60) Provisional application No. 63/304,119, filed on Jan. 28, 2022.

(51) Int. Cl.
*B01J 38/68* (2006.01)

(52) U.S. Cl.
CPC .................................... *B01J 38/68* (2013.01)

(58) Field of Classification Search
CPC .... B01J 31/4015; B01J 31/4038; B01J 38/68; B01J 2531/028; B01J 2540/50; B01J 2540/68; Y02P 20/584
See application file for complete search history.

(56) References Cited

PUBLICATIONS

Wu G, Liu Y, Yang Z, Katakam N, Rouh H, Ahmed S, Unruh D, Surowiec K, Li G. Multilayer 3D Chirality and Its Synthetic Assembly. Research (Wash D C). Jun. 27, 2019; 2019:6717104. doi: 10.34133/2019/6717104. PMID: 31549078; PMCID: PMC6750085. (Year: 2019).*

Afewerki, Samson, et al. "Sustainable and recyclable heterogenous palladium catalysts from rice husk-derived biosilicates for Suzuki-Miyaura cross-couplings, aerobic oxidations and stereoselective cascade carbocyclizations." Scientific Reports 10.1 (2020): 6407.

(Continued)

*Primary Examiner* — Brian A Mccaig

(74) *Attorney, Agent, or Firm* — Edwin S. Flores; Daniel J. Chalker; Chalker Flores, LLP

(57) ABSTRACT

The present invention includes compositions and methods of using a molecule of Formula I:

Formula I

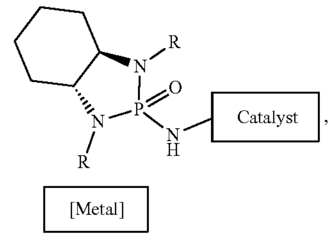

wherein R is selected from methyl, ethyl, propyl, isopropyl, butyl, phenyl, cyclohexyl, fluoro, chloro, methoxy, ethoxy, butoxy, phenoxy, aryl, alkene, alkyne, and heterocyclic. The molecule of Formula I is a ligand until a metal is added, at which time the molecule is a catalyst.

22 Claims, 5 Drawing Sheets

(56) References Cited

PUBLICATIONS

Ai, Teng, and Guigen Li. "Chiral N-phosphonyl imine chemistry: Asymmetric synthesis of α, ß-diamino esters by reacting phosphonyl imines with glycine enolates." Bioorganic & medicinal chemistry letters 19.14 (2009): 3967-3969.
Almond-Thynne, Joshua, et al. "Site-selective Suzuki-Miyaura coupling of heteroaryl halides-understanding the trends for pharmaceutically important classes." Chemical science 8.1 (2017): 40-62.
An, Guanghui, Cole Seifert, and Guigen Li. "N-Phosphonyl/phosphinyl imines and group-assisted purification (GAP) chemistry/technology." Organic & biomolecular chemistry 13.6 (2015): 1600-1617.
Atienza, Crisita Carmen Hojilla, et al. "Bis (imino) pyridine cobalt-catalyzed dehydrogenative silylation of alkenes: scope, mechanism, and origins of selective allylsilane formation." Journal of the American Chemical Society 136.34 (2014): 12108-12118.
Atzrodt, Jens, et al. "C—H functionalisation for hydrogen isotope exchange." Angewandte Chemie International Edition 57.12 (2018): 3022-3047.
Atzrodt, Jens, et al. "Deuterium-and tritium-labelled compounds: applications in the life sciences." Angewandte chemie international edition 57.7 (2018): 1758-1784.
Barder, Timothy E., and Stephen L. Buchwald. "Insights into amine binding to biaryl phosphine palladium oxidative addition complexes and reductive elimination from biaryl phosphine arylpalladium amido complexes via density functional theory." Journal of the American Chemical Society 129.39 (2007): 12003-12010.
Bart, Suzanne C., Emil Lobkovsky, and Paul J. Chirik. "Preparation and molecular and electronic structures of iron (0) dinitrogen and silane complexes and their application to catalytic hydrogenation and hydrosilation." Journal of the American Chemical Society 126.42 (2004): 13794-13807.
Bernardis, Francesco L., Richard A. Grant, and David C. Sherrington. "A review of methods of separation of the platinum-group metals through their chloro-complexes." Reactive and Functional Polymers 65.3 (2005): 205-217.
Bhat, Shrikanth, et al. "Ligand-free Suzuki coupling reaction with highly recyclable ionic palladium catalyst, Ti1-xPdxO2-x (x= 0.03)." Applied Catalysis A: General 596 (2020): 117516.
Bulatov, Evgeny, et al. "3D Printed Palladium Catalyst for Suzuki-Miyaura Cross-coupling Reactions." ChemCatChem 12.19 (2020): 4831-4838.
Byrne, Fergal P., et al. "Tools and techniques for solvent selection: green solvent selection guides." Sustainable Chemical Processes 4 (2016): 1-24.
Calo, Vincenzo, et al. "Pd nanoparticles as efficient catalysts for Suzuki and Stille coupling reactions of aryl halides in ionic liquids." The Journal of Organic Chemistry 70.15 (2005): 6040-6044.
Cetin, M. Mustafa, et al. "Characterization and photocatalytic behavior of 2, 9-di (aryl)-1, 10-phenanthroline copper (i) complexes." Dalton Transactions 46.20 (2017): 6553-6569.
Charbonneau, Mathieu, et al. "Support-Free Palladium-NHC Catalyst for Highly Recyclable Heterogeneous Suzuki-Miyaura Coupling in Neat Water." Organometallics 33.22 (2014): 6544-6549.
Chen, Chi, et al. "Rapid, regioconvergent, solvent-free alkene hydrosilylation with a cobalt catalyst." Journal of the American Chemical Society 137.41 (2015): 13244-13247.
Chen, Chi, et al. "Z-selective alkene isomerization by high-spin cobalt (II) complexes." Journal of the American Chemical Society 136.3 (2014): 945-955.
Chen, Jianhui, et al. "Iron-Catalyzed Asymmetric Hydrosilylation of 1, 1-Disubstituted Alkenes." Angewandte Chemie International Edition 54.15 (2015): 4661-4664.
Cheng, Biao, et al. "Highly enantioselective cobalt-catalyzed hydrosilylation of alkenes." Journal of the American Chemical Society 139.28 (2017): 9439-9442.
Chidara, Vamshi K., and Guodong Du. "An efficient catalyst based on manganese salen for hydrosilylation of carbonyl compounds." Organometallics 32.18 (2013): 5034-5037.
Chiu, Chiao-Fan, et al. "Short-Chained Platinum Complex Catalyzed Hydrosilylation under Thermomorphic Conditions: Heterogeneous Phase Separation at Ice Temperature." Molecules 26.2 (2021): 378.
Clark, James H., and Duncan J. Macquarrie. "Heterogeneous catalysis in liquid phase transformations of importance in the industrial preparation of fine chemicals." Organic Process Research & Development 1.2 (1997): 149-162.
Clark, Joseph R., Justin R. Griffiths, and Steven T. Diver. "Ruthenium hydride-promoted dienyl isomerization: access to highly substituted 1, 3-dienes." Journal of the American Chemical Society 135.9 (2013): 3327-3330.
Cole-Hamilton, David J. "Homogeneous catalysis—new approaches to catalyst separation, recovery, and recycling." Science 299.5613 (2003): 1702-1706.
Cramer, Richard, and R. V. Lindsey Jr. "The mechanism of isomerization of olefins with transition metal catalysts." Journal of the American Chemical Society 88.15 (1966): 3534-3544.
Crossley, Steven WM, et al. "Mn-, Fe-, and Co-catalyzed radical hydrofunctionalizations of olefins." Chemical reviews 116.15 (2016): 8912-9000.
Crossley, Steven WM, Francis Barabé, and Ryan A. Shenvi. "Simple, chemoselective, catalytic olefin isomerization." Journal of the American Chemical Society 136.48 (2014): 16788-16791.
Denmark, Scott E., and Jack Amburgey. "A new, general, and stereoselective method for the synthesis of trisubstituted alkenes." Journal of the American Chemical Society 115.22 (1993): 10386-10387.
Dinh, Long V., and J. A. Gladysz. ""Catalyst-on-a-tape"—teflon: A new delivery and recovery method for homogeneous fluorous catalysts." Angewandte Chemie International Edition 44.26 (2005): 4095-4097.
Dioumaev, Vladimir K., and R. Morris Bullock. "A recyclable catalyst that precipitates at the end of the reaction." Nature 424.6948 (2003): 530-532.
Docherty, Jamie H., et al. "Activation and discovery of earth-abundant metal catalysts using sodium tert-butoxide." Nature Chemistry 9.6 (2017): 595-600.
Doherty, Nancy M., and John E. Bercaw. "Kinetics and mechanism of the insertion of olefins into transition metal-hydride bonds." Journal of the American Chemical Society 107.9 (1985): 2670-2682.
Dong, Haigang, et al. "Recovery of platinum group metals from spent catalysts: a review." International Journal of Mineral Processing 145 (2015): 108-113.
Donohoe, Timothy J., Timothy JC O'Riordan, and Carla P. Rosa. "Ruthenium-Catalyzed Isomerization of Terminal Olefins: Applications to Synthesis." Angewandte Chemie International Edition 48.6 (2009): 1014-1017.
Du, Xiaoyong, and Zheng Huang. "Advances in base-metal-catalyzed alkene hydrosilylation." ACS Catalysis 7.2 (2017): 1227-1243.
Du, Xiaoyong, et al. "Base-Metal-Catalyzed Regiodivergent Alkene Hydrosilylations." Angewandte Chemie International Edition 55.23 (2016): 6671-6675.
Egorova, Ksenia S., and Valentine P. Ananikov. "Toxicity of metal compounds: knowledge and myths." Organometallics 36.21 (2017): 4071-4090.
Erdogan, Gulin, and Douglas B. Grotjahn. "Mild and selective deuteration and isomerization of alkenes by a bifunctional catalyst and deuterium oxide." Journal of the American Chemical Society 131.30 (2009): 10354-10355.
Flynn, Alison B., and William W. Ogilvie. "Stereocontrolled synthesis of tetrasubstituted olefins." Chemical reviews 107.11 (2007): 4698-4745.
Gallagher, Kimberley J., and Ruth L. Webster. "Room temperature hydrophosphination using a simple iron salen pre- catalyst." Chemical Communications 50.81 (2014): 12109-12111.
Gallagher, Kimberley J., et al. "A Study of Two Highly Active, Air-Stable Iron (III)-μ-Oxo Precatalysts: Synthetic Scope of

(56) References Cited

PUBLICATIONS

Hydrophosphination using Phenyl-and Diphenylphosphine." Advanced Synthesis & Catalysis 358.15 (2016): 2460-2468.
Gauthier, Delphine, et al. "In situ generated bulky palladium hydride complexes as catalysts for the efficient isomerization of olefins. Selective transformation of terminal alkenes to 2-alkenes." Journal of the American Chemical Society 132.23 (2010): 7998-8009.
Genkin, A. D., and T. L. Evstigneeva. "Associations of platinum-group minerals of the Noril'sk copper-nickel sulfide ores." Economic Geology 81.5 (1986): 1203-1212.
Ghorbani-Vaghei, Ramin, Narges Sarmast, and Farid Rahmatpour. "Immobilization of palladium nanoparticles as a recyclable heterogeneous catalyst for the Suzuki-Miyaura coupling reaction." Comptes Rendus Chimie 21.7 (2018): 644-651.
Gladysz, John A. "Introduction: Recoverable catalysts and reagents perspective and prospective." Chemical Reviews 102.10 (2002): 3215-3216.
Gladysz, John A. "Recoverable catalysts. Ultimate goals, criteria of evaluation, and the green chemistry interface." Pure and Applied Chemistry 73.8 (2001): 1319-1324.
Green, Samantha A., et al. "The high chemofidelity of metal-catalyzed hydrogen atom transfer." Accounts of chemical research 51.11 (2018): 2628-2640.
Grimme, Stefan, et al. "A consistent and accurate ab initio parametrization of density functional dispersion correction (DFT-D) for the 94 elements H-Pu." The Journal of chemical physics 132.15 (2010): 154104.
Grimme, Stefan, Stephan Ehrlich, and Lars Goerigk. "Effect of the damping function in dispersion corrected density functional theory." Journal of computational chemistry 32.7 (2011): 1456-1465.
Grotjahn, Douglas B., et al. "Extensive isomerization of alkenes using a bifunctional catalyst: an alkene zipper." Journal of the American Chemical Society 129.31 (2007): 9592-9593.
Han, Jianlin, et al. "Chiral N-phosphonyl imine chemistry: asymmetric additions of ester enolates for the synthesis of ß-amino acids." Chemical biology & drug design 72.2 (2008): 120-126.
Hassam, Mohammad, et al. "Isomerization of allylbenzenes." Chemical reviews 115.11 (2015): 5462-5569.
Hassan, Jwanro, et al. "Aryl—aryl bond formation one century after the discovery of the Ullmann reaction." Chemical reviews 102.5 (2002): 1359-1470.
Hilt, Gerhard. "Double Bond Isomerisation and Migration—New Playgrounds for Transition Metal-Catalysis." ChemCatChem 6.9 (2014): 2484-2485.
Holland, Patrick L. "Distinctive reaction pathways at base metals in high-spin organometallic catalysts." Accounts of Chemical Research 48.6 (2015): 1696-1702.
Holwell, Andrew J. "Global release liner industry conference 2008." Platinum Metals Review 52.4 (2008): 243-246.
Hooshmand, Seyyed Emad, et al. "Recent advances in the Suzuki-Miyaura cross-coupling reaction using efficient catalysts in eco-friendly media." Green Chemistry 21.3 (2019): 381-405.
Hu, Meng-Yang, et al. "Ligands with 1, 10-phenanthroline scaffold for highly regioselective iron-catalyzed alkene hydrosilylation." Nature Communications 9.1 (2018): 221.
Huang, Rui-Zhi, et al. "Rhodium-catalyzed enantioconvergent isomerization of homoallylic and bishomoallylic secondary alcohols." Journal of the American Chemical Society 140.44 (2018): 14647-14654.
Itami, Kenichiro, and Jun-ichi Yoshida. "Multisubstituted olefins: platform synthesis and applications to materials science and pharmaceutical chemistry." Bulletin of the Chemical Society of Japan 79.6 (2006): 811-824.
Jacks, Thomas E., et al. "Development of a scalable process for CI-1034, an endothelin antagonist." Organic process research & development 8.2 (2004): 201-212.
Jeon, Young-Kyo, et al. "Highly Selective Room-Temperature Suzuki-Miyaura Coupling of Bromo-2-sulfonyloxypyridines for Unsymmetrical Diarylpyridines." The Journal of Organic Chemistry 85.11 (2020): 7399-7412.
Jo, Junyong, et al. "Metal speciation in pharmaceutical process development: case studies and process/analytical challenges for a palladium-catalyzed cross-coupling reaction." Organometallics 38.1 (2018): 185-193.
Jordan, V. Craig. "Antiestrogens and selective estrogen receptor modulators as multifunctional medicines. 2. Clinical considerations and new agents." Journal of medicinal chemistry 46.7 (2003): 1081-1111.
Kattuboina, Adiseshu, and Guigen Li. "Chiral N-phosphonyl imine chemistry: new reagents and their applications for asymmetric reactions." Tetrahedron Letters 49.10 (2008): 1573-1577.
Kattuboina, Adiseshu, et al. "Chiral N-phosphonyl imine chemistry: asymmetric 1, 2-additions of allylmagnesium bromides." Tetrahedron Letters 49.23 (2008): 3722-3724.
Kattuboina, Adiseshu, et al. "Chiral N-phosphonyl imine chemistry: asymmetric aza-Henry reaction." Chemical biology & drug design 71.3 (2008): 216-223.
Kaur, Parminder, et al. "Asymmetric catalytic N-phosphonyl imine chemistry: The use of primary free amino acids and Et2AICN for asymmetric catalytic Strecker reaction." The Journal of organic chemistry 75.15 (2010): 5144-5150.
Kaur, Parminder, et al. "Asymmetric catalytic Strecker reaction of N-phosphonyl imines with Et2AICN using amino alcohols and BINOLs as catalysts." Chemical Communications 46.24 (2010): 4330-4332.
Kaur, Parminder, et al. "Asymmetric Hydrophosphylation of Chiral N-Phosphonyl Imines Provides an Efficient Approach to Chiral α-Amino Phosphonates." Chemical biology & drug design 76.4 (2010): 314-319.
Kaur, Parminder, et al. "Chiral N-phosphonyl imine chemistry: an efficient asymmetric synthesis of chiral N-phosphonyl propargylamines." Organic & biomolecular chemistry 8.5 (2010): 1091-1096.
Kaur, Parminder, et al. "The GAP chemistry for chiral N-phosphonyl imine-based Strecker reaction." Green chemistry 13.5 (2011): 1288-1292.
Kaur, Parminder, Thao Nguyen, and Guigen Li. "Chiral N-Phosphonylimine Chemistry: Asymmetric Synthesis of N-Phosphonyl B-Amino Weinreb Amides." European Journal of Organic Chemistry 2009 (6): 912-916.
Kiani, Mahsa, et al. "Catalytic and antibacterial properties of 3-dentate carboxamide Pd/Pt complexes obtained via a benign route." Applied Organometallic Chemistry 34.4 (2020): e5531.
Kohn, W. "SLJ (1965) Self-Consistent Equations Including Exchange and Correlation Effects." Physical Review A 140: 1133.
Kragl, Udo, and Torsten Dwars. "The development of new methods for the recycling of chiral catalysts." Trends in Biotechnology 19.11 (2001): 442-449.
Krompiec, S., et al. "Double bond migration in N-allylic systems catalyzed by transition metal complexes." Coordination Chemistry Reviews 252.15-17 (2008): 1819-1841.
Kumar, Satyendra, et al. "Efficient catalytic activation of Suzuki-Miyaura C—C coupling reactions with recyclable palladium nanoparticles tailored with sterically demanding di-n-alkyl sulfides." RSC Advances 5.26 (2015): 20081-20089.
Kuuloja, Noora, et al. "Synthesis of Xenbucin using Suzuki reaction catalyzed by Pd/C in water." Open Chemistry 6.3 (2008): 390-392.
Kwon, Tae Hui, et al. "Recyclable palladium-graphene nanocomposite catalysts containing ionic polymers: efficient Suzuki coupling reactions." RSC advances 7.19 (2017): 11684-11690.
Larionov, Evgeny, et al. "Scope and mechanism in palladium-catalyzed isomerizations of highly substituted allylic, homoallylic, and alkenyl alcohols." Journal of the American Chemical Society 136.48 (2014): 16882-16894.
Larionov, Evgeny, Houhua Li, and Clément Mazet. "Well-defined transition metal hydrides in catalytic isomerizations." Chemical Communications 50.69 (2014): 9816-9826.
Larsen, Casey R., and Douglas B. Grotjahn. "Stereoselective alkene isomerization over one position." Journal of the American Chemical Society 134.25 (2012): 10357-10360.
Larsen, Casey R., Gulin Erdogan, and Douglas B. Grotjahn. "General catalyst control of the monoisomerization of 1-alkenes to trans-2-alkenes." Journal of the American Chemical Society 136.4 (2014): 1226-1229.

(56) References Cited

PUBLICATIONS

Larson, Patrick J., et al. "Synthesis, characterization, electrochemical properties and theoretical calculations of (BIAN) iron complexes." Polyhedron 159 (2019): 365-374.
Lenthe, E. van, Evert-Jan Baerends, and Jaap G. Snijders. "Relativistic regular two-component Hamiltonians." The Journal of chemical physics 99.6 (1993): 4597-4610.
Li, Gang, et al. "Radical isomerization and cycloisomerization initiated by H• transfer." Journal of the American Chemical Society 138.24 (2016): 7698-7704.
Lim, Hwan Jung, Craig R. Smith, and T. V. RajanBabu. "Facile Pd (II)-and Ni (II)-catalyzed isomerization of terminal alkenes into 2-alkenes." The Journal of organic chemistry 74.12 (2009): 4565-4572.
Lin, Luqing, Ciro Romano, and Clement Mazet. "Palladium-catalyzed long-range deconjugative isomerization of highly substituted α, ß-unsaturated carbonyl compounds." Journal of the American Chemical Society 138.32 (2016): 10344-10350.
Liu, Xufang, Bin Li, and Qiang Liu. "Base-metal-catalyzed olefin isomerization reactions." Synthesis 51.06 (2019): 1293-1310.
Liu, Xufang, et al. "Cobalt-catalyzed regioselective olefin isomerization under kinetic control." Journal of the American Chemical Society 140.22 (2018): 6873-6882.
Lukin, Ruslan Yu, et al. "Platinum-catalyzed hydrosilylation in polymer chemistry." Polymers 12.10 (2020): 2174.
Magano, Javier, and Joshua R. Dunetz. "Large-scale applications of transition metal-catalyzed couplings for the synthesis of pharmaceuticals." Chemical Reviews 111.3 (2011): 2177-2250.
Manikandan, Rajendran, and Masilamani Jeganmohan. "Recent advances in the ruthenium-catalyzed hydroarylation of alkynes with aromatics: synthesis of trisubstituted alkenes." Organic & Biomolecular Chemistry 13.42 (2015): 10420-10436.
Marciniec, Bogdan. "Catalysis by transition metal complexes of alkene silylation-recent progress and mechanistic implications." Coordination Chemistry Reviews 249.21-22 (2005): 2374-2390.
Wekesa, Francis S., et al. "Iron-catalyzed hydrosilylation of aldehydes and ketones under solvent-free conditions." Organometallics 34.20 (2015): 5051-5056.
Whitaker, Luke, Hassan Y. Harb, and Alexander P. Pulis. "One-pot borylation/Suzuki-Miyaura sp 2—sp 3 cross-coupling." Chemical Communications 53.67 (2017): 9364-9367.
Widenhoefer, Ross A., and Stephen L. Buchwald. "Formation of palladium bis (amine) complexes from reaction of amine with palladium tris (o-tolyl) phosphine mono (amine) complexes." Organometallics 15.16 (1996): 3534-3542.
Widenhoefer, Ross A., and Stephen L. Buchwald. "Halide and amine influence in the equilibrium formation of palladium tris (o-tolyl) phosphine mono (amine) complexes from palladium aryl halide dimers." Organometallics 15.12 (1996): 2755-2763.
Wu, Jessica Y., Benjamin N. Stanzl, and Tobias Ritter. "A strategy for the synthesis of well-defined iron catalysts and application to regioselective diene hydrosilylation." Journal of the American Chemical Society 132.38 (2010): 13214-13216.
Xia, Ying, Jianchun Wang, and Guangbin Dong. "Suzuki-Miyaura coupling of simple ketones via activation of unstrained carbon-carbon bonds." Journal of the American Chemical Society 140.16 (2018): 5347-5351.
Yao, Changguang, et al. "Highly 3, 4-selective living polymerization of isoprene and copolymerization with ε-caprolactone by an amidino N-heterocyclic carbene ligated lutetium bis (alkyl) complex." Organometallics 33.3 (2014): 684-691.
Yu, Xiaolong, et al. "Iron-catalyzed tunable and site-selective olefin transposition." Journal of the American Chemical Society 142.42 (2020): 18223-18230.
Yuan, Jia, Hongfan Hu, and Chunming Cui. "N-Heterocyclic Carbene-Ytterbium Amide as a Recyclable Homogeneous Precatalyst for Hydrophosphination of Alkenes and Alkynes." Chemistry-A European Journal 22.16 (2016): 5778-5785.
Zaranek, Maciej, and Piotr Pawluc. "Markovnikov hydrosilylation of alkenes: how an oddity becomes the goal." ACS Catalysis 8.10 (2018): 9865-9876.
Zhang, Haowei, et al. "Asymmetric synthesis of chiral a-methyl-α, ß-diamino acid derivatives via group-assisted purification chemistry using N-phosphonyl imines and a Ni (II)-complexed alanine Schiff base." The Journal of organic chemistry 81.17 (2016): 7654-7661.
Zhang, Haowei, et al. "Group-assisted purification chemistry for asymmetric mannich-type reaction of chiral N-phosphonyl imines with azlactones leading to syntheses of α-quaternary α, ß-diamino acid derivatives." The Journal of organic chemistry 83.2 (2018): 644-655.
Zhang, Lei, and Zheng Huang. "Synthesis of 1, 1, 1-tris (boronates) from vinylarenes by Co-catalyzed dehydrogenative borylations-hydroboration." Journal of the American Chemical Society 137.50 (2015): 15600-15603.
Zhang, Sheng, and Michael Findlater. "Cobalt-catalyzed isomerization of alkenes." Synthesis 53.16 (2021): 2787-2797.
Zhang, Sheng, et al. "Cobalt (II)-catalyzed stereoselective olefin isomerization: facile access to acyclic trisubstituted alkenes." Journal of the American Chemical Society 142.19 (2020): 8910-8917.
Zhang, Sheng, et al. "Cobalt-and iron-catalyzed regiodivergent alkene hydrosilylations." Organic Chemistry Frontiers 8.10 (2021): 2174-2181.
Zhang, Zuhui, and Zhiyong Wang. "Diatomite-supported Pd nanoparticles: an efficient catalyst for Heck and Suzuki reactions." The Journal of organic chemistry 71.19 (2006): 7485-7487.
Zhao, Jiajin, et al. "Cobalt-catalyzed migrational isomerization of styrenes." Organic letters 22.3 (2020): 837-841.
Zhu, Chen, et al. "A multicomponent synthesis of stereodefined olefins via nickel catalysis and single electron/triplet energy transfer." Nature Catalysis 2.8 (2019): 678-687.
Zhuo, Lian-Gang, Zhong-Ke Yao, and Zhi-Xiang Yu. "Synthesis of Z-alkenes from Rh (I)-catalyzed olefin isomerization of ß, γ-unsaturated ketones." Organic letters 15.18 (2013): 4634-4637.
Markó, István E., et al. "Selective and efficient platinum (0)-carbene complexes as hydrosilylation catalysts." Science 298.5591 (2002): 204-206.
Martin, Ruben, and Stephen L. Buchwald. "Palladium-catalyzed Suzuki- Miyaura cross-coupling reactions employing dialkylbiaryl phosphine ligands." Accounts of chemical research 41.11 (2008): 1461-1473.
Maryanoff, Bruce E., and Allen B. Reitz. "The Wittig olefination reaction and modifications involving phosphoryl-stabilized carbanions. Stereochemistry, mechanism, and selected synthetic aspects." Chemical Reviews 89.4 (1989): 863-927.
Miyaura, Norio, and Akira Suzuki. "Palladium-catalyzed cross-coupling reactions of organoboron compounds." Chemical reviews 95.7 (1995): 2457-2483.
Miyaura, Norio, and Akira Suzuki. "Stereoselective synthesis of arylated (E)-alkenes by the reaction of alk-1-enylboranes with aryl halides in the presence of palladium catalyst." Journal of the Chemical Society, Chemical Communications 19 (1979): 866-867.
Miyaura, Norio, Kinji Yamada, and Akira Suzuki. "A new stereospecific cross-coupling by the palladium-catalyzed reaction of 1-alkenylboranes with 1-alkenyl or 1-alkynyl halides." Tetrahedron Letters 20.36 (1979): 3437-3440.
Mo, Zhenbo, Yang Liu, and Liang Deng. "Anchoring of Silyl Donors on a N-Heterocyclic Carbene through the Cobalt-Mediated Silylation of Benzylic C□ H Bonds." Angewandte Chemie 125.41 (2013): 11045-11049.
Molnár, Árpád. "Efficient, selective, and recyclable palladium catalysts in carbon- carbon coupling reactions." Chemical reviews 111.3 (2011): 2251-2320.
Mu, Yucheng, et al. "E-and Z-, di-and tri-substituted alkenyl nitriles through catalytic cross-metathesis." Nature chemistry 11.5 (2019): 478-487.
Mujahed, Shrouq, et al. "Polymer-Anchored Bifunctional Pincer Catalysts for Chemoselective Transfer Hydrogenation and Related Reactions." ChemSusChem 12.20 (2019): 4693-4699.
Mukhopadhyay, Tufan K., et al. "A highly active manganese precatalyst for the hydrosilylation of ketones and esters." Journal of the American Chemical Society 136.3 (2014): 882-885.

(56) References Cited

PUBLICATIONS

Nakajima, Y., and S. Shimada. "Hydrosilylation reaction of olefins: recent advances and perspectives." RSC advances 5.26 (2015): 20603-20616.
Neese, Frank. "The ORCA program system." Wiley Interdisciplinary Reviews: Computational Molecular Science 2.1 (2012): 73-78.
Negishi, Ei-Ichi, et al. "Recent advances in efficient and selective synthesis of di-, tri-, and tetrasubstituted alkenes via Pd-catalyzed alkenylation-carbonyl olefination synergy." Accounts of chemical research 41.11 (2008): 1474-1485.
Nguyen, Thach T., et al. "Synthesis of E-and Z-trisubstituted alkenes by catalytic cross-metathesis." Nature 552.7685 (2017): 347-354.
Noda, Daisuke, et al. "Non-precious-metal catalytic systems involving iron or cobalt carboxylates and alkyl isocyanides for hydrosilylation of alkenes with hydrosiloxanes." Journal of the American Chemical Society 138.8 (2016): 2480-2483.
Obligacion, Jennifer V., and Paul J. Chirik. "Earth-abundant transition metal catalysts for alkene hydrosilylation and hydroboration." Nature Reviews Chemistry 2.5 (2018): 15-34.
Pantazis, Dimitrios A., et al. "All-electron scalar relativistic basis sets for third-row transition metal atoms." Journal of chemical theory and computation 4.6 (2008): 908-919.
Parshall, G. W. "Industrial applications of homogeneous catalysis. A review." Journal of Molecular Catalysis 4.4 (1978): 243-270.
Phan, Nam TS, Matthew Van Der Sluys, and Christopher W. Jones. "On the nature of the active species in palladium catalyzed Mizoroki-Heck and Suzuki-Miyaura couplings-homogeneous or heterogeneous catalysis, a critical review." Advanced Synthesis & Catalysis 348.6 (2006): 609-679.
Pindi, Suresh, et al. "N-Phosphinyl Imine Chemistry (I): Design and Synthesis of Novel N-Phosphinyl Imines and their Application to Asymmetric aza-Henry Reaction." Chemical biology & drug design 77.1 (2011): 20-29.
Qiao, Shuo, et al. "Asymmetric [3+ 2] cycloaddition of chiral N-phosphonyl imines with methyl isocyanoacetate for accessing 2-imidazolines with switchable stereoselectivity." The Journal of organic chemistry 82.6 (2017): 2992-2999.
Sanderson, Katharine. "It's not easy being green: in the past two decades, the green-chemistry movement has helped industry become much cleaner. But mindsets change slowly, and the revolution still has a long way to go." Nature 469.7328 (2011): 18-21.
Sang, Hui Leng, Songjie Yu, and Shaozhong Ge. "Cobalt-catalyzed regioselective stereoconvergent Markovnikov 1, 2-hydrosilylation of conjugated dienes." Chemical Science 9.4 (2018): 973-978.
Sattler, Wesley, and Gerard Parkin. "Zinc catalysts for on-demand hydrogen generation and carbon dioxide functionalization." Journal of the American Chemical Society 134.42 (2012): 17462-17465.
Sattler, Wesley, et al. "Hydrosilylation of aldehydes and ketones catalyzed by a terminal zinc hydride complex,[κ3-Tptm] ZnH." Organometallics 34.19 (2015): 4717-4731.
Scarso, Alessandro, et al. "Highly active and selective platinum (II)-catalyzed isomerization of allylbenzenes: Efficient access to (E)-anethole and other fragrances via unusual agostic intermediates." Organometallics 29.6 (2010): 1487-1497.
Schlögl, Robert. "Heterogeneous catalysis." Angewandte Chemie International Edition 54.11 (2015): 3465-3520.
Schmidt, Anastasia, Alexander R. Nödling, and Gerhard Hilt. "An Alternative Mechanism for the Cobalt-Catalyzed Isomerization of Terminal Alkenes to (Z)-2-Alkenes." Angewandte Chemie International Edition 54.3 (2015): 801-804.
Shafiei-Haghighi, Sara, et al. "Experimental and computational studies of phosphine ligand displacement in iridium-pincer complexes employing pyridine or acetonitrile." Organometallics 39.19 (2020): 3461-3468.
Shende, Vaishali S., Vitthal B. Saptal, and Bhalchandra M. Bhanage. "Recent advances utilized in the recycling of homogeneous catalysis." The Chemical Record 19.9 (2019): 2022-2043.
Shi, Shicheng, et al. "Catalytic Cycloisomerization onto a Carbonyl Oxygen." Organic letters 22.15 (2020): 6171-6176.
Shinde, Vikki N., et al. "Design and syntheses of palladium complexes of NNN/CNN pincer ligands: catalyst for cross dehydrogenative coupling reaction of heteroarenes." Organometallics 39.2 (2020): 324-333.
Speier, John L., James A. Webster, and Garrett H. Barnes. "The addition of silicon hydrides to olefinic double bonds. Part II. The use of group VIII metal catalysts." Journal of the American Chemical Society 79.4 (1957): 974-979.
Sun, Bo, Lulu Ning, and Hua Chun Zeng. "Confirmation of Suzuki-Miyaura cross-coupling reaction mechanism through synthetic architecture of nanocatalysts." Journal of the American Chemical Society 142.32 (2020): 13823-13832.
Sun, Jian, and Liang Deng. "Cobalt complex-catalyzed hydrosilylation of alkenes and alkynes." ACS Catalysis 6.1 (2016): 290-300.
Tamang, Sem Raj, and Michael Findlater. "Iron catalyzed hydroboration of aldehydes and ketones." The Journal of Organic Chemistry 82.23 (2017): 12857-12862.
Tamang, Sem Raj, Anthony F. Cozzolino, and Michael Findlater. "Iron catalysed selective reduction of esters to alcohols." Organic & biomolecular chemistry 17.7 (2019): 1834-1838.
Tamang, Sem Raj, et al. "Cobalt-catalyzed hydroboration of alkenes, aldehydes, and ketones." Organic letters 20.21 (2018): 6695-6700.
Tamang, Sem Raj, et al. "Nickel-catalyzed regioselective 1, 4-hydroboration of N-heteroarenes." ACS Catalysis 8.7 (2018): 6186-6191.
Troegel, Dennis, and Jürgen Stohrer. "Recent advances and actual challenges in late transition metal catalyzed hydrosilylation of olefins from an industrial point of view." Coordination Chemistry Reviews 255.13-14 (2011): 1440-1459.
Trovitch, Ryan J. "Comparing well-defined manganese, iron, cobalt, and nickel ketone hydrosilylation catalysts." Synlett 25.12 (2014): 1638-1642.
Uma, Ramalinga, Christophe Crévisy, and René Grée. "Transposition of allylic alcohols into carbonyl compounds mediated by transition metal complexes." Chemical reviews 103.1 (2003): 27-52.
Vasseur, Alexandre, Jeffrey Bruffaerts, and Ilan Marek. "Remote functionalization through alkene isomerization." Nature Chemistry 8.3 (2016): 209-219.
Waller, F. J. "Recent achievements, trends and prospects in homogeneous catalysis." Journal of molecular catalysis 31.2 (1985): 123-136.
Wang, Chao, Wei Jie Teo, and Shaozhong Ge. "Cobalt-catalyzed regiodivergent hydrosilylation of vinylarenes and aliphatic alkenes: ligand-and silane-dependent regioselectivities." ACS Catalysis 7.1 (2017): 855-863.
Wang, Yulei, et al. "An Agostic Iridium Pincer Complex as a Highly Efficient and Selective Catalyst for Monoisomerization of 1-Alkenes to trans-2-Alkenes." Angewandte Chemie International Edition 56.6 (2017): 1614-1618.
Weigend, Florian. "Accurate Coulomb-fitting basis sets for H to Rn." Physical chemistry chemical physics 8.9 (2006): 1057-1065.

* cited by examiner

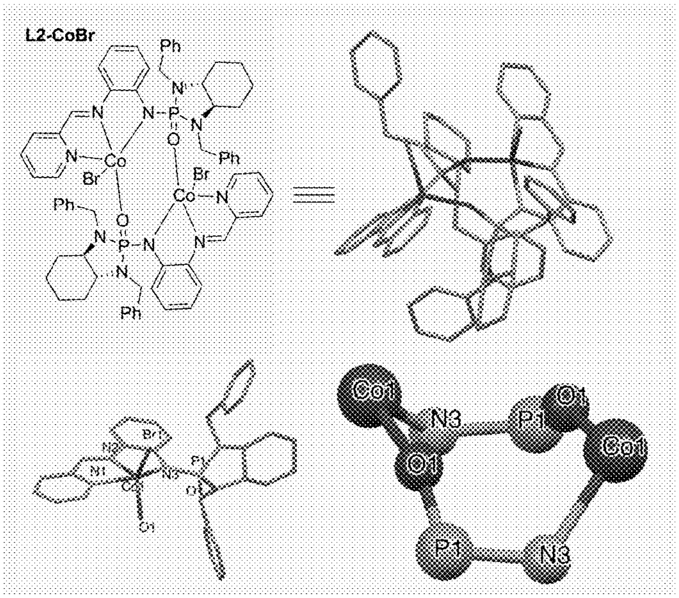
FIG.1
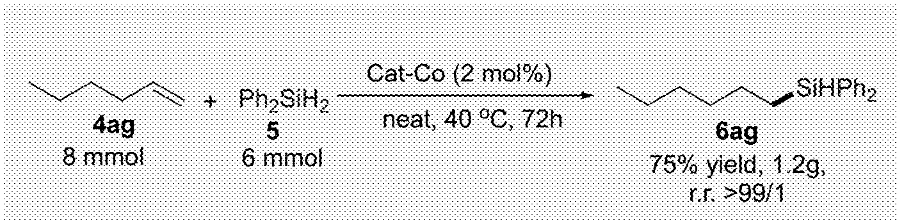
FIG. 2
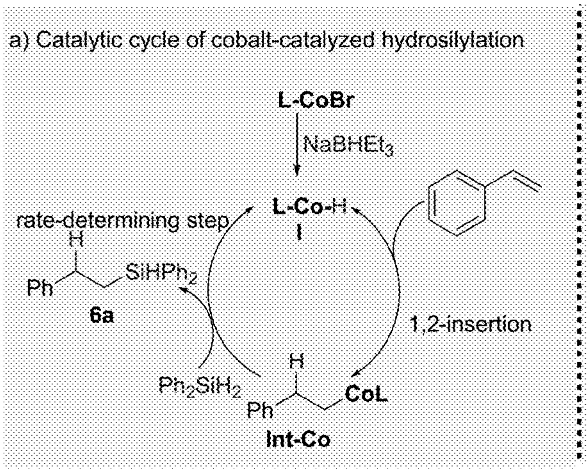
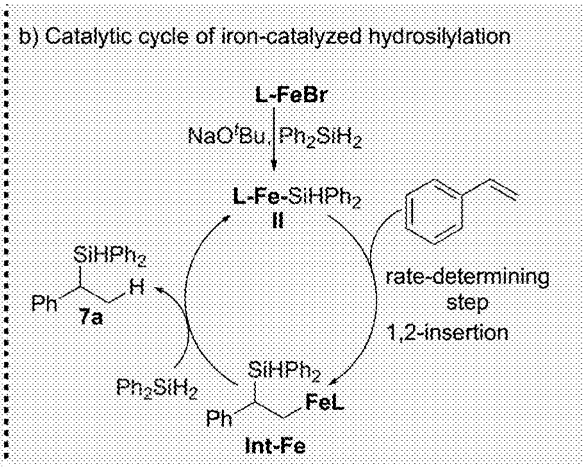
FIG. 3A
FIG. 3B

· *GAP-modified Grubbs Catalyst*

· *GAP-modified Jacobsen Catalyst*

PLATFORM FOR THE RECOVERY OF TRANSITION METAL CATALYSTS

CROSS-REFERENCE TO RELATED APPLICATIONS

This application claims priority to U.S. Provisional Application Ser. No. 63/304,119, filed Jan. 28, 2022, the entire contents of which are incorporated herein by reference.

STATEMENT OF FEDERALLY FUNDED RESEARCH

This invention was made with government support under CHE-1554906 awarded by the National Science Foundation. The government has certain rights in the invention.

TECHNICAL FIELD OF THE INVENTION

The present invention relates in general to the field of transition metal catalysts, and more particularly, to a general platform for the recovery of transition metal catalysts.

BACKGROUND OF THE INVENTION

Without limiting the scope of the invention, its background is described in connection with transition metal catalysts.

The development of new drugs is time-consuming, expensive, and risky. Despite these challenges, the pharmaceutical industry has been remarkably successful in developing a broad range of new medicines to solve ongoing and emerging public health crises. However, a major challenge to exploring novel drug targets is over-reliance of the pharmaceutical industry on precious-metal-catalysts. This limitation is seriously hampering methodological innovation, and thus development of new therapies.

Homogeneous catalysts—defined as those that exist in the same (usually liquid) phase as the reactants and products—are typically more selective than heterogeneous catalysts. Homogeneous catalysts are also significantly less affected by limitations arising from slow transport of reactants and products to and from an interface, a problem frequently seen in heterogeneous catalysis. However, the separation of homogeneous catalysts from their reaction products can be costly and is often inefficient. Therefore, it is unsurprising that with a few notable exceptions,[18-19], most industrially relevant catalysts are heterogeneous. Unfortunately, compared with their homogeneous counterparts, heterogeneous catalysts often suffer from lower performance and diminished selectivity owing to poorly defined catalytic sites, thus nullifying most benefits.

Despite these advances, a need remains for novel, highly efficient catalysts that maximize the recovery of transition metals.

SUMMARY OF THE INVENTION

As embodied and broadly described herein, an aspect of the present disclosure relates to a molecule of Formula I:

Formula I

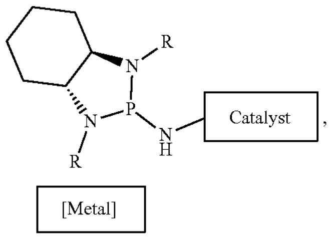

, wherein R is selected from methyl, ethyl, propyl, isopropyl, butyl, phenyl, cyclohexyl, fluoro, chloro, methoxy, ethoxy, butoxy, phenoxy, aryl, alkene, alkyne, and heterocyclic, wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

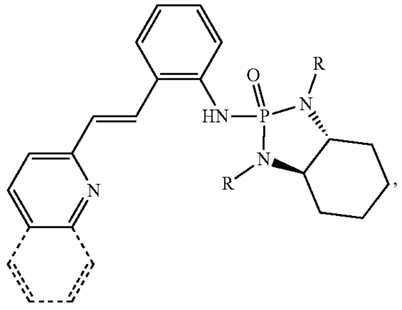

, then R is not isopropyl, and optionally M is a metal. The molecule of Formula I is a ligand until the metal M is added, at which time the molecule of Formula I is a catalyst. In one aspect, the molecule of Formula I is compound 1, which is synthesized by:

Synthetic route to novel mGAP, tridentate-ligands

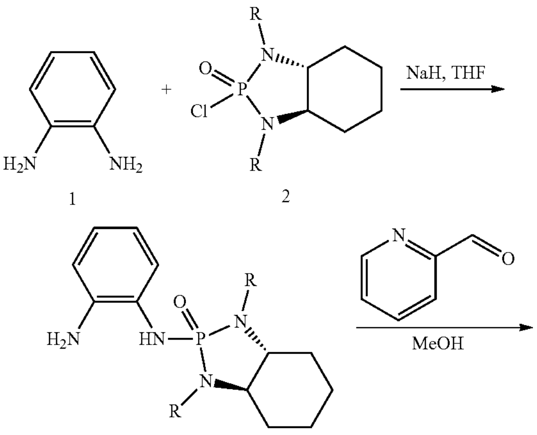

1

2

R = iPr, 3a

-continued

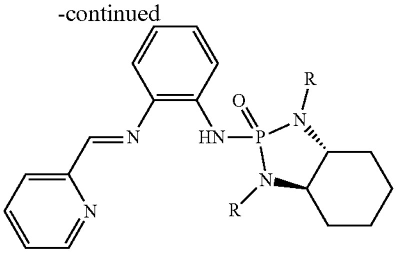

R = Bn, L2
R = p-OMeBn, L3
R = p-$CF_3$Bn, L4
R = 2,4,6-MeBn, L5

In another aspect, the molecule of Formula I is compound 1 is converted into a recyclable catalyst by the addition of the metal:

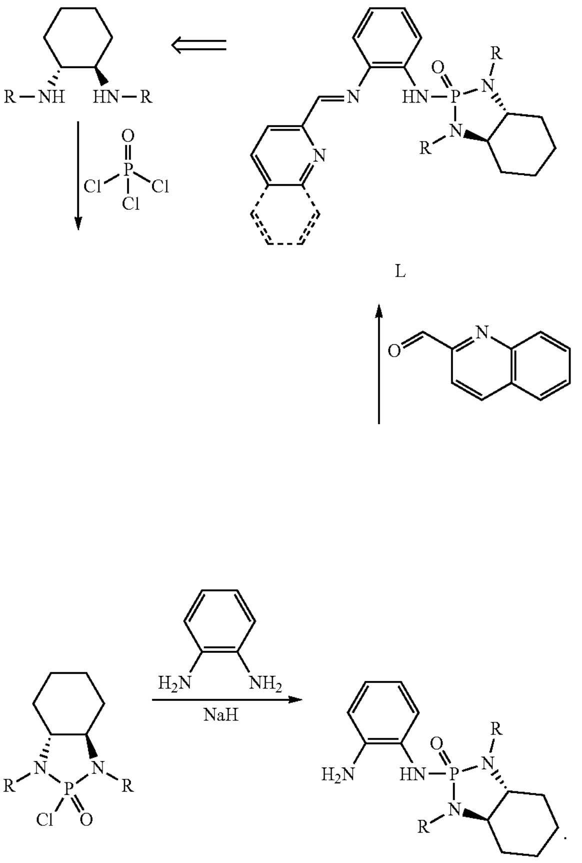

In another aspect, R is selected from benzyl, O-methylbenzyl, trifluorobenzyl, or 2,4,6-methyl benzyl. In another aspect, the molecule of Formula I recycles transition metals selected from at least one of: 1st-row transition metals, 2nd-row transition metals, 3rd-row transition metals, main group metals, lanthanide series transition metals, and actinide series transition metals. In another aspect, the molecule of Formula I recycles transition metals selected from at least one of: platinum, palladium, vanadium, manganese, iron, cobalt, nickel, copper, zinc, zirconium, ruthenium, iridium, rhodium, hafnium. In another aspect, a substrate/product is:

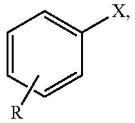

wherein R and X are selected from:

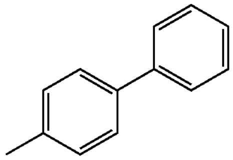

X = I, [99%], (92%)[a]
Br, [99%], (75%)[b]
Cl, [99%], (62%)[c]
OTf, [89%], (56%)[a]

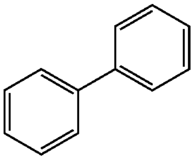

X = I, [99%], (94%)[a]
Br, [99%], (67%)[b]

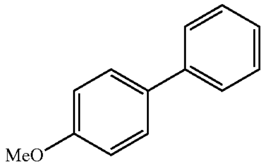

X = I, [99%], (95%)[a]
Br, [99%], (86%)[b]
Cl, [99%], (73%)[c]

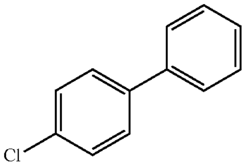

X = I, [99%], (87%)[a]

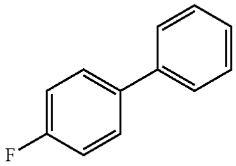

X = I, [99%], (85%)[a]
Br, [99%], (78%)[b]
Cl, [99%], (71%)[c]

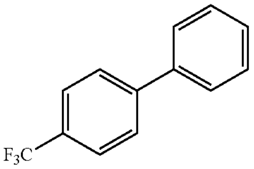

X = I, [99%], (78%)[a]

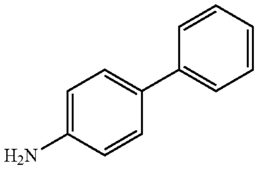

X = I, trace[a]
Cl, trace[c]

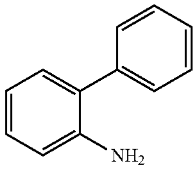

X = I, trace[a]

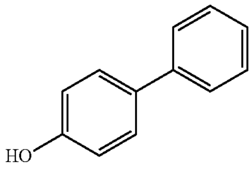

X = I, [99%], (56%)[b]

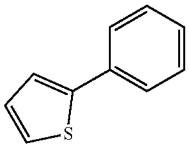

X = I, [99%][a]

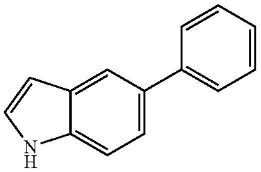

X = I, trace[a]

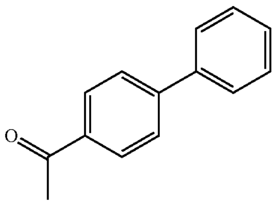

X = Br, [99%], (65%)[b]

-continued
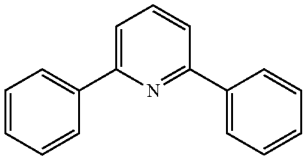
X = Br, [99%], (53%)[b]
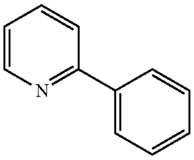
X = Br, [99%]
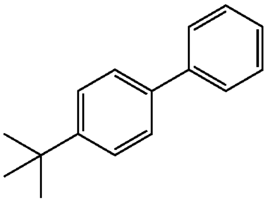
X = Br, [75%], (52%)[b]
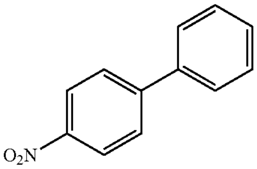
X = Cl, [99%], (68%)[c]
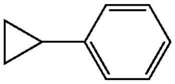
X = Br, N, R
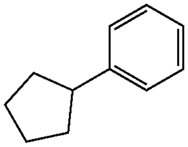
X = Br, N, R
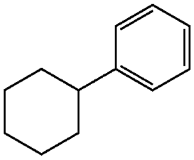
X = Br, N, R
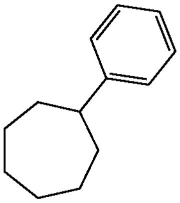
;
X = Br, N, R
or
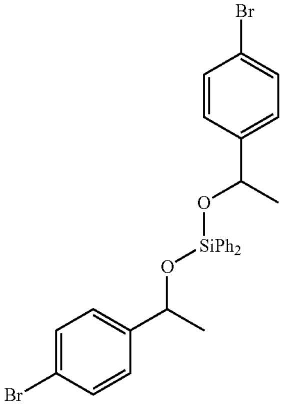
90%
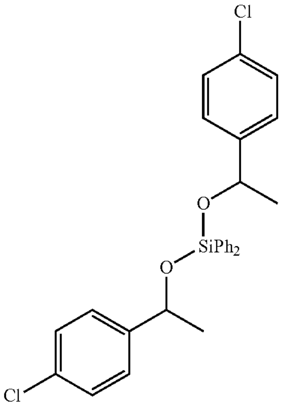
92%
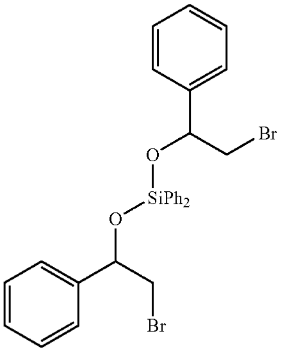
68%
-continued
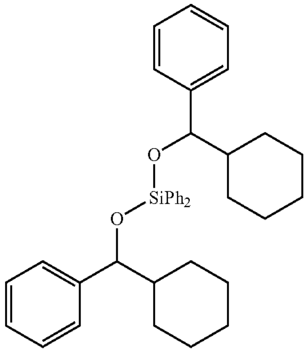
88%
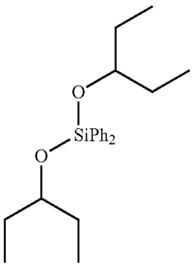
91%
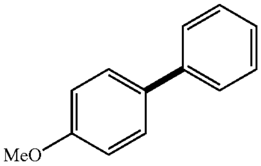
4b (95%)
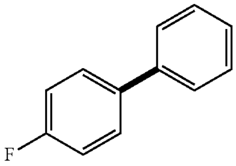
4c (85%)
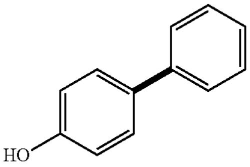
4d (56%)
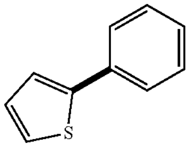
4e (99%)
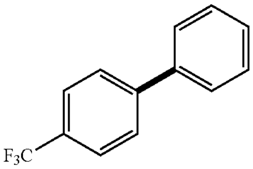
4f (78%)
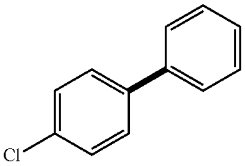
4g (87%)
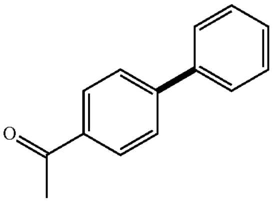
4h (56%)
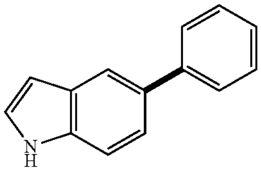
4i (trace)
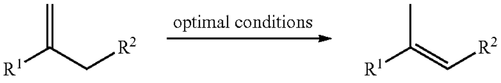
1
2
34 examples
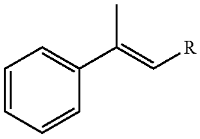
R = Me, 2a, 95% yield, E/Z = 107/1[a]
R = Et, 2b, 80% yield, E/Z, 28/1[a]
R = n-Pr, 2c, 84% yield, E/Z, 38/1[a]
R = Bn, 2d, 81% yield, E/Z, 35/1[b]

-continued

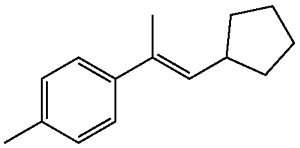

2e, 85% yield, E/Z = 130/1[b]

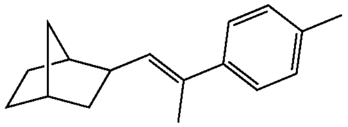

2e, 88% yield, E/Z = 15/1[b]

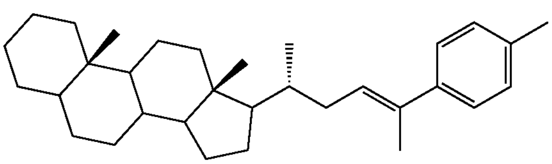

2g, 89% yield, E/Z = 24/1[c]

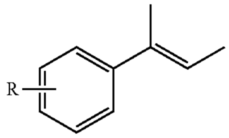

R = 4-Me, 2h, 89% yield, E/Z = 25/1[a]
R = 4-OMe, 2i, 87% yield, E/Z = 20/1[b]
R = 4-F, 2j, 83% yield, E/Z = 21/1[a]
R = 2,3-F, 2k, 85% yield, E/Z = 76/1[b]
R = 4-Cl, 2l, 93% yield, E/Z = 18/1[b]
R = 3-Cl, 2m, 96% yield, E/Z = 79/1[a]
R = 4-Br, 2n, 96% yield, E/Z = 14/1[b]

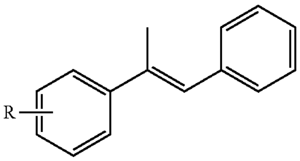

R = H, 2o, 97% yield, E/Z = 61/1[b]
R = Me, 2p, 96% yield, E/Z = 90/1[b]
R = $^t$Bu, 2q, 86% yield, E/Z = 78/1[b]
R = Ph, 2r, 91% yield, E/Z = 49/1[b]
R = OMe, 2s, 97% yield, E/Z = 53/1[b]
R = F, 2t, 90% yield, E/Z = 48/1[b]
R = Cl, 2u, 94% yield, E/Z = 21/1[b]

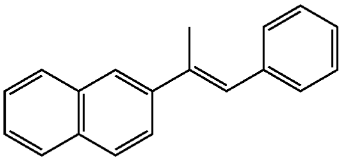

2v, 98% yield, E/Z = 107/1[b]

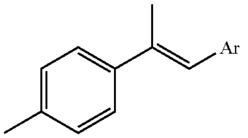

Ar = 1-Naphth, 2ad, 94% yield, E/Z = 48/1[b]
Ar = 2-Naphth, 2ae, 87% yield, E/Z = 87/1[b]

-continued

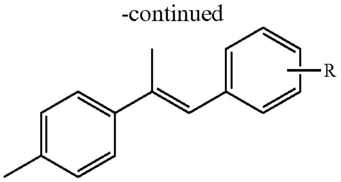

R = 4-Me, 2w, 81% yield, E/Z = 36/1[b]
R = 2-Me, 2x, 91% yield, E/Z = 111/1[b]
R = 3-Me, 2y, 95% yield, E/Z = 112/1[b]
R = 4-Ph, 2z, 91% yield, E/Z = 90/1[b]
R = 4-OMe, 2aa, 89% yield, E/Z = 71/1[b]
R = 4-F, 2ab, 90% yield, E/Z = 54/1[b]
R = 4-Cl, 2ac, 97% yield, E/Z = 58/1[b]

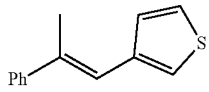

2af, 95% yield, E/Z = 33/1[c]

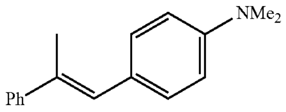

2ag, 76% yield, E/Z = 22/1[c]

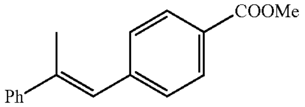

2ah, 47% conversion, E/Z = 8/1[c]

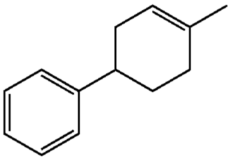

2ai, 90% yield[d]

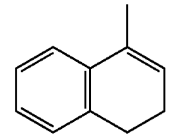

2aj, 95% yield[b]

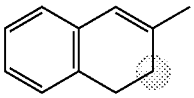

;

2ak, 85% yield, r.r. 29/1[b]

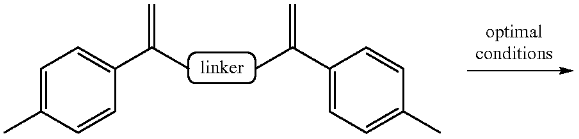

1

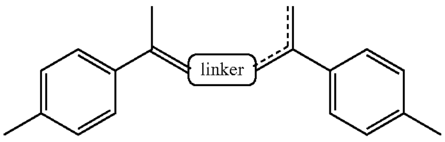

2
7 examples

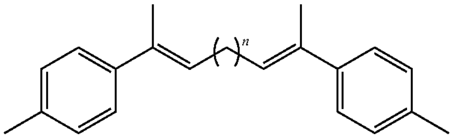

n = 8, 2al, 89% yield, E/Z = 65/1[a]
n = 2, 2am, 93% yield, E/Z = 34/1[a]
n = 1, 2an, 88% yield, E/Z = 26/1[a]
n = 0, 2ao, 96% yield, E/Z = 52/1[a]

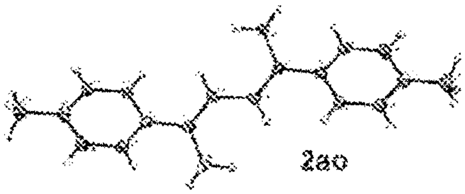

2ao

-continued

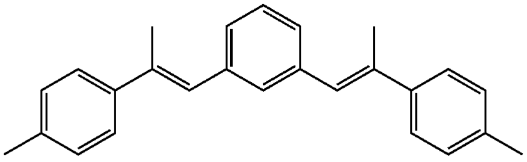

2ap

81% yield, E/Z = 52/1[b]

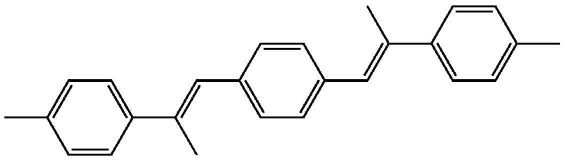

2aq

87% yield, E/Z = 16/1[b]

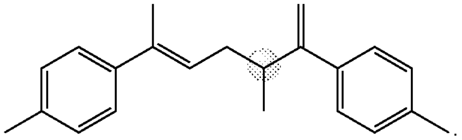

2ar

89% yield, E/Z = 52/1[a]

As embodied and broadly described herein, an aspect of the present disclosure relates to a method for recycling transition metal catalysis comprising: combining the reactants in a solvent in the presence of a molecule having the formula:

Formula II

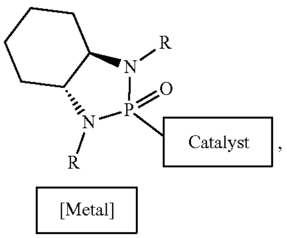

wherein R is selected from methyl, ethyl, propyl, isopropyl, butyl, phenyl, cyclohexyl, fluoro, chloro, methoxy, ethoxy, butoxy, phenoxy, aryl, alkene, alkyne, and heterocyclic, wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

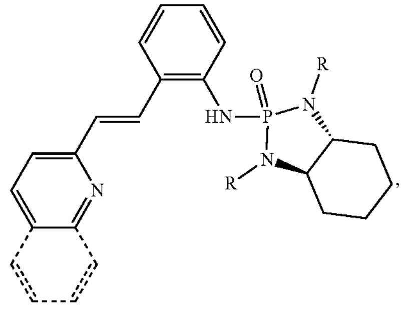

then R is not isopropyl, wherein M is a metal; under conditions that catalyze a reaction; and recycling the molecule of Formula II. In one aspect, the molecule of Formula II is compound 1, which is synthesized by Synthetic route to novel mGAP, tridentate-ligands

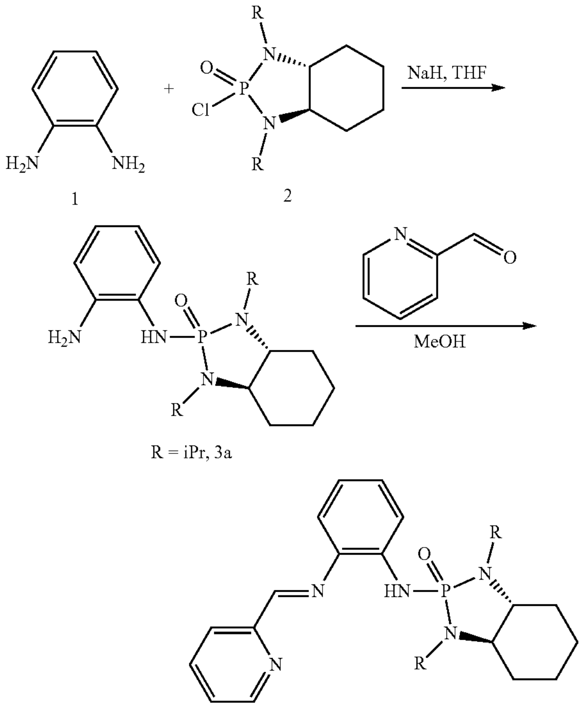

1

2

R = iPr, 3a

R = Bn, L2

R = p-OMeBn, L3

R = p-$CF_3$Bn, L4

R = 2,4,6-MeBn, L5

In another aspect, the molecule of Formula II is compound 1 that is a ligand made by:

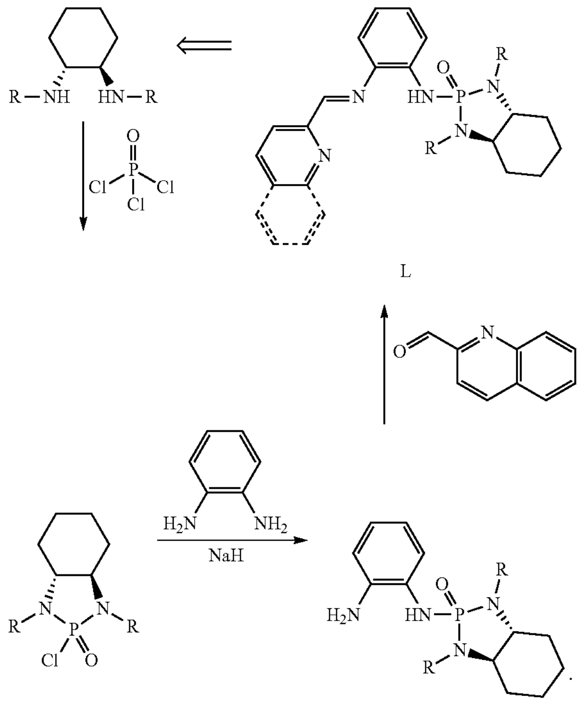

In another aspect, R is selected from benzyl, O-methylbenzyl, trifluorobenzyl, or 2,4,6-methyl benzyl. In another aspect, the molecule recycles transition metals selected from at least one of: $1^{st}$-row transition metals, $2^{nd}$-row transition metals, $3^{rd}$-row transition metals, main group metals, lanthanide series transition metals, and actinide series transition metals. In another aspect, the molecule of Formula I recycles transition metals selected from at least one of: platinum, palladium, vanadium, manganese, iron, cobalt, nickel, copper, zinc, zirconium, ruthenium, iridium, rhodium, hafnium. In another aspect, M is at least one of: platinum, palladium, vanadium, manganese, iron, cobalt, nickel, copper, zinc, zirconium, ruthenium, iridium, rhodium, hafnium. In another aspect, a substrate/product is:

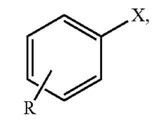

wherein R and X are selected from:

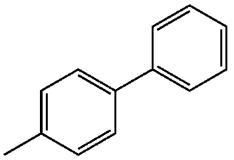

X = I, [99%], (92%)[a]
Br, [99%], (75%)[b]
Cl, [99%], (62%)[c]
OTf, [89%], (56%)[c]

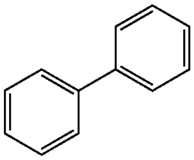

X = I, [99%], (94%)[a]
Br, [99%], (67%)[b]

-continued

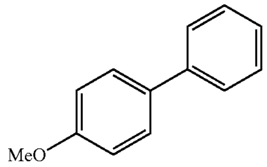

X = I, [99%], (95%)[a]
Br, [99%], (86%)[b]
Cl, [99%], (73%)[c]

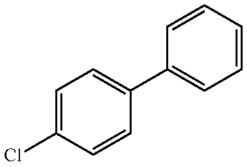

X = I, [99%], (87%)[a]

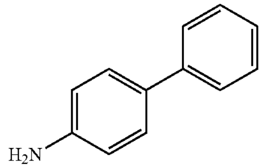

X = I, trace[a]
Cl, trace[c]

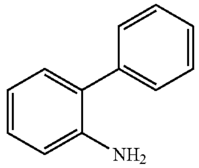

X = I, trace[a]

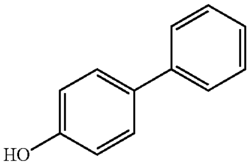

X = I, [99%], (56%)[b]

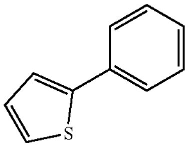

X = I, [99%][a]

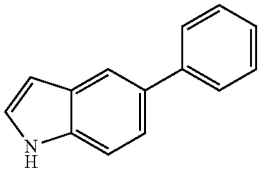

X = I, trace[a]

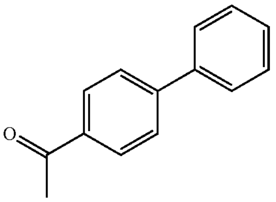

X = Br, [99%], (65%)[b]

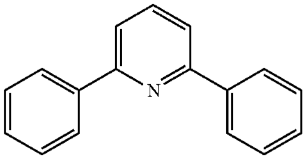

X = Br, [99%], (53%)[b]

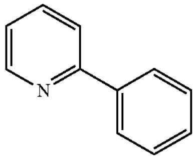

X = Br, [99%]

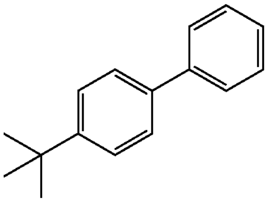

X = Br, [75%], (52%)[b]

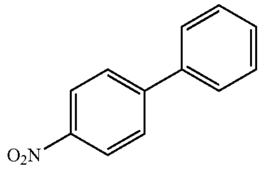

X = Cl, [99%], (68%)[c]

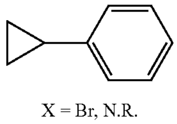

X = Br, N.R.

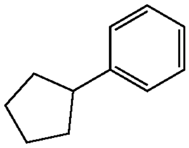

X = Br, N.R.

-continued
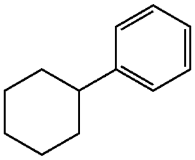
X = Br, N.R.
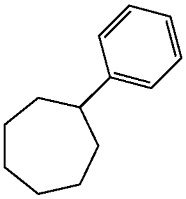
X = Br, N.R.
; or
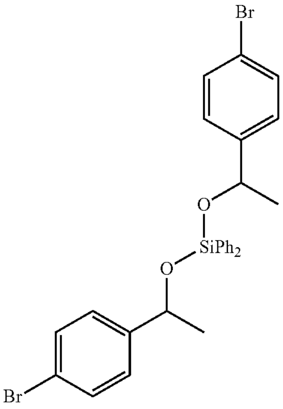
90%
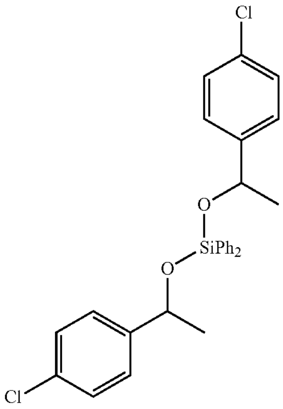
92%
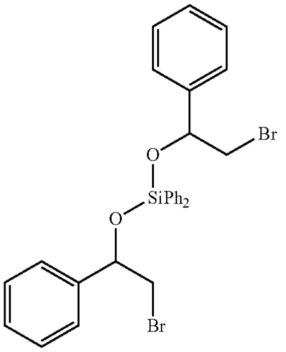
68%
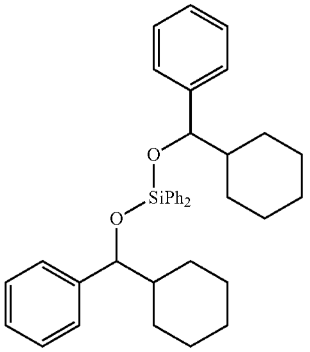
88%
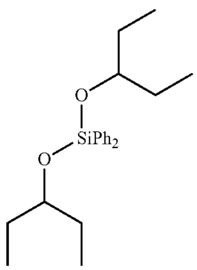
91%
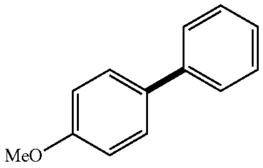
4b (95%)
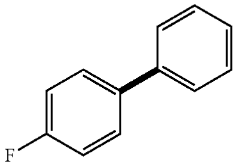
4c (85%)
-continued
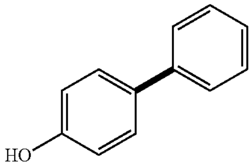
4d (56%)
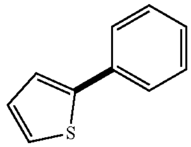
4e (99%)
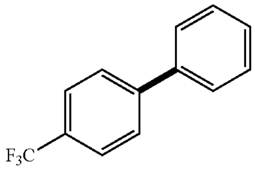
4f (78%)
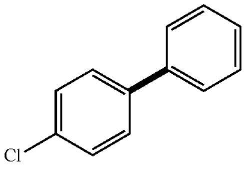
4g (87%)
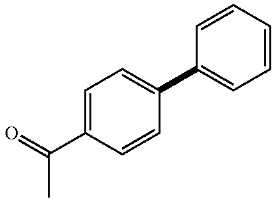
4h (56%)
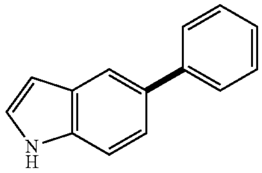
4i (trace)
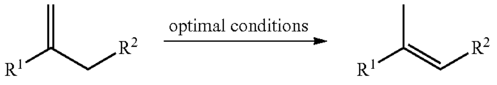
1
2
34 examples
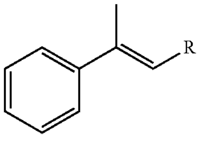
R = Me, 2a, 95% yield, E/Z = 107/1[a]
R = Et, 2b, 80% yield, E/Z = 28/1[a]
R = $^{n}$-Pr, 2c, 84% yield, E/Z = 38/1[a]
R = Bn, 2d, 81% yield, E/Z = 35/1[b]
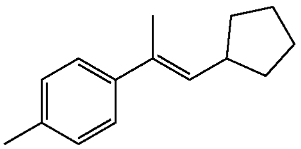
2e, 85% yield, E/Z = 130/1[b]
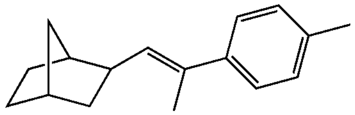
2f, 88% yield, E/Z = 15/1[b]
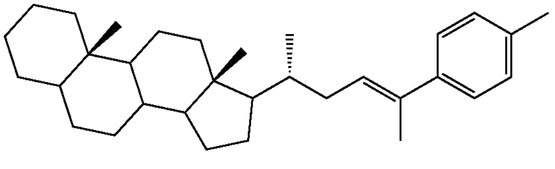
2g, 89% yield, E/Z = 24/1[c]

-continued

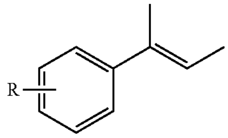

R = 4-Me, 2h, 89% yield, E/Z = 25/1[a]
R = 4-OMe, 2i, 87% yield, E/Z = 20/1[b]
R = 4-F, 2j, 83% yield, E/Z = 21/1[a]
R = 2,3-F, 2k, 85% yield, E/Z = 76/1[b]
R = 4-Cl, 2l, 93% yield, E/Z = 18/1[b]
R = 3-Cl, 2m, 96% yield, E/Z = 79/1[a]
R = 4-Br, 2n, 96% yield, E/Z = 14/1[a]

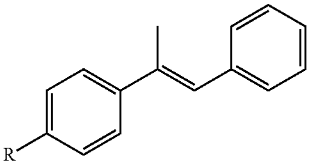

R = H, 2o, 97% yield, E/Z = 61/1[b]
R = Me, 2p, 96% yield, E/Z = 90/1[b]
R = $^t$Bu, 2q, 86% yield, E/Z = 78/1[b]
R = Ph, 2r, 91% yield, E/Z = 49/1[b]
R = OMe, 2s, 97% yield, E/Z = 53/1[b]
R = F, 2t, 90% yield, E/Z = 48/1[b]
R = Cl, 2u, 94% yield, E/Z = 21/1[b]

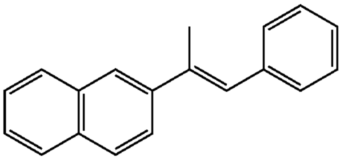

2v, 98% yield, E/Z = 107/1[b]

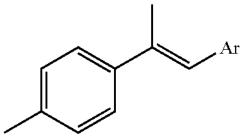

Ar = 1-Naphth, 2ad, 94% yield, E/Z = 48/1[b]
Ar = 2-Naphth, 2ae, 87% yield, E/Z = 87/1[b]

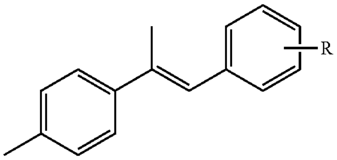

R = 4-Me, 2w, 81% yield, E/Z = 36/1[b]
R = 2-Me, 2x, 91% yield, E/Z = 111/1[b]
R = 3-Me, 2y, 95% yield, E/Z = 112/1[b]
R = 4-Ph, 2z, 91% yield, E/Z = 90/1[b]
R = 4-OMe, 2aa, 89% yield, E/Z = 71/1[b]
R = 4-F, 2ab, 90% yield, E/Z = 54/1[b]
R = 4-Cl, 2ac, 97% yield, E/Z = 58/1[b]

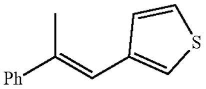

2af, 95% yield, E/Z = 33/1[c]

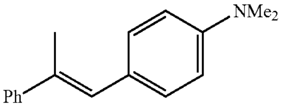

2ag, 76% yield, E/Z = 22/1[c]

-continued

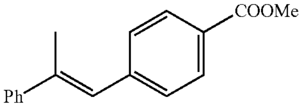

2ah
47% conversion, E/Z = 8/1[c]

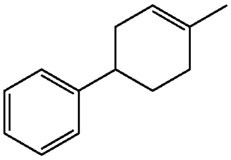

2ai, 90% yield[d]

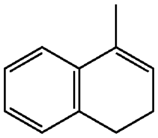

2aj, 95% yield[b]

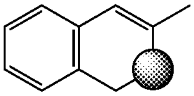

2ak, 85% yield, r.r. 29/1[b];

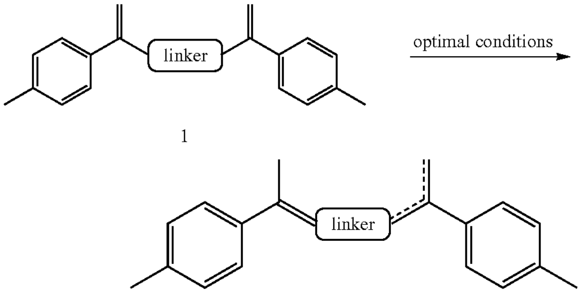

1

2
7 examples

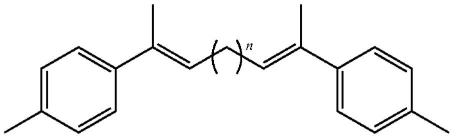

n = 8, 2al, 89% yield, E/Z = 65/1[a]
n = 2, 2am, 93%, E/Z = 34/1[a]
n = 1, 2an, 88% yield, E/Z = 26/1[a]
n = 0, 2ao, 96% yield, E/Z = 52/1[a]

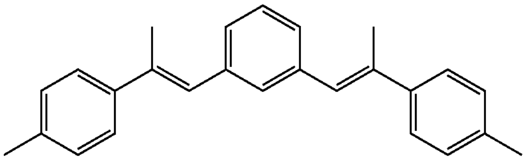

2ap
81% yield, E/Z = 52/1[b]

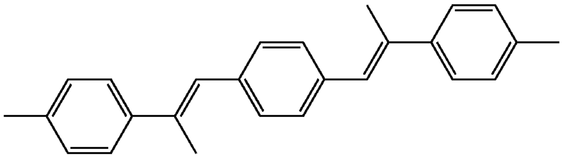

2aq
87% yield, E/Z = 16/1[b]

-continued

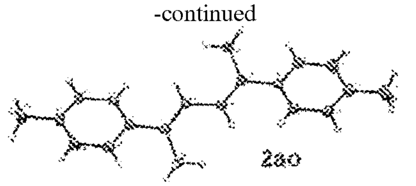

2ao

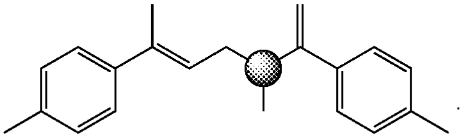

2ar
89% yield, E/Z = 52/1[a]

In another aspect, the reaction is an isomerization reaction, a hydrosilylation reaction, a Suzuki-Miyaura coupling, a Negishi coupling, a Sonogashira coupling or a Heck coupling.

As embodied and broadly described herein, an aspect of the present disclosure relates to a tunable tridentate ligand for recyclable homogeneous transition metal catalyst comprising a molecule of Formula I:

Formula I

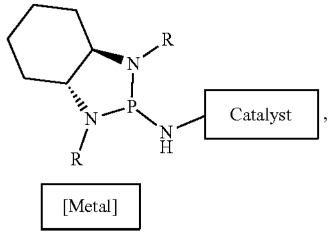

wherein R is selected from methyl, ethyl, propyl, isopropyl, butyl, phenyl, cyclohexyl, fluoro, chloro, methoxy, ethoxy, butoxy, phenoxy, aryl, alkene, alkyne, and heterocyclic, wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

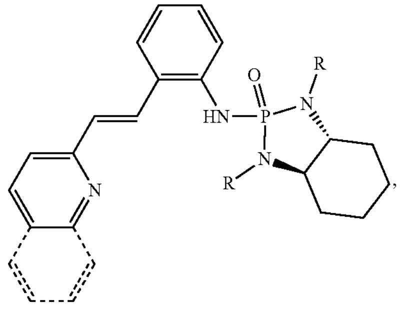

then R is not isopropyl, and optionally M is a metal. The molecule of Formula I is a ligand until the metal is added, at which time the molecule of Formula I becomes the molecule of Formula II, which is a catalyst. In one aspect, the molecule of Formula I is synthesized by Synthetic route to novel mGAP, tridentate-ligands

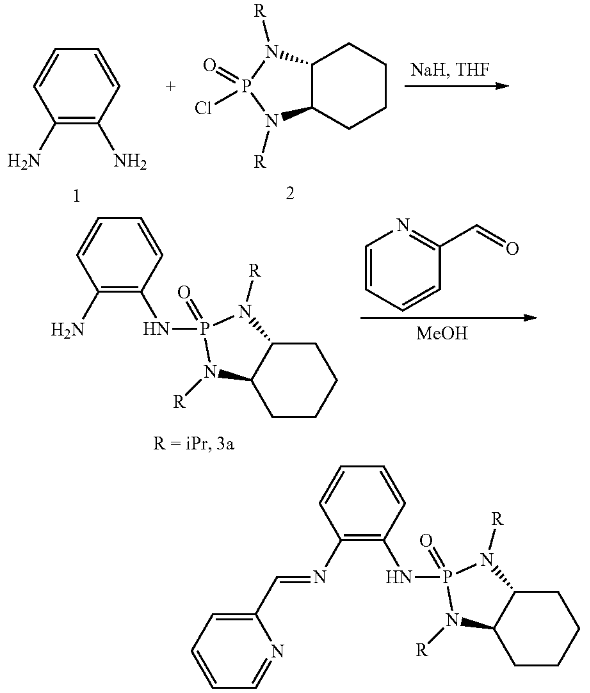

R = Bn, L2
R = p-OMeBn, L3
R = p-$CF_3$Bn, L4
R = 2,4,6-MeBn, L5

In another aspect, the molecule of Formula I is converted into a recyclable catalyst by:

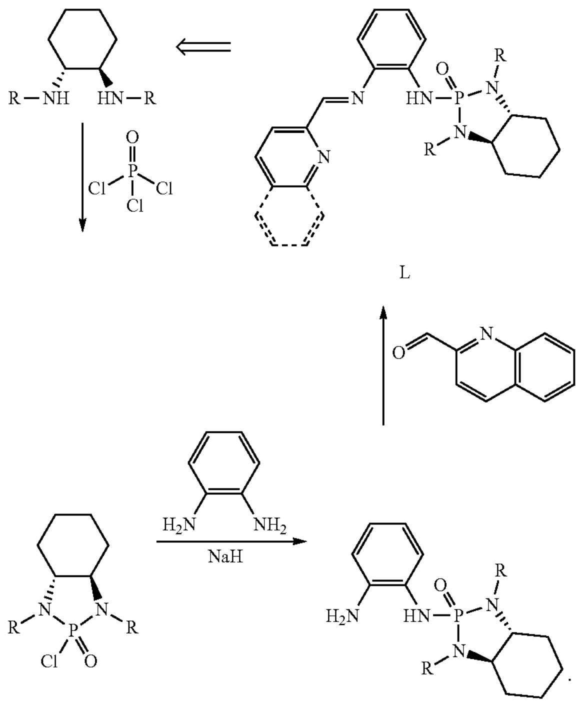

In another aspect, R is selected from isopropyl, benzyl, O-methylbenzyl, trifluorobenzyl, or 2,4,6-methyl benzyl. In another aspect, the molecule of Formula I recycles transition metals selected from at least one of: 1st-row transition metals, 2nd-row transition metals, 3rd-row transition metals, main group metals, lanthanide series transition metals, and actinide series transition metals. In another aspect, the molecule of Formula I recycles transition metals selected from at least one of: platinum, palladium, vanadium, manganese, iron, cobalt, nickel, copper, zinc, zirconium, ruthenium, iridium, rhodium, hafnium. In another aspect, a substrate/product is:

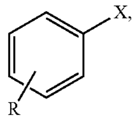

wherein R and X are selected from:

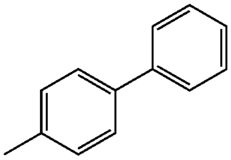

X = I, [99%], (92%)[a]
Br, [99%], (75%)[b]
Cl, [99%], (62%)[c]
OTf, [89%], (56%)[c]

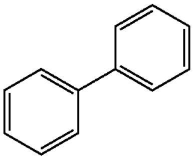

X = I, [99%], (94%)[a]
Br, [99%], (67%)[b]

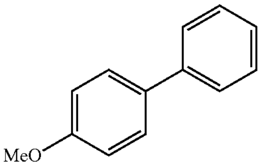

X = I, [99%], (95%)[a]
Br, [99%], (86%)[b]
Cl, [99%], (73%)[c]

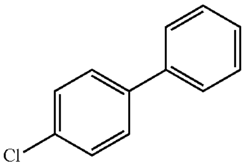

X = I, [99%], (87%)[a]

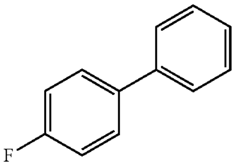

X = I, [99%], (85%)[a]
Br, [99%], (78%)[b]
Cl, [99%], (71%)[c]

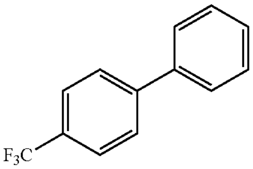

X = I, [99%], (78%)[a]

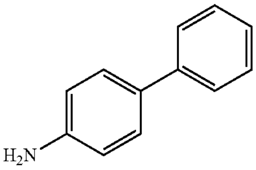

X = I, trace[a]
Cl, trace[c]

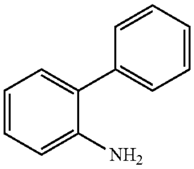

X = I, trace[a]

-continued

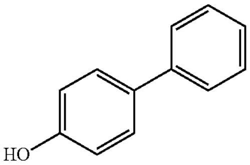

X = I, [99%], (56%)[b]

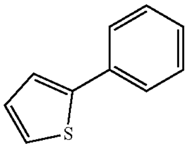

X = I, [99%][a]

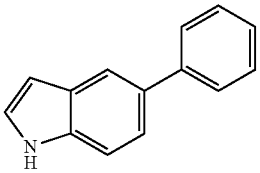

X = I, trace[a]

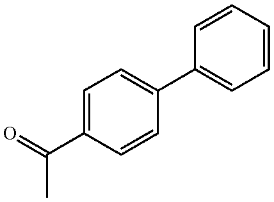

X = Br, [99%], (65%)[b]

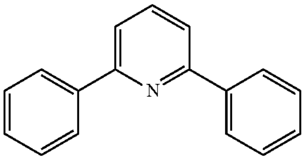

X = Br, [99%], (53%)[b]

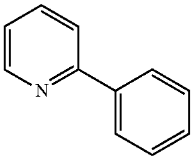

X = Br, [99%]

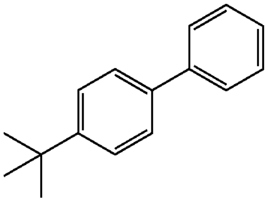

X = Br, [75%], (52%)[b]

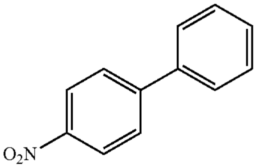

X = Cl, [99%], (68%)[c]

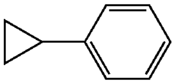

X = Br, N.R.

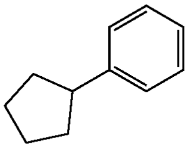

X = Br, N.R.

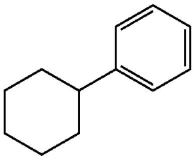

X = Br, N.R.

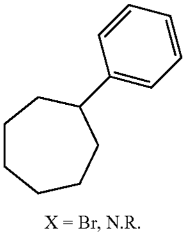

X = Br, N.R.

; or

-continued
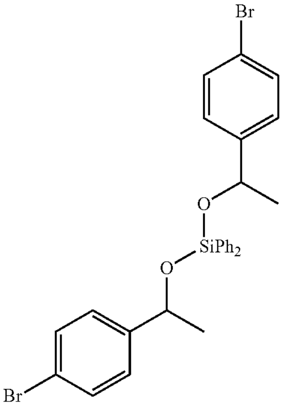
90%
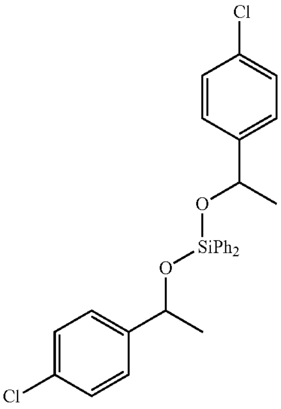
92%
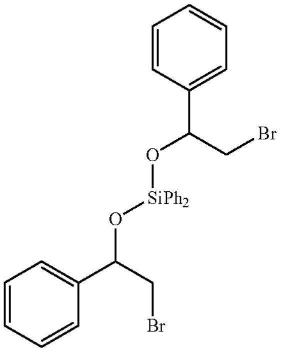
68%
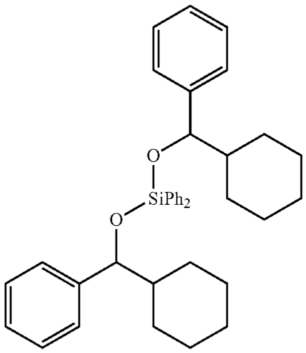
88%
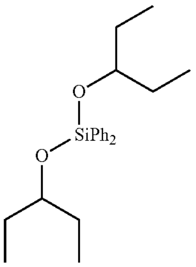
91%
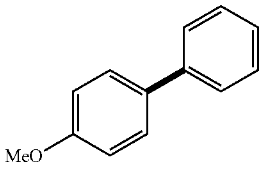
4b (95%)
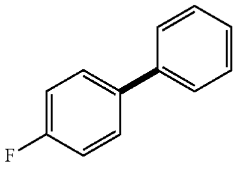
4c (85%)
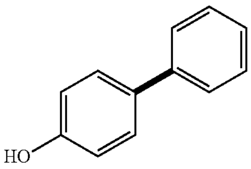
4d (56%)
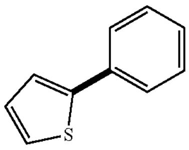
4e (99%)
-continued
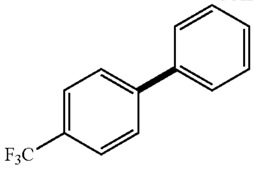
4f (78%)
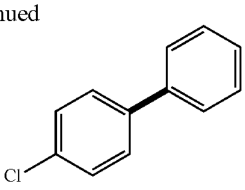
4g (87%)
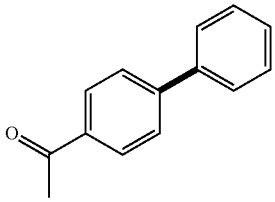
4h (56%)
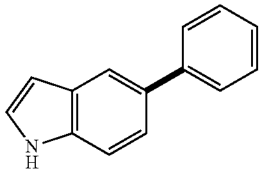
4i (trace)
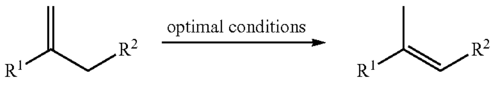
1
2
34 examples
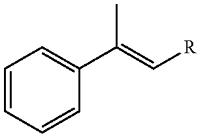
R = Me, 2a, 95% yield, E/Z = 107/1[a]
R = Et, 2b, 80% yield, E/Z = 28/1[a]
R = $^{n}$-Pr, 2c, 84% yield, E/Z = 38/1[a]
R = Bn, 2d, 81% yield, E/Z = 35/1[b]
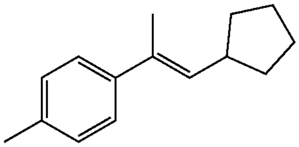
2e, 85% yield, E/Z = 130/1[b]
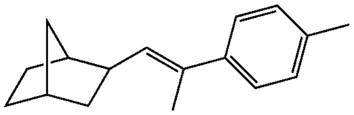
2f, 88% yield, E/Z = 15/1[b]
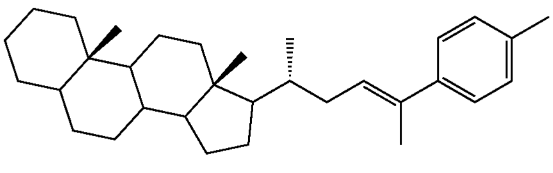
2g, 89% yield, E/Z = 24/1[c]

-continued

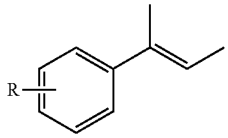

R = 4-Me, 2h, 89% yield, E/Z = 25/1[a]
R = 4-OMe, 2i, 87% yield, E/Z = 20/1[b]
R = 4-F, 2j, 83% yield, E/Z = 21/1[a]
R = 2,3-F, 2k, 85% yield, E/Z = 76/1[b]
R = 4-Cl, 2l, 93% yield, E/Z = 18/1[b]
R = 3-Cl, 2m, 96% yield, E/Z = 79/1[a]
R = 4-Br, 2n, 96% yield, E/Z = 14/1[a]

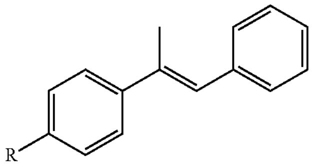

R = H, 2o, 97% yield, E/Z = 61/1[b]
R = Me, 2p, 96% yield, E/Z = 90/1[b]
R = $^t$Bu, 2q, 86% yield, E/Z = 78/1[b]
R = Ph, 2r, 91% yield, E/Z = 49/1[b]
R = OMe, 2s, 97% yield, E/Z = 53/1[b]
R = F, 2t, 90% yield, E/Z = 48/1[b]
R = Cl, 2u, 94% yield, E/Z = 21/1[b]

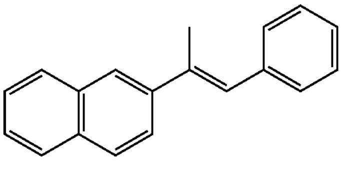

2v, 98% yield, E/Z = 107/1[b]

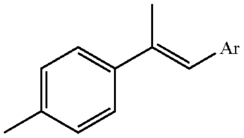

Ar = 1-Naphth, 2ad, 94% yield, E/Z = 48/1[b]
Ar = 2-Naphth, 2ae, 87% yield, E/Z = 87/1[b]

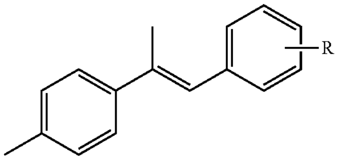

R = 4-Me, 2w, 81% yield, E/Z = 36/1[b]
R = 2-Me, 2x, 91% yield, E/Z = 111/1[b]
R = 3-Me, 2y, 95% yield, E/Z = 112/1[b]
R = 4-Ph, 2z, 91% yield, E/Z = 90/1[b]
R = 4-OMe, 2aa, 89% yield, E/Z = 71/1[b]
R = 4-F, 2ab, 90% yield, E/Z = 54/1[b]
R = 4-Cl, 2ac, 97% yield, E/Z = 58/1[b]

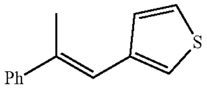

2af, 95% yield, E/Z = 33/1[c]

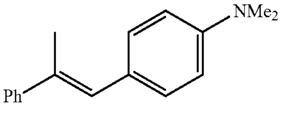

2ag, 76% yield, E/Z = 22/1[c]

-continued

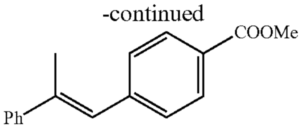

2ah

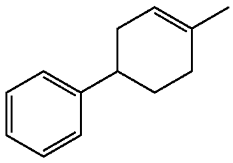

2ai, 90% yield[d]

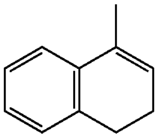

2aj, 95% yield[b]

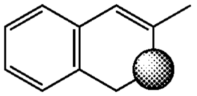

2ak, 85% yield, r.r. 29/1[b];

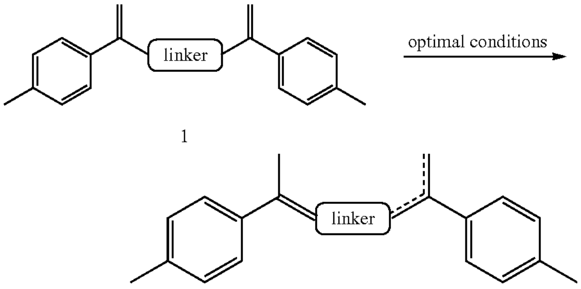

1

2
7 examples

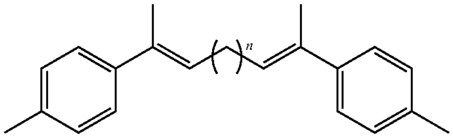

n = 8, 2al, 89% yield, E/Z = 65/1[a]
n = 2, 2am, 93%, E/Z = 34/1[a]
n = 1, 2an, 88% yield, E/Z = 26/1[a]
n = 0, 2ao, 96% yield, E/Z = 52/1[a]

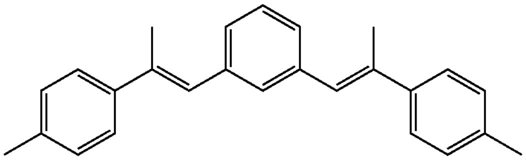

2ap
81% yield, E/Z = 52/1[b]

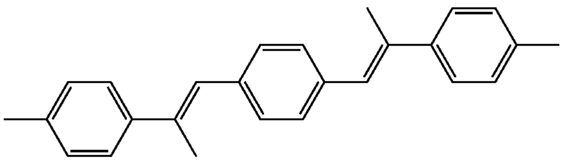

2aq
87% yield, E/Z = 16/1[b]

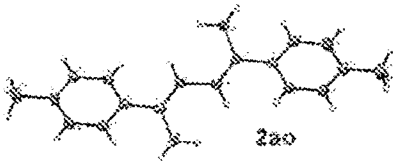

-continued

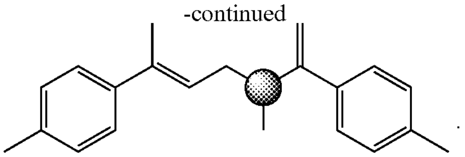

2ar
89% yield, E/Z = 52/1[a]

BRIEF DESCRIPTION OF THE DRAWINGS

For a more complete understanding of the features and advantages of the present invention, reference is now made to the detailed description of the invention along with the accompanying figure(s) and in which:

FIG. 1. Solid-state structure of L2-CoBr obtained using X-ray diffraction experiments.

FIG. 2. Gram-scale reaction of 4ag with 5.

FIGS. 3A and 3B. FIG. 3A shows the catalytic cycle of cobalt-catalyzed hydrosilylation. FIG. 3B shows the catalytic cycle of iron-catalyzed hydrosilylation.

FIG. 4A fluorescence image 2*ao* under ultraviolet (UV) light (365 nm); FIG. 4B fluorescence image 2*aq* under ultraviolet (UV) light (365 nm); FIG. 4C fluorescence image 2*z* under ultraviolet (UV) light (365 nm); FIG. 4D fluorescence image of 2aq in mixed solvent of DMF/water (5*10-5 M) under ultraviolet (UV) light (365 nm).

FIG. 7A: Optimized structure of L1-Pd(OAc). FIG. 7B: Optimized structure of L2-Pd(OAc).

DETAILED DESCRIPTION OF THE INVENTION

Figure 4A:
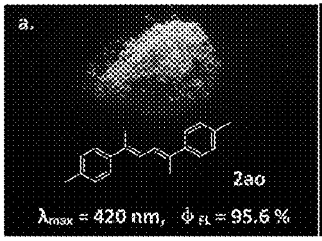
FIGS. 4A to 4D.
Figure 4B:
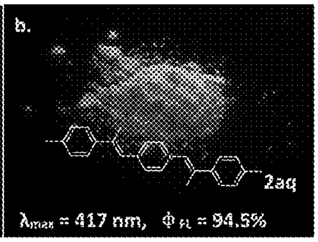
Figure 4C:
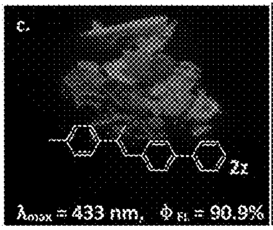

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as “a”, “an” and “the” are not intended to refer to only a singular entity, but include the general class of which a specific example may be used for illustration. The terminology herein is used to describe specific embodiments of the invention, but their usage does not delimit the invention, except as outlined in the claims.

Transition metal catalysts are ubiquitous in chemistry and are integral to many of the most challenging and useful chemical transformations in the chemical enterprise. They often contain the most expensive and most scarce elements in the periodic table. An effective method for recovering such valuable elements after the chemical reaction is complete would be transformative for the chemical industry. The molecular design, compounds, technology, and methods disclosed herein allow for the control the solubility properties of any transition metal catalyst, rendering recovery of the complex possible via simple precipitation and filtration procedures.

The present invention overcomes the limitation in the prior art by providing novel synthetic avenues that rely on recyclable transition metal catalysts that can be reclaimed and reused. In addition, the methods address a serious threat to pharmaceutical chemistry: current methods are not sustainable because they consume precious raw materials needed for catalyst manufacture and the downstream production of drugs.

Moreover, the novel solution to these problems described herein, includes a general blueprint for recycling homogeneous catalysts. In contrast to traditional approaches involving generation of a heterogeneous catalyst based upon a successful homogeneous analog, the approach described herein avoids the need to tether a homogeneous complex to a non-innocent scaffold like alumina/silica or the incorporation of significant amounts of fluorine into the catalyst structure.

Following synthesis, the extensive use of metal scavengers (typically multiple treatments) is required to reduce the levels of toxic metals to permissible levels in pharmaceutical products. A key advantage of the present invention is that it allows for recycling homogeneous catalysts, which reduces waste, conserves scarce resources (precious metals), and reduces the amounts of metal impurities in active pharmaceutical ingredients.

Unlike specific reaction and/or transformation methods used before, the present invention includes a universal platform for recovery and recycling method that can be applied to any known catalytic transformation independent of the specific reaction or transformation methods used.

The present invention is a molecule of Formula I:

Formula I

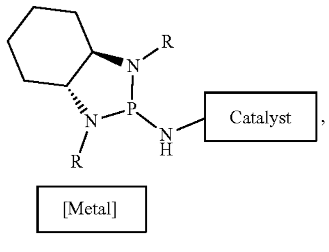

wherein R is selected from methyl, ethyl, propyl, isopropyl, butyl, phenyl, cyclohexyl, fluoro, chloro, methoxy, ethoxy, butoxy, phenoxy, aryl, alkene, alkyne, and heterocyclic, wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

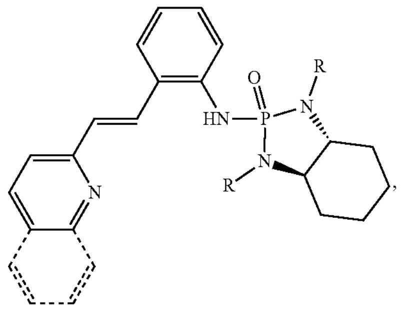

then R is not isopropyl, and optionally M is a metal. The metal can be any metal, se.g., those metals selected from $1^{st}$-row transition metals, $2^{nd}$-row transition metals, $3^{rd}$-row transition metals, main group metals, lanthanide series transition metals, and actinide series transition metals. For example, the metal can be platinum, palladium, vanadium, manganese, iron, cobalt, nickel, copper, zinc, zirconium, ruthenium, iridium, rhodium, and/or hafnium.

Example 1. Cobalt- and Iron-Catalyzed Regiodivergent

A complementary set of base metal catalysts have been developed for regiodivergent alkene hydrosilylations: iron complexes of amine-iminopyridine ligands that are selective for Markovnikov hydrosilylations (branched/linear up to >99:1), while the cobalt complexes bearing the same type of ligands provide excellent levels of anti-Markovnikov selectivity (linear/branched up to >99:1). Both systems exhibit high efficiency and wide functional group tolerance.

Transition metal catalyzed hydrosilylation[1-5] is one of the most widely studied and applied transformations for the upgrading of commodity alkenes and alkynes. Alkene hydrosilylation is most commonly used in the industrial production of commodity silicones, which are important feedstock for silicon-based polymers and versatile building blocks in organic synthesis. The majority of catalysts capable of alkene hydrosilylation are based upon precious metals,[1-2,6] and in particular, Pt-based complexes have been explored extensively (Scheme 1a).[7-10] However, platinum is a rare metal with an abundance of only 0.005 ppm in the earth's crust. Furthermore, these homogeneous precious metal catalysts are difficult to recover and are often left behind as residual impurities in the organosilicon products; the annual loss of Pt resulting from industrial hydrosilylation is estimated to reach 5.6 tons.[11] Given these facts, the ideal catalyst in hydrosilylation should be based upon an earth-abundant metal complex. In the past decades, tremendous progress in homogeneous base-metal catalysis has been witnessed, particularly in Fe and Co catalysis (Scheme 1b).[3-5, 12-22] With rational design of ligands, excellent reactivity, regioselectivity and even enantioselectivity can be readily achieved. In particular, Huang and coworkers also demonstrated that regiodivergent olefin hydrosilylation was possible within a single ligand class through variation of the metal center.[18]

Schemes 1a and 1b. The development of hydrosilylation of alkenes (in industry and academia) and challenging issues.

a. Platinum Catalysts in Hydrosilylation Industry $H_2[PtCl_6]\bullet xH_2O$

Speier's catalyst

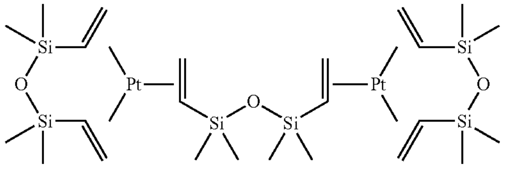

Karstedt's catalyst b. Selected Examples of Cobalt and Iron Catalysts in Hydrosilylation of Alkenes

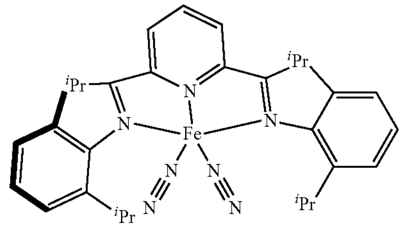

Chirik's work

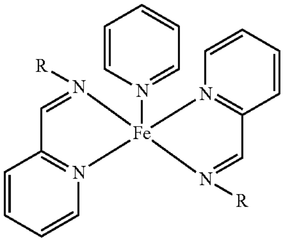

Ritter's work

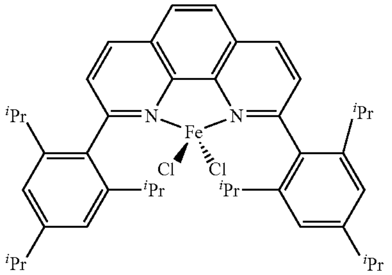

Zhu's work

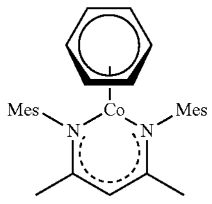

Holland's work

-continued

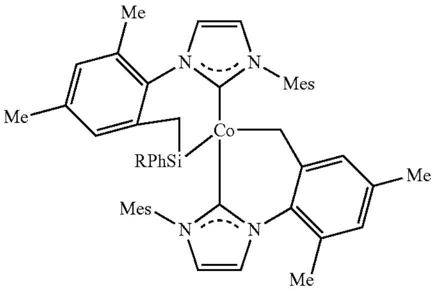

Deng's work

M(OPv)2/3
CNad

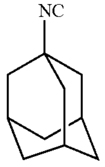

CNAD
M = Fe, Co
Nagashima's work

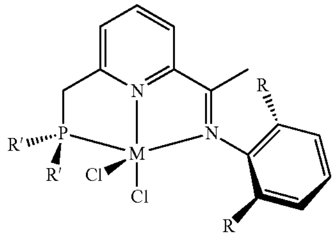

M = Fe, Co
Huang's work

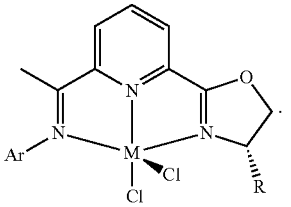

M = Fe, Co
Huang & Lu's work

By contrast, the present inventors used group-assisted purification (GAP) chemistry,[23-28] that incorporates the phosphoramide group into a ligand platform (metalla-GAP) to generate a novel and highly selective homogeneous catalyst.[29] Thus, in three synthetic steps, a series of tunable tridentate ligands are readily accessed (Scheme 2). Upon complexation with either Co(II) or Fe(II) salts, highly active systems were produced, which proved capable of catalyzing the hydrosilylation of olefins. It was found that both Co and Fe systems feature excellent substrate generality and chemoselectivity and, remarkably, regiodivergent outcomes are obtained within the same ligand class which appears to be metal-dependent. The iron catalysts reported are highly selective for Markovnikov hydrosilylations, whereas the analogous cobalt catalysts afford the opposite anti-Markovnikov regiochemistry.

Scheme 2. Synthesis of Amine-Iminopyridine Ligands.

Scheme 2. Synthesis of amine-iminopyridine ligands.

Synthetic route to novel mGAP, tridentate-ligands

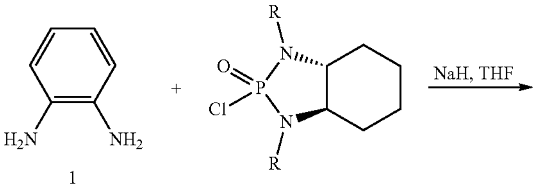

1 2

-continued

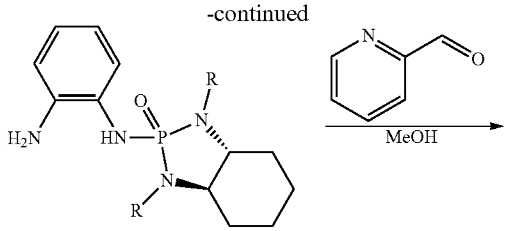

R = i-Pr, 3a

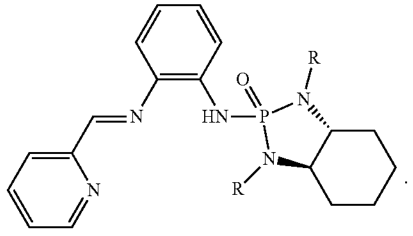

R = i-Pr, L1
R = Bn, L2
R = p-OMeBn, L3
R = p-$CF_3$Bn, L4
R = 2,4,6-MeBN, L5

Preparation of catalysts. To effect olefin hydrosilylation, catalysts were typically generated in-situ via addition of an activator $NaHBEt_3$ or NaOtBu to a mixture of GAP ligand (L1-L4) and $CoBr_2$ (1:1) in THF. It proved possible to isolate X-ray quality crystals of both L2-CoBr and L2-FeBr from concentrated DCM solutions layered with toluene. The solid-state structures of L2-CoBr and L2-FeBr are isostructural and exhibit monoclinic structures in which each metal center is coordinated with only one L2 ligand in a tridentate fashion (L2-CoBr shown in FIG. 1). A dimeric structure is revealed in the solid-state and is held together by P═O . . . M interactions which result in an eight-membered ring. By way of explanation and in no way a limitation of the present invention, it is believed that in solution and under these catalytic conditions, it is likely that the dimer-structure must dissociate to afford a catalytically active monomer that can facilitate hydrosilylation of olefin substrates.

Cobalt-catalyzed hydrosilylation of alkenes. The inventors used styrene (4a) as a model substrate and performed catalytic hydrosilylation reactions employing diphenylsilane (5) (Table 1). As an activator, both $NaHBEt_3$ and NaO$^t$Bu were tested, which are proposed to produce cobalt (II) hydride complexes.[30] Recent work from Thomas and coworkers have also implicated an 'ate' species forming from NaO$^t$Bu and silanes serves as the real activator in the reaction.[30] Combination of Co(II) centers with L1-5 in the presence of NaO$^t$Bu revealed moderate to good yields of hydrosilylation product (Entries 1-5, Table 1); L2 afforded both the highest yield and regioselectivity (87% and 11:1) (Entry 2, Table 1). Switching reaction solvent from THE to either toluene or 1,4-dioxane had no effect on regioselectivity and in the case of 1,4-dioxane a substantial decrease in overall yield was observed (Entries 6-7, Table 1). Upon switching activator from NaO$^t$Bu to $NaHBEt_3$ no noticeable difference in yield (85%) was found, however a substantially enhanced regioselectivity (23:1) was achieved (Entry 8, Table 1).

TABLE 1

Cobalt catalyzed anti-Markovnikov hydrosilylation[a]

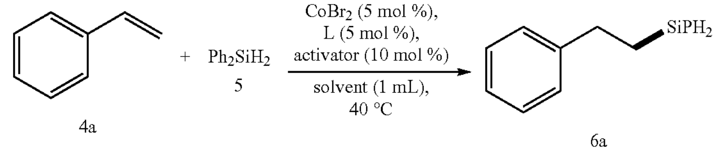

4a 5 6a

| Entry | Ligand | Solvent | Activator | Yeild (%)[b] | r.r (l/b)[c] |
|---|---|---|---|---|---|
| 1 | L1 | THF | NaO$^t$Bu | 52 | 5/1 |
| 2 | L2 | THF | NaO$^t$Bu | 87 | 11/1 |
| 3 | L3 | THF | NaO$^t$Bu | 76 | 7/1 |
| 4 | L4 | THF | NaO$^t$Bu | 64 | 4/1 |
| 5 | L5 | THF | NaO$^t$Bu | 56 | 4/1 |
| 6 | L2 | Toluene | NaO$^t$Bu | 82 | 10/1 |
| 7 | L2 | 1,4-dioxane | NaO$^t$Bu | 69 | 10/1 |
| 8 | L2 | THF | $NaHBEt_3$ | 85 | 23/1 |

[a]The reaction of 4a (0.2 mmol) with 5 (0.3 mmol) was performed in the presence of $CoBr_2$ (5 mol %), L (5 mol %) and activator (10 mol %) in solvent (1 mL) at 40° C. under argon for 24 h. [b] Yield of isolated product. [c]The regioisomer ratio (r.r) of the product 6a was determined by $^1H$ NMR.

Using these reaction conditions, the scope of substrate amenable to the reaction conditions (Scheme 3) were tested. The cobalt catalyst mediated hydrosilylation of a diverse array of alkenes with $Ph_2SiH_2$, furnishing linear products in high isolated yield with excellent regioselectivities. In total, 34 substrates were shown to undergo hydrosilylation in good to excellent yield (61-99%) with superb regioselectivity in most cases (from 8:1 to >99:1 of anti-Markovnikov: Markovnikov product). Initially, styrene derivatives were evaluated with the optimal conditions (6a-60, 6r and 6u). The electronic effect of the substituents was explored by varying para-substituents of styrene (6b, 6e-6i, 61, 60 and 6r). In general, electron-rich styrenes seems to be superior substrates (6b, 6e-6g), which produce the hydrosilylation products with higher yields comparing with the electron-deficient ones (6h, 6i, 61, 60 and 6r). The regioselectivity of reaction was largely independent of electronic properties, and most of the products were observed with >10:1 regioselectivity, although some specific substrates gave the products with lower selectivities (6f, 60, 6r). Meta-substitutions were well-tolerated in the transformation and maintained the reaction performances (6c, 6j, 6m, 6u). In contrast, changing from para- to ortho-substitution resulted in lower yields but higher anti-Markovnikov selectivity, presumably due to the steric effects imparted by an ortho-substituent (6d, 6k). A substrate bearing a fused aromatic ring (6n) also proved to be amenable to these reaction conditions and affords the corresponding product with satisfactory results. Next, a broad range of aliphatic alkenes were examined with modified conditions (6p, 6q, 6s, 6t and 6v-6ah). Regardless of the nature of functional groups in the substrates, a uniformly excellent regioselectivity was obtained. Specifically, a series of synthetically useful functionalities, such as, borate, epoxy, acetal and ester groups, showed good tolerance to the reaction conditions (60-6t). It is noteworthy that chemoselective hydrosilylation was possible (6u-6aa) and silylated products were readily obtained without affecting the internal alkene groups.

To further demonstrate the robustness of the catalyst, a gram-scale reaction was conducted with 2% catalyst loading under air and higher yield (1.2 g, 75%) was observed comparing the aforementioned reaction (FIG. 2).

Scheme 3. Cobalt-catalyzed, anti-Markovnikov-selective, hydrosilylation of olefins[a]

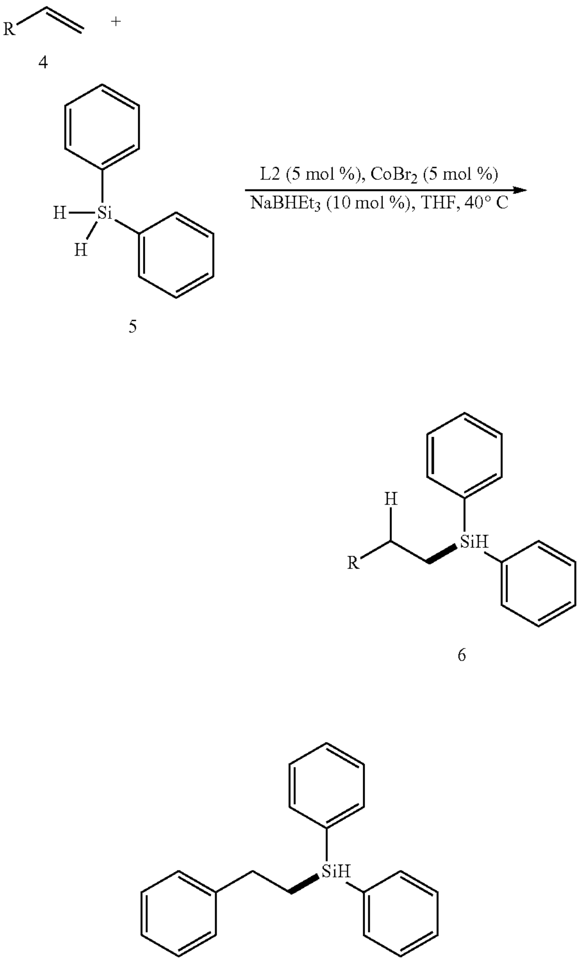

4 5 6

6a

84%, r.r. 24/1

-continued
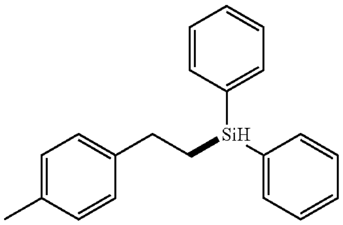
6b
80%, r.r. 11/1
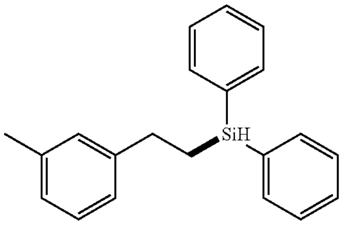
6c
78%, r.r. 11/1
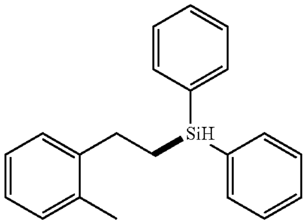
6d
74%, r.r. 29/1
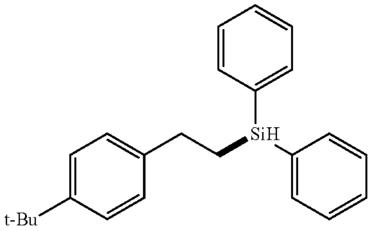
6e
86%, r.r. 14/1
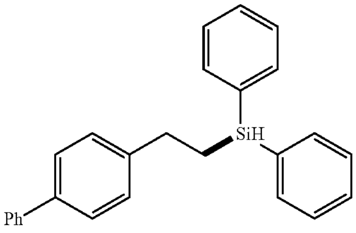
6f
91%, r.r. 9/1
-continued
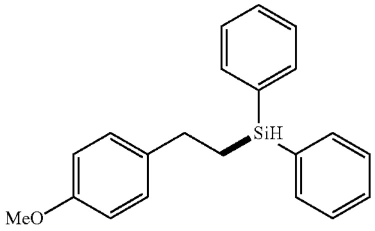
6g
91%, r.r. 19/1[b]
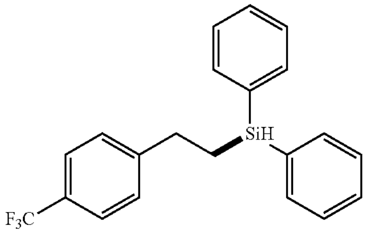
6h
67%, r.r. 14/1[b]
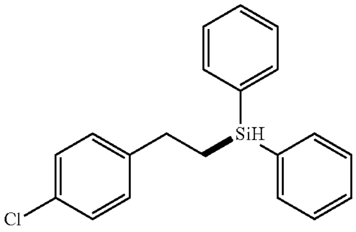
6i
70%, r.r. 16/1
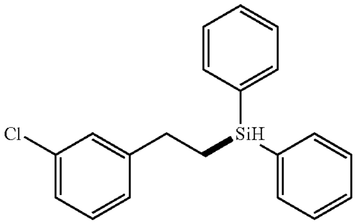
6j
72%, r.r. 13/1
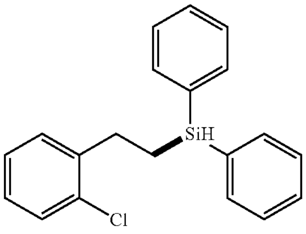
6k
51%, r.r. 32/1

-continued
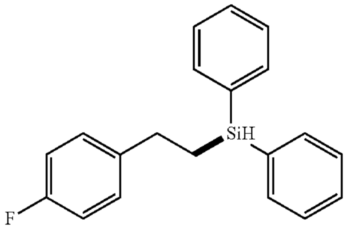
6l
72%, r.r. 22/1
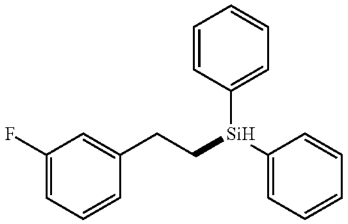
6m
77%, r.r. 15/1
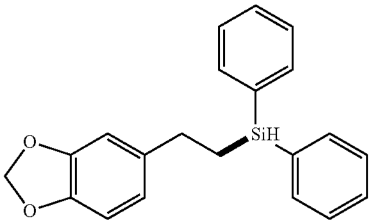
6n
70%, r.r. 12/1[b]
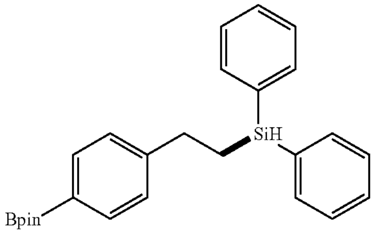
6o
71%, r.r. 8/1
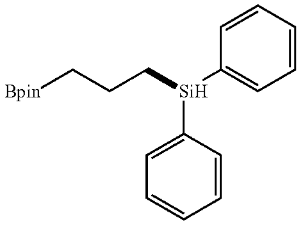
6p
71%, r.r >99/1[c]
-continued
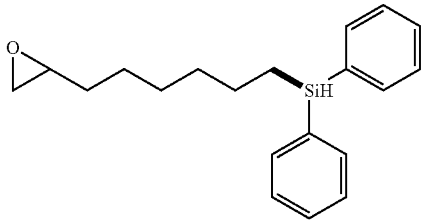
6q
69%, r.r >99/1[c]
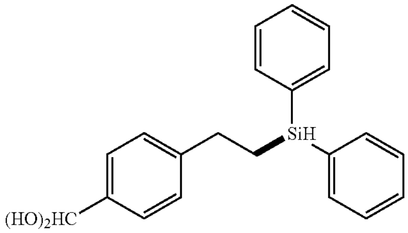
6r
65%, r.r. 10/1[b]
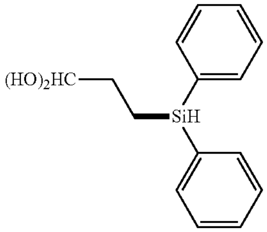
6s
62%, r.r >99/1[c]
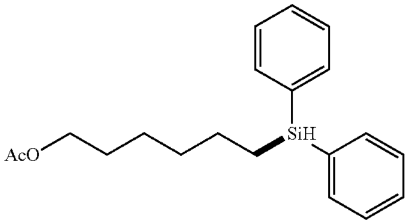
6t
61%, r.r >99/1[c]
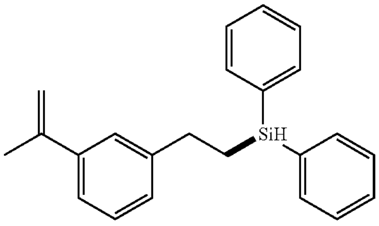
6u
70%, r.r. 22/1

-continued
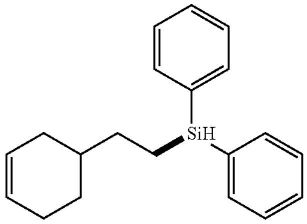
6v
81%, r.r >99/1[c]
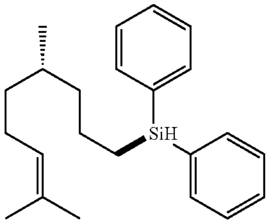
6w
65%, r.r >99/1[c]
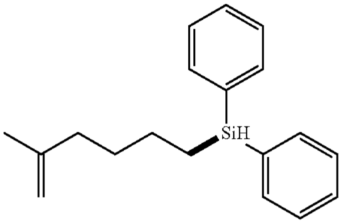
6x
64%, r.r >99/1[c]
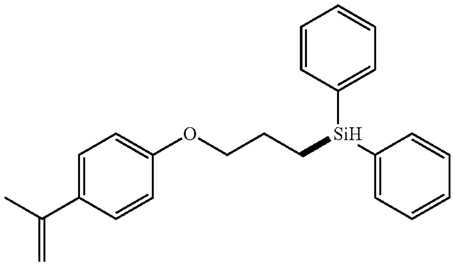
6y
84%, r.r >99/1[c]
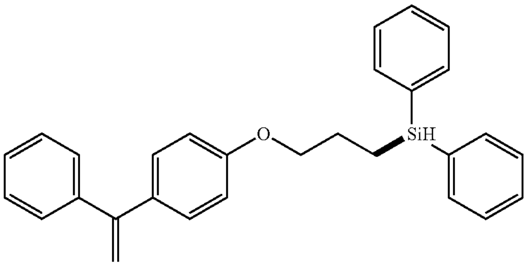
6z
76%, r.r >99/1[c]
-continued
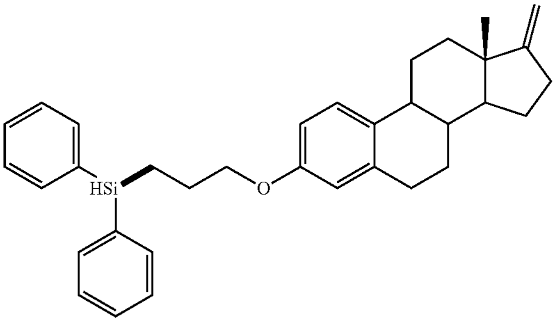
6aa
68%, r.r >99/1[c]
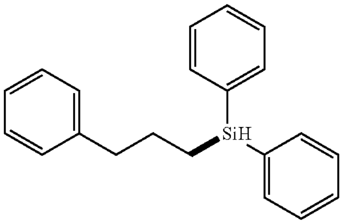
6ab
82%, r.r >99/1[c]
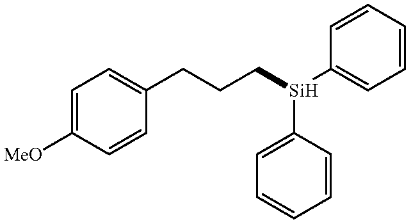
6ac
93%, r.r >99/1[c]
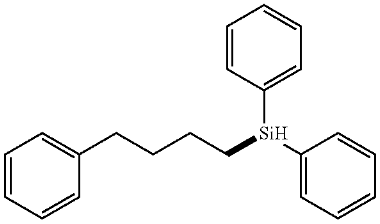
6ad
76%, r.r >99/1[c]
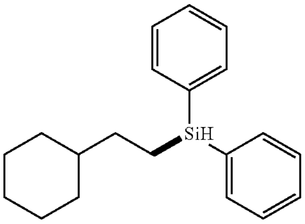
6ae
79%, r.r >99/1[c]

-continued

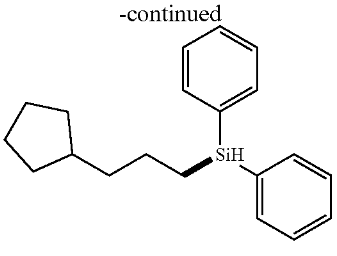

6af
70%, r.r >99/1[c]

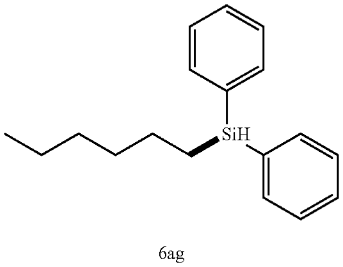

6ag
63%, r.r >99/1[c]

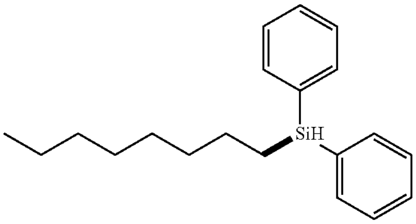

6ah
65%, r.r >99/1[c]

[a]The reaction of 4 (0.3 mmol) with 5 (0.45 mmol) was performed in the presence of $CoBr_2$ (5 mol %), L2 (5 mol %) and $NaBHEt_3$ (10 mol %) in THF (1 mL) at 40° C. under argon for 24 h (Condition I, for details see supporting information).
[b]L3 was used as a ligand.
[c]NaO$^t$Bu was used as an activator.

Iron-catalyzed hydrosilylation of alkenes. The inventors conducted optimization by using styrene (4a) and diphenylsilane (5) as pilot substrates. After screening various ligands and solvents, the iron catalyst (L1-$FeBr_2$) in combination with activator NaO$^t$Bu was identified as the optimal conditions. Remarkably, regioselectivity could be reversed when the iron analog was employed;[18] Markovnikov product 7a was obtained in 97% yield and >99:1 regioselectivity. Subsequently, the substrate scope of iron-catalyzed Markovnikov hydrosilylation with the optimal conditions (Scheme 4) was investigated.[18,31] Consistent with the results of cobalt-catalyzed hydrosilylation, higher efficiency (73-99% yields) was observed in the cases of electron-rich styrenes (7b-7f) comparing with electron-deficient ones (7g-7j). Remarkably, this novel protocol was well compatible with the highly electron-donating $NMe_2$ group (7f), which might disturb the coordination of iron catalyst as a coordinate site. This method was also extended to fused ring and heterocycle (7k, 7l), producing the corresponding products with moderate yields and good regioselectivities. As well as para-substitution, meta- and ortho-substituted styrenes could proceed smoothly in the reaction and provided the hydrosilylation products with relative satisfactory results (7m-7p). It is important to underline the high chemoselectivity of the hydrosilylation as internal alkene was not altered in the reaction (7o). Sterically bulky substrate vinylmesitylene was amenable to the Markovnikov hydrosilylation, albeit with a diminished yield (7q). However, aliphatic alkenes failed in the reaction, which could only furnish traces of anti-Markovnikov products.

Scheme 4. Iron-catalyzed, Markovnikov-selective, hydrosilylation of olefins

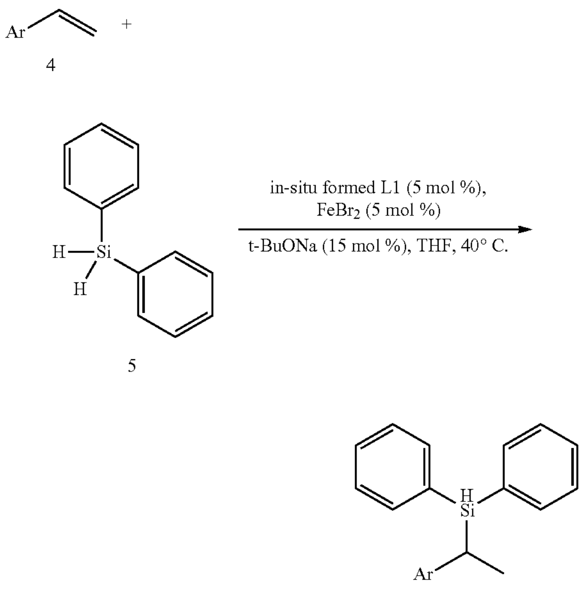

4
5
7

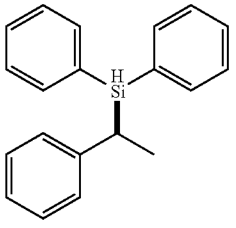

7a
97% yield, r.r. >99/1

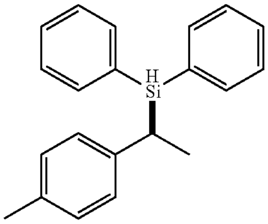

7b
97% yield, r.r. = 30/1

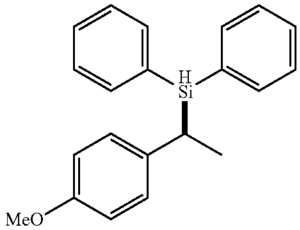

7c
99% yield, r.r. = 39/1

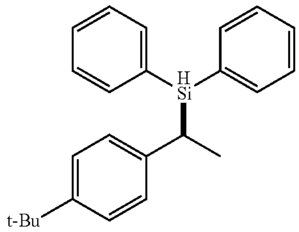

7d
98% yield, r.r. >99/1

-continued

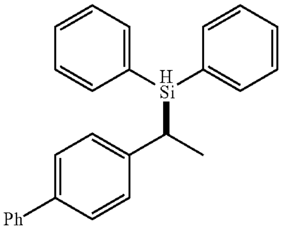

7e
73% yield, r.r. = 71/1

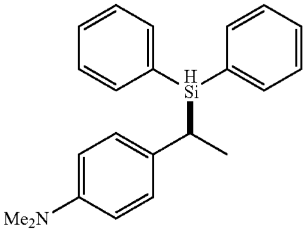

7f
99% yield, r.r. >99/1

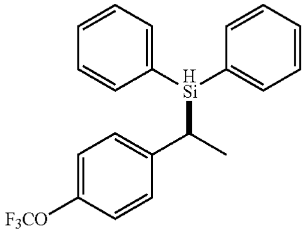

7g
50% yield, r.r. = 75/1[b]

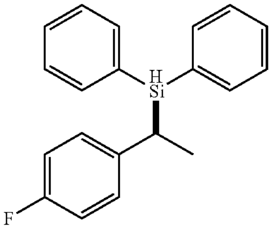

7h
93% yield, r.r. = 37/1[b]

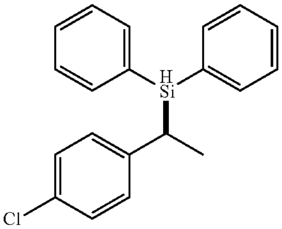

7i
56% yield, r.r. = 71/1[b]

-continued

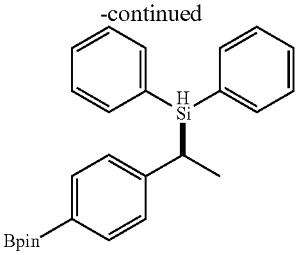

7j
46% yield, r.r. = 96/1[b]

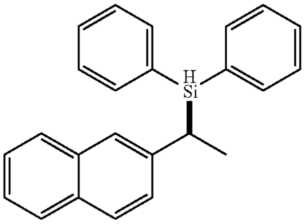

7k
71% yield, r.r. = 19/1

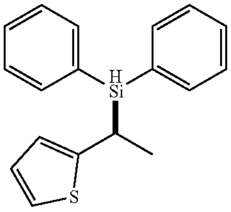

7l
62% yield, r.r. >99/1

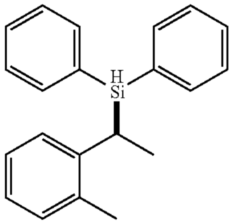

7m
70% yield, r.r. = 28/1

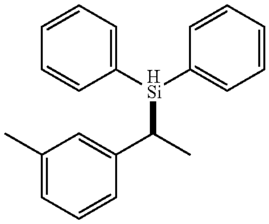

7n
99% yield, r.r. >99/1

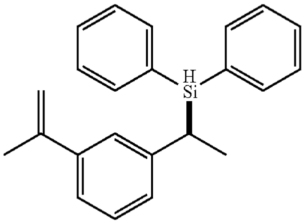

7o
87% yield, r.r. >99/1

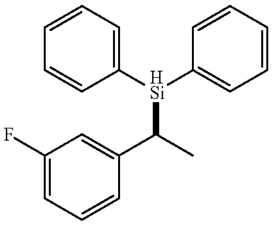

7p
57% yield, r.r. = 41/1[b]

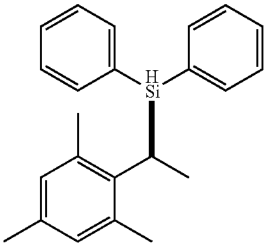

7q
30% yield, r.r. >99/1

[a]The reaction of 4 (0.3 mmol) with 5 (0.9 mmol) was performed in the presence of $FeBr_2$ (5 mol %), in-stiu formed L1 (5 mol %) and NaO$^t$Bu (15 mol %) in THF (1 mL) at 40° C. for 24 h (Condition IV, for details see supporting information).

[b]L2 was used as a ligand, NaO$^t$Bu (25 mol %) was used as an activator, 1,4-dioxane was used as solvent.

The elaboration of Markovnikov product (7a) was then conducted to demonstrate its synthetic utility (Scheme 5).[31] Potential applications of Markovnikov-selective olefin hydrosilylations include the conversion of readily available olefin substrates into synthetically important secondary alcohols. Thus, the inventors explored the Fleming-Tamao oxidation as a classical route to oxidize silanes to alcohols; by varying equivalents of reagents and reaction temperature the extent of oxidation could be controlled. At lower equivalents of KF and $KHCO_3$ a silanol product (8) could be obtained at room temperature, while the full oxidative hydrolysis product 1-phenylethan-1-ol (9) could be accessed via use of increased equivalents KF and $KHCO_3$ and at an elevated temperature. Finally, a transition-metal-free fluorination of silane was exploited, which provides mild route to fluorosilane (10).

Scheme 5. Elaboration of Markovnikov product (7a)

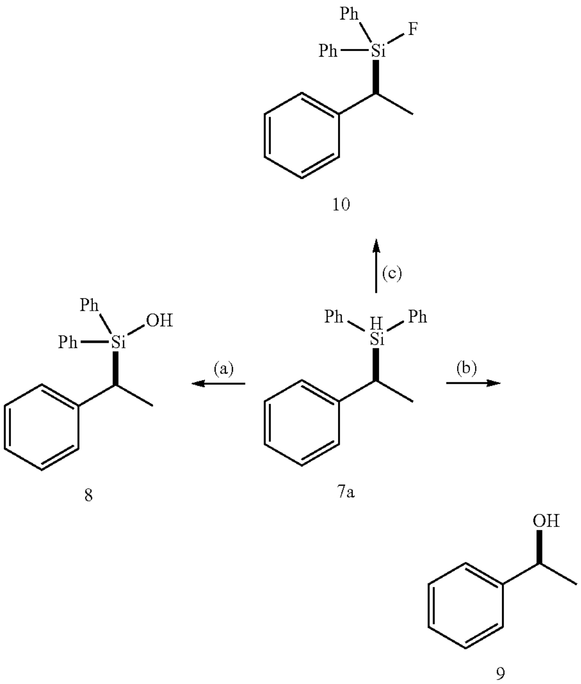

10, 8, 7a, 9

(a) $H_2O_2$ (30% aq), $KHCO_3$ (4 equiv.), KF (4 equiv.), MeOH/THF, rt
(b) $H_2O_2$ (30% aq), $KHCO_3$ (8 equiv.), KF (5 equiv.), MeOH/THF, 50 °C
(c) Selectfluor (2.4 equiv.), $K_2CO_3$ (1.2 equiv.), $CH_3CN$, 50 °C Mechanistic Study. By way of explanation, and in no way a limitation of the present invention, extensive studies of the mechanism of these transformations using both experimental and computational techniques were used. To gain insight into the hydrosilylation mechanism, deuterium labeling and kinetic isotope effect (KIE) experiments were conducted (Schemes 6a, 6b). As shown in the deuterium labeling experiments, extensive deuterium incorporation (100%) at the C2 position: was detected in the anti-Markovnikov product 6a-$d_{2.5}$ (Scheme 6a). Iron-catalyzed hydrosilylation of 4a with deuterated diphenylsilane 5-$d_2$ was also explored. In contrast to the results of cobalt-catalyzed hydrosilylation, product 7a-$d_2$ was obtained without deuterium incorporation at the C1 position. These observations strongly argue for the formation of a cobalt deuteride/hydride and against a similar species in the case of iron in the catalytic cycle. The presence of such intermediates would lead to facile H/D exchange between M-D and C—H bonds through reversible olefin insertion into the M-D bond.[18, 32-33] The KIE study of the cobalt- and iron-catalyzed hydrosilylation showed sharp differences in the ratio of $k_H/k_D$ (2.3/1 vs 1/1). This result further illustrates that distinct pathways are involved in the regioselectively-divergent transformations.

Schemes 6a and 6b. Deuterium labeling experiment and KIE studies.

a) Deuterium Labeling Experiment

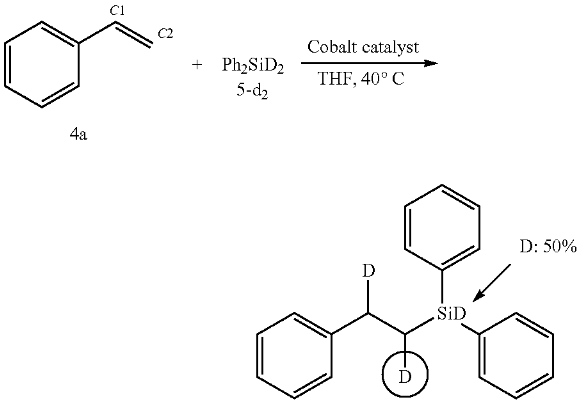

4a

6a-$d_{2.5}$

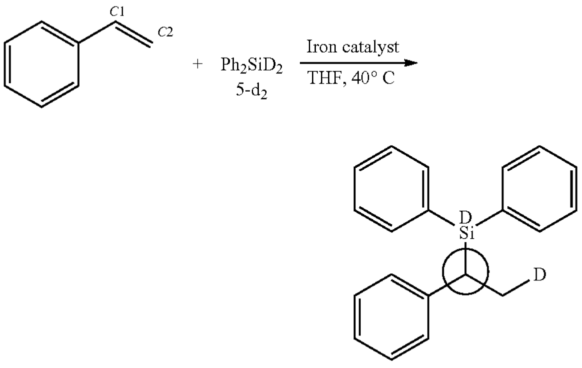

7a-$d_2$

KIE Study

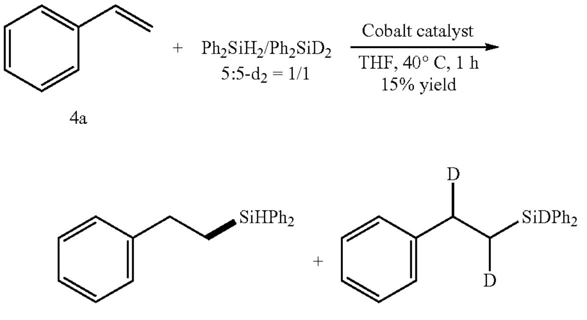

4a 6a, 6a-$d_3$

6a:6a-$d_3$ = 2.3:1

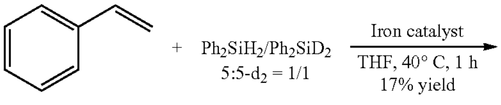

4a

-continued

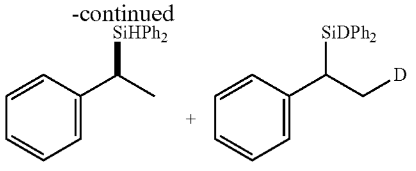

7a 7a-$d_2$

7a/7a-$d_2$ = 1/1

On the basis of the KIE and deuterium labeling experiments and related mechanistic studies,[18,21,31] divergent catalytic pathways were proposed to rationalize the complementary regioselectivity (FIGS. 3A and 3B). As depicted in FIG. 3A, cobalt catalyst is transformed in-situ into a Co—H species (I) in the presence of $NaHBEt_3$. Styrene undergoes 1,2-insertion into the Co—H bond of I, which is the origin of the anti-Markovnikov regioselectivity. The resulting intermediate Int-Co proceeds via the rate-determining Si-migration step to regenerate the active Co—H catalyst. In contrast, iron-catalyzed hydrosilylation is initiated by an Fe—Si intermediate (II), and styrene inserts into an Fe—Si bond via a 1,2-insertion process giving Int-Fe (FIG. 3B). The same insertion mode in both catalytic cycles might be attributed to the similar catalyst structure shown in the FIG. 1. Finally, diphenylsilane reacts with the intermediate species Int-Fe affording the Markovnikov product 7a via hydride insertion and regeneration of II.

The inventors prepared a series of iron and cobalt alkene hydrosilylation catalysts bearing amine-iminopyridine ligands which incorporate a phosphoramide (GAP) group. It proved possible to switch the regioselectivity of olefin hydrosilylations from >99:1 to <1:99 by simply changing the metal center from cobalt to iron. Non-precious metal-based catalysts such as these deliver a number of advantages over traditional (precious metal) systems: highly efficient, mild reaction conditions, and broad functional group tolerance with a divergent and high level of regioselectivity.

General procedure for cobalt-catalyzed hydrosilylation. Inside an argon-atmosphere glovebox, a borosilicate glass vial was charged with $CoBr_2$ (3.2 mg, 0.015 mmol) and L2 (8.1 mg, 0.015 mmol), with anhydrous THF (1 mL) as solvent. Subsequently, $NaBHEt_3$ (30 μL) (1 mol/L in THF) was added as activator. The resulting mixture was stirred at room temperature for 5 hours to form the active catalyst. Subsequently, diphenylsilane 5 (84 μL, 0.45 mmol, 1.5 equiv.) was added and the mixture was stirred for 30 min before adding styrene 4a (34 μL, 0.3 mmol). The reaction mixture was removed from the glovebox and stirred at 40° C. under an argon atmosphere for 24 hours. The reaction solvent was evaporated in vacuum and the resulting residue was purified by silica gel column chromatography (hexane followed by diethyl ether/hexane=1/200) affording 73 mg (84% yield) product 6a as colorless oil.

General procedure for iron-catalyzed hydrosilylation. Inside an argon-atmosphere glovebox, a borosilicate glass vial was charged with $FeBr_2$ (3.2 mg, 0.015 mmol), 3*a* (5.3 mg, 0.015 mmol), picolinaldehyde (1.4 μL, 0.015 mmol) and $^t$BuONa (4.3 mg, 0.045 mmol), with anhydrous THF (1 mL) as solvent. The resulting mixture was stirred at room temperature for 5 hours to form the active catalyst. Subsequently, diphenylsilane 5 (167 μL, 0.9 mmol, 3.0 equiv.) was added and the mixture was stirred for 30 min before adding styrene 4a (34 μL, 0.3 mmol). The reaction mixture was removed from the glovebox and stirred at 40° C. under an argon atmosphere for 24 hours. Then the reaction solvent was evaporated in vacuum and the resulting residue was purified by silica gel column chromatography (hexane followed by diethyl ether/hexane=1/200) affording 84 mg (97% yield) product 7a as colorless oil.

Example 2. Cobalt (II)-Catalyzed Stereoselective Olefin Isomerization: Facile Access to Acyclic Trisubstituted Alkenes Stereoselective synthesis of trisubstituted alkenes is a long-standing challenge in organic chemistry, due to the small energy differences between E and Z isomers of trisubstituted alkenes (compared with 1,2-disubstituted alkenes). Transition metal-catalyzed isomerization of 1,1-disubstituted alkene can serve as an alternative approach to trisubstituted alkenes, but it remains underdeveloped owing to issues relating to reaction efficiency and stereoselectivity. The inventors have developed a novel cobalt catalyst that overcomes these challenges and provides an efficient and stereoselective access to a broad range of trisubstituted alkenes. This protocol is compatible with both mono- and dienes and exhibits a good functional group tolerance and scalability. Moreover, it is a useful tool to construct organic luminophores and a deuterated trisubstituted-alkene. A preliminary study of the mechanism suggests a cobalt-hydride pathway is involved in the reaction. The high stereoselectivity of the reaction is attributed to both a x-T stacking effect and the steric hindrance between substrate and catalyst.

Trisubstituted alkenes are widely distributed in molecules of great interest: natural products, pharmaceuticals and organic materials.[1] Moreover, they are versatile building blocks in synthetic organic chemistry.[2] Consequently, the stereoselective synthesis of trisubstituted alkenes has received a great deal of attention.[3] The Wittig reaction is regarded as a classical and direct approach towards olefin synthesis, however typically only limited stereoselectivity can be achieved in the case of trisubstituted alkenes.[4] In this context, a more general method to access (stereoselectively) trisubstituted olefins is still highly desirable.

Transition metal-catalyzed alkene isomerization has emerged as a fundamental and atom-economic transformation, which can readily convert terminal alkenes to internal alkenes.[5] Prior reports of alkene isomerization usually rely on noble metals, such as, ruthenium, rhodium, palladium, iridium and platinum.[6] Owing to the low abundance and high toxicity of these precious metals, attention has recently been shifting towards base-metal alternatives.[5i] The past few decades have witnessed tremendous progress in this field, particularly in cobalt-catalyzed olefin isomerization. For example, impressive work in Z-selective alkene isomerization was disclosed by Holland and Weix (Scheme 7a).[7] In the same year, a radical triggered isomerization and cycloisomerization was reported by Shenvi employing a Co-salen catalyst (Scheme 7b).[8] Subsequently, Hilt and coworkers unveiled a Co-dppp catalyzed monoisomerization of 1-alkenes to (Z)-2-alkenes (Scheme 7c).[9] In another example of radical isomerization, a novel catalyst Co $(dmgBF_2)_2(THF)_2$ was reported by Norton and co-workers (Scheme 7d).[10] More recently, a kinetically controlled isomerization was achieved by the Liu group, affording the target alkenes in good to excellent regioselectivity for cyclic alkenes (Scheme 7e).[11] Despite these impressive developments, the stereoselective alkene isomerization geared towards the synthesis of acyclic trisubstituted alkenes remains a challenging transformation.

Schemes 7a to 7e. Cobalt-catalyzed alkene isomerization of the prior art a. Holland and Weix's Work

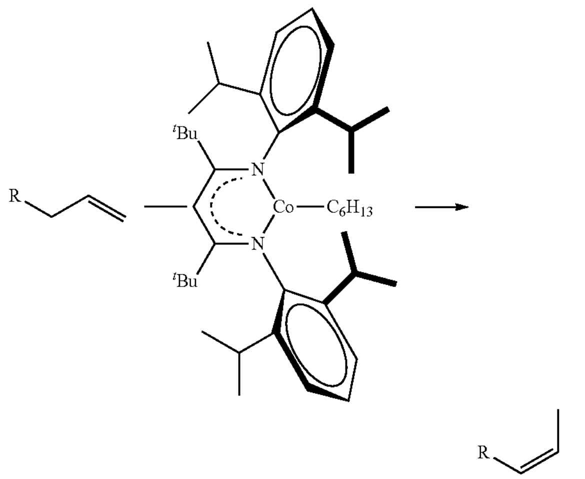

up to 9.1/1 (Z/E)
16 examples b. Shenvi's Work

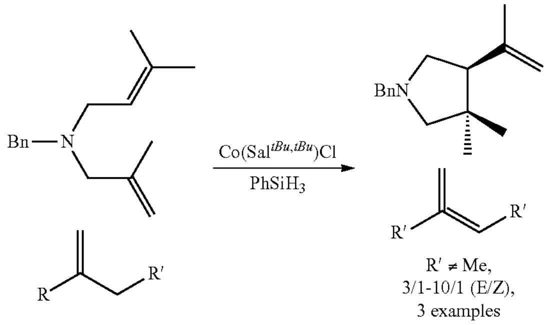

c. Hilt's Work

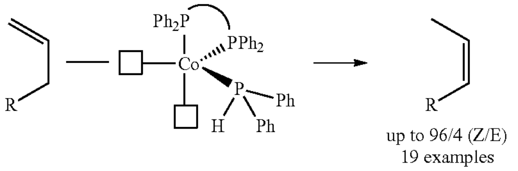

up to 96/4 (Z/E)
19 examples d. Norton's Work

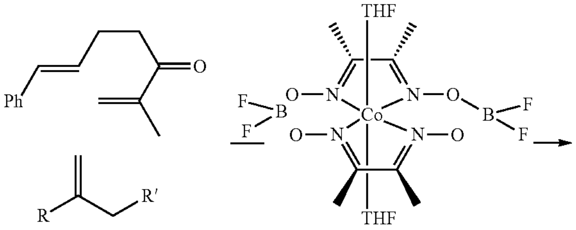

-continued

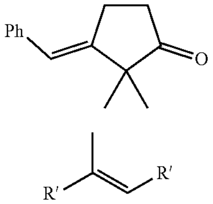

8 examples, >77/23 (E/Z)

e. Liu's Work

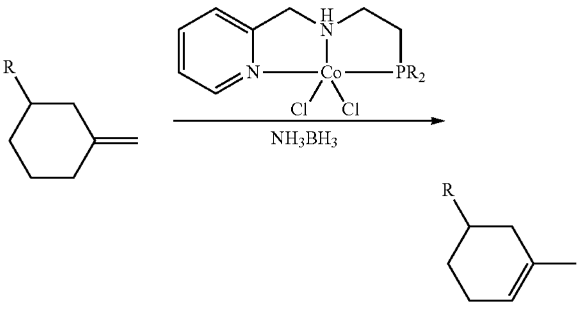

cyclic alkenes:
regioselectivity
up to >99/1
acyclic alkenes:
1/1-3/1 (E/Z)

Low reaction efficiency and poor stereoselectivity are significant problems in alkene isomerization. These issues can be rationalized using the two major proposed reaction pathways:[5i,12] a) H radical initiated isomerization (Scheme 8a); b) metal-hydride involved isomerization (Scheme 8b). In the radical pathway, hydrogen atom transfer (HAT) should be a facile step due to formation of a stable radical, however, hydrogen abstraction can occur with less stereocontrol under a radical pathway as shown in the work of Shenvi and Norton (Scheme 8a).[8,10] In contrast, the alkene insertion step, in the metal-hydride triggered isomerization, can be sluggish owing to the high-energy barrier associated with formation of a quaternary metal-carbon intermediate (Scheme 8b).[13] Moreover, thermodynamically, the energy differences between E and Z isomers of trisubstituted alkene are much smaller compared with 1,2-disubstituted alkenes.[14] In this context, developing a stereoselective metalloradical catalyst or a robust metal-hydride catalyst would prove key in mitigating these problems.

Schemes 8a and 8b. Typical mechanisms for olefin isomerization of the prior art compared to the strategy of the present invention.

a. H' Radical Initiated Isomerization

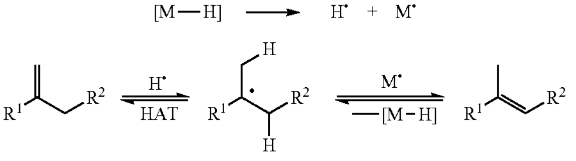

Stereoselectivity issue b. Metal-Hydride Involved Isomerization

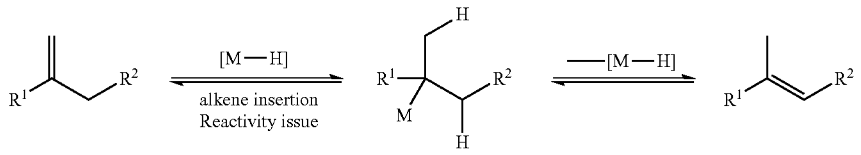

c. Our Work

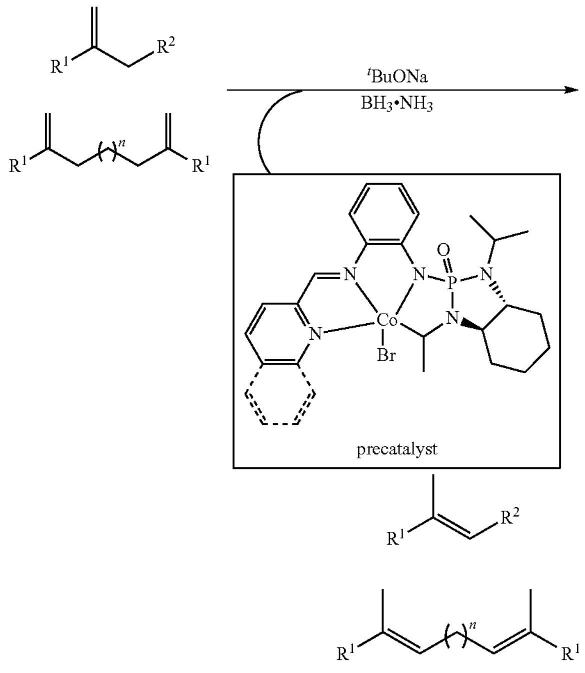

44 examples up to 98% yield up to 130/1 (E/Z)

The present inventors have further development of a novel Co-hydride catalyst by incorporating phosphamide group[16] into the ligand (Scheme 8c). The in-situ generated metal-hydride catalyst could readily facilitate challenging isomerizations to afford a wide range of trisubstituted alkenes and dienes (44 examples) with up to 98% yield and 130/1 (E/Z) stereoselectivity. Interestingly, some of the trisubstituted alkenes were observed to display aggregation-induced emission enhancement. Thus, the present approach can provide material scientists a potent tool to construct functional trisubstituted-alkenes. Additionally, a deuterium labelled trisubstituted-alkene can be readily obtained with this protocol, which might be useful in pharmaceuticals.[17]

Catalyst Screening. At the outset, a-ethylstyrene (1a) was selected as a model substrate with which to optimize the isomerization conditions (Table 2). It was found that the best results were obtained when L1 was employed as a ligand with $CoBr_2$ as metal salt, ${}^tBuONa$ as activator and $BH_3 \cdot NH_3$ as a hydride source (Entry 1). Any deviation from the optimal conditions shut down the reaction (Entries 2-5). These results indicate that all these components are crucial for the reaction. In a control experiment, it was demonstrated that ${}^tBuONa$ does not promote the reaction (Entry 6), which precludes the possibility of a base-mediated isomerization. Replacing L1 with L2 or L3 led to lower stereoselectivity (Entries 7-8). Inferior results were obtained by varying hydride source and solvents (Entries 9-10). The important role of $BH_3 \cdot NH_3$ and toluene might be attributed to the poor solubility of $BH_3 \cdot NH_3$ in toluene, which enables a slow release of hydride. Use of ${}^tBuOK$ in place of ${}^tBuONa$ afforded moderate yield and E/Z selectivity.

TABLE 2

Optimization of colbalt-catalyzed isomerization of α-ethylstyrene[a]

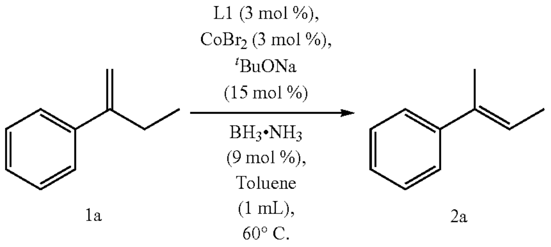

1a 2a

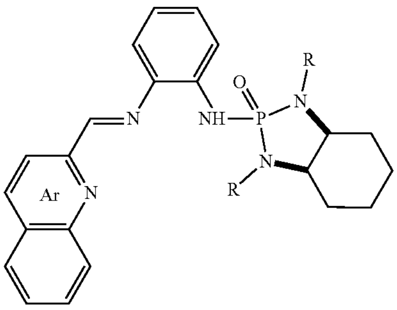

R = i-Pr Ar = Py L1
Ar = Quinoline, L2
Ar = Py R = Bn, L3

| Entry | Changes from standard conditions | Yield (%)[b] | E/Z[c] |
|---|---|---|---|
| 1 | None | 95 | 104/1 |
| 2 | Removal of $CoBr_2$ | trace | n.d. |
| 3 | Removal of ${}^tBuONa$ | trace | n.d. |
| 4 | Removal of $BH_3 \cdot NH_3$ | trace | n.d. |
| 5 | Removal of L1 | 12 | 5/1 |
| 6 | Only using ${}^tBuONa$ as catalyst | trace | n.d. |
| 7 | L2 was used as ligand | 96 | 11/1 |
| 8 | L3 was used as ligand | 96 | 38/1 |
| 9 | $PhSiH_3$ was used as 'H' source | 62 | 8/1 |
| 10 | THF was used as solvent | 87 | 11/1 |
| 11 | ${}^tBuOK$ was used as activator | 68 | 7/1 |

[a]The reaction of 1a (0.5 mmol) was performed in the presence of $CoBr_2$ (0.015 mmol, 3 mol %), L (0.015 mmol, 3 mol %), ${}^tBuONa$ (0.075 mmol, 15 mol %) and $BH_3 \cdot NH_3$ (0.045 mmol, 9 mol %) in solvent (1 mL) at 60° C. for 12 h under argon.

[b]Isolated yield.

[c]The ratio of E/Z was determined by the $^1H$ NMR of crude product.

To place the performance of the cobalt complex in the proper context, a comparison was carried out with other cobalt catalysts known to effect olefin isomerization. All cobalt-based catalysts were examined using a common substrate, 1a (Table 3). As shown in Table 2, low catalytic efficiency was observed in the cases of Cat. 1, Cat. 2 and Cat. 3 (Entries 1-3), although an excellent E/Z selectivity (>100/1) was detected in the case of Cat. 1. In contrast, Cat. 4 and Cat. 5 served as efficient catalysts and afforded the isomerized product 2a with good yields (94% and 92%, respectively, Entries 4-5). However, both catalysts suffered from reduced stereoselectivity, especially in the case of Cat. 4 (10/1). Thus, it seemed like Cat. 4 and Cat. 5 were promising alternatives. However, in moving from the model substrate to a-benzylstyrene (data in parentheses of entries 4-6), it was found that the isomerization proceeded with a lower stereoselectivity (6/1) and lower yield (54%) in the presence of Cat. 4 and Cat. 5, respectively. These results herein highlight the unique advantage of the novel cobalt catalyst (Entry 6) of the present invention.

TABLE 3

Performance of known cobalt catalysts in olefin isomerization

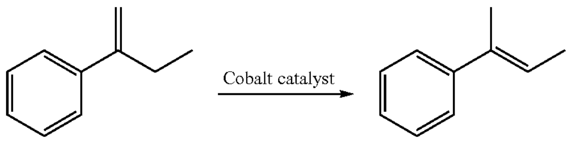

1a 2a

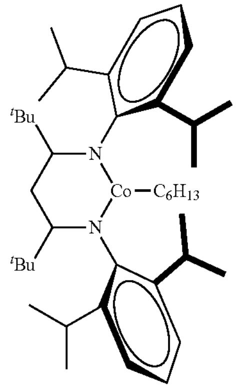

Cat. 1

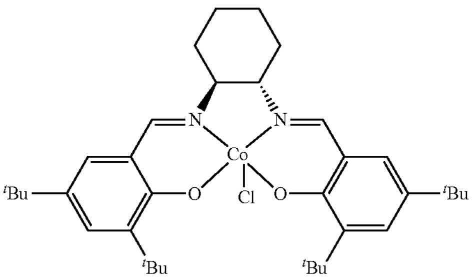

Cat. 2

TABLE 3-continued

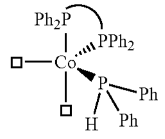

Cat. 3

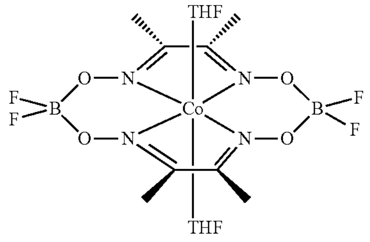

Cat. 4

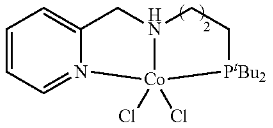

Cat. 5

| Entry | Standard conditions | Yield (%)[a] | E/Z[b] | Ref. |
|---|---|---|---|---|
| 1 | Cat. 1 (5 mol %), 0.5 mL benzene, 80° C., 48 h | 23 | >100/1 | 7 |
| 2 | Cat. 2 (5 mol %), PhSiH3 (10 mol %), 5 mL benzene, rt 24 h | 19 | 6/1 | 8 |
| 3 | Cat. 3: dppp (10 mol %), $CoBr_2$ (10 mol %), Zn (20 mol %), $ZnI_2$ (20 mol %), $Ph_2PH$ (5 mol %), 0.5 mL DCM, 48 h | trace | n.d. | 9 |
| 4 | Cat. 4 (7 mol %), 6 atm hydrogen, 1 mL benzene, 50° C., 48 h | 94% (97%)[c] | 10/1 (6/1)[c] | 10 |
| 5 | Cat. 5 (1 mol %), $BH_3$•$NH_3$ (10 mol %), 1 mL MeOH, rt, 3 h | 92% (54%)[c] | 49/1 (30/1)[c] | 11 |
| 6 | optimal conditions | 95% (93%)[c] | 104/1 (33/1)[c] | |

[a]Isolated yield.
bThe ratio of E/Z was determined by the $^1H$ NMR of crude product.
[c]The data in parentheses was obtained using α-benzylstyrene as a substrate.

Substrate Scope. With these optimized conditions in hand, various geminal disubstituted alkenes were synthesized and screened in isomerization chemistry (Scheme 9). Initially, a series of alkyl groups ($R^2$) were investigated (1a-1g) and the corresponding products were obtained with slightly lower yields and ≥15/1 E/Z selectivities. Remarkably, 2-norbornaneacetic acid and 5β-cholanic acid derived alkenes underwent the reaction smoothly to afford the products (2f-2g) with high stereocontrol. Subsequently, various a-ethylstyrenes were explored under optimized conditions, and uniformly good results were observed regardless of the electronic properties or substitution patterns (2h-2n). It was particularly noteworthy that a bromine substituent was well tolerated under this protocol without giving rise to any dehalogenation products (2n). To further evaluate the substrate scope, the inventors tested a large number of diaryl-substituted alkenes (2o-2ah), which could provide more conjugated trisubstituted alkenes. Gratifyingly, increased reaction performance was observed among these substrates in terms of both yields (up to 98%) and stereoselectivity (up to 112/1) (2o-2ah). Moreover, some reactive functional groups (2af-2ag), such as, heteroarenes, amines and ester groups proved to be suitable in the reaction, albeit with a lower yield and selectivity. However, the ester group did lead to a reduced reaction performance (2ah). This might be attributed to the relative ease of reduction of the ester under reaction conditions which generate a highly reactive metal-hydride species. Finally, cyclic alkenes were also found to be amenable substrates (2ai-2ak). Specifically, high regioselectivity (29/1) was observed in the case of substrate 1ak and the thermodynamically stable product was obtained as the major product.

Scheme 9. Scope of monoenes in isomerization chemistry

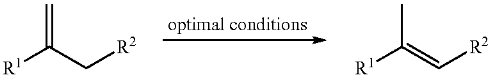

1

2
34 examples

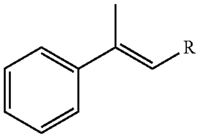

R = Me, 2a, 95% yield, E/Z = 107/1[a]
R = Et, 2b, 80% yield, E/Z = 28/1[a]
R = $^{n}$-Pr, 2c, 84% yield, E/Z = 38/1[a]
R = Bn, 2d, 81% yield, E/Z = 35/1[b]

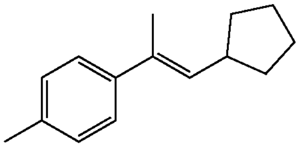

2e, 85% yield, E/Z = 130/1[b]

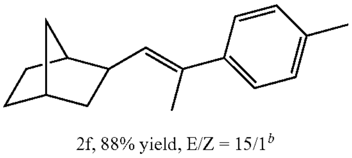

2f, 88% yield, E/Z = 15/1[b]

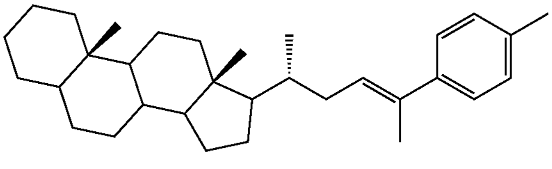

2g, 89% yield, E/Z = 24/1[c]

-continued

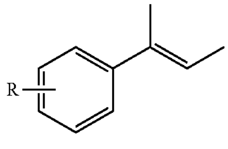

R = 4-Me, 2h, 89% yield, E/Z = 25/1[a]
R = 4-OMe, 2i, 87% yield, E/Z = 20/1[b]
R = 4-F, 2j, 83% yield, E/Z = 21/1[a]
R = 2,3-F, 2k, 85% yield, E/Z = 76/1[b]
R = 4-Cl, 2l, 93% yield, E/Z = 18/1[b]
R = 3-Cl, 2m, 96% yield, E/Z = 79/1[a]
R = 4-Br, 2n, 96% yield, E/Z = 14/1[a]

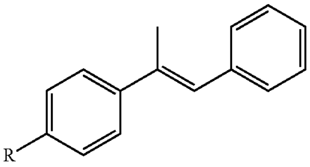

R = H, 2o, 97% yield, E/Z = 61/1[b]
R = Me, 2p, 96% yield, E/Z = 90/1[b]
R = $^{t}$Bu, 2q, 86% yield, E/Z = 78/1[b]
R = Ph, 2r, 91% yield, E/Z = 49/1[b]
R = OMe, 2s, 97% yield, E/Z = 53/1[b]
R = F, 2t, 90% yield, E/Z = 48/1[b]
R = Cl, 2u, 94% yield, E/Z = 21/1[b]

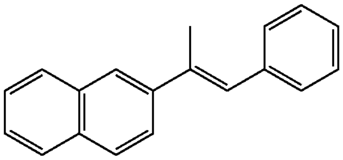

2v, 98% yield, E/Z = 107/1[b]

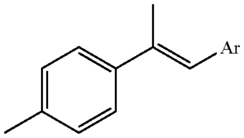

Ar = 1-Naphth, 2ad, 94% yield, E/Z = 48/1[b]
Ar = 2-Naphth, 2ae, 87% yield, E/Z = 87/1[b]

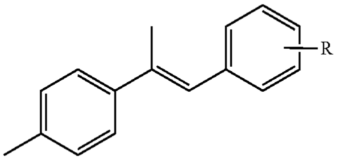

R = 4-Me, 2w, 81% yield, E/Z = 36/1[b]
R = 2-Me, 2x, 91% yield, E/Z = 111/1[b]
R = 3-Me, 2y, 95% yield, E/Z = 112/1[b]
R = 4-Ph, 2z, 91% yield, E/Z = 90/1[b]
R = 4-OMe, 2aa, 89% yield, E/Z = 71/1[b]
R = 4-F, 2ab, 90% yield, E/Z = 54/1[b]
R = 4-Cl, 2ac, 97% yield, E/Z = 58/1[b]

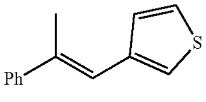

2af, 95% yield, E/Z = 33/1[c]

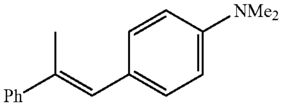

2ag, 76% yield, E/Z = 22/1[c]

-continued

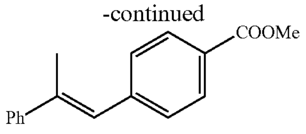

2ah

47% conversion, E/Z = 8/1[c]

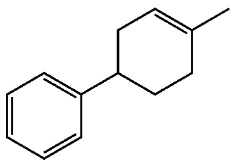

2ai, 90% yield[d]

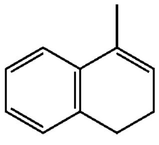

2aj, 95% yield[b]

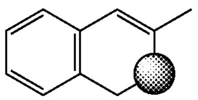

2ak, 85% yield, r.r. 29/1[b]

[a]The reaction of 1 (1 mmol) was performed in the presence of $CoBr_2$ (0.03 mmol, 3 mol %), L1 (0.03 mmol, 3 mol %), $^t$BuONa (0.15 mmol, 15 mol %) and $BH_3$•$NH_3$ (0.09 mmol, 9 mol %) in toluene (1 mL) at 60° C. for 12 h under argon.

[b]Condition II: L2 was used instead of L1.

[c]Condition III: L2 was used as ligand and 5 mol % catalyst loading was employed.

[d]Condition IV: 5 mol % catalyst loading was employed.

Compared to the isomerization of monoenes, dienes were considered as more challenging substrates in prior reports, due to undesired radical-initiated cyclization.[8,10] Under modified conditions, excellent yields and stereoselectivities were observed in both conjugated and non-conjugated diene products (2al-2ao, Scheme 10). The configuration of product 2ao was assigned using X-ray diffraction. Additionally, m- and p-phenylenediacetic acid derived dienes were also explored (2ap-2aq). Using 5 mol % catalyst loading, isomerization reactions proceeded smoothly to afford the products which containing more freely-rotating groups. Notably, a chemoselective isomerization was observed in the case of substrate 1ar and the sterically hindered terminal double bond was untouched in the reaction (2ar).

Scheme 10. Scope of dienes

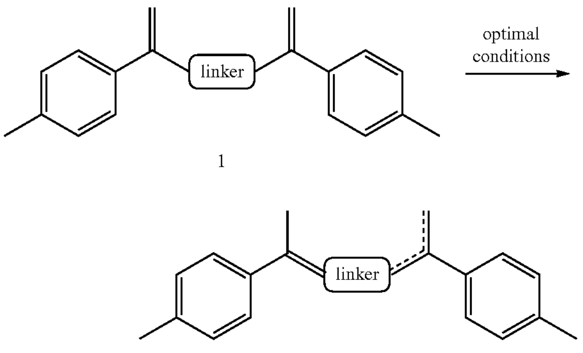

1

2

7 examples

-continued

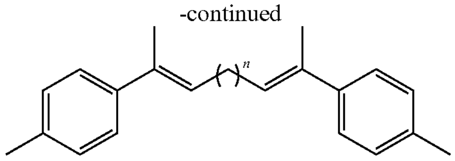

n = 8, 2al, 89% yield, E/Z = 65/1[a]

n = 2, 2am, 93%, E/Z = 34/1[a]

n = 1, 2an, 88% yield, E/Z = 26/1[a]

n = 0, 2ao, 96% yield, E/Z = 52/1[a]

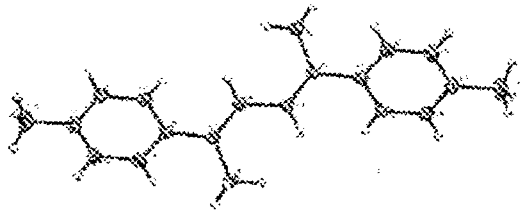

2ao

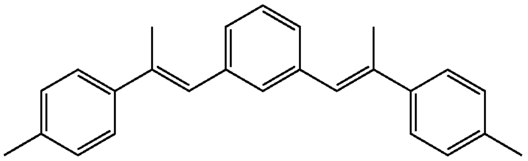

81% yield, E/Z = 52/1[b]

2ap

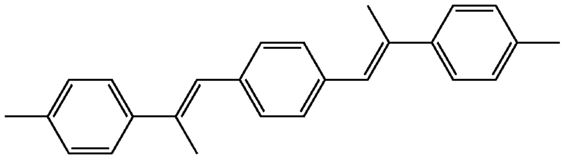

87% yield, E/Z = 16/1[b]

2aq

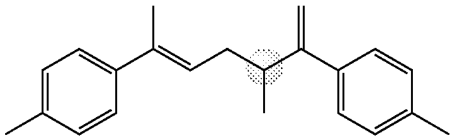

89% yield, E/Z = 52/1[a]

2ar

[a]The reaction of 1 (1 mmol) was performed in the presence of $CoBr_2$ (0.03 mmol, 3 mol %), L2 (0.03 mmol, 3 mol %), $^t$BuONa (0.15 mmol, 15 mol %) and $BH_3$•$NH_3$ (0.09 mmol, 9 mol %) in toluene (1 mL) at 60° C. for 12 h under argon.

[b]5 mol % catalyst loading was employed.

Figure 4D:
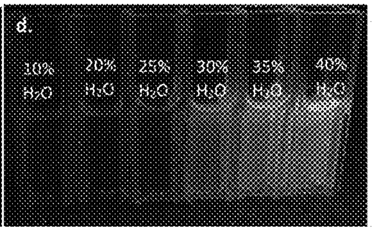

Intriguingly, some of these trisubstituted alkenes displayed promising aggregation-induced emission (AIE)[19] properties. The fluorescence images of selected examples are shown in FIGS. 4A to 4D). Remarkably, the photoluminescence (PL) quantum yields of selected solid examples range from 90.9% to 95.6%, and the emission peaks fall on the range of blue light (from 417 nm to 433 nm). To the best of the inventors' knowledge, excellent blue luminogens are still challenging to material chemists due to their large band gap.[20] These promising photophysical properties might provide an alternative tool to construct blue luminogens. As shown in FIG. 4D, increasing the fraction of water led to a stronger luminescence of 2aq solution, which clearly suggested the AIE property of the product.

To further demonstrate the synthetic utility of the approach, a deuterated substrate 1a-$D_2$, which was readily prepared through H/D exchange and Wittig reaction, was employed in the reaction to construct deuterated trisubstituted-alkene (Scheme 11a). As expected, an intramolecular deuterium transfer proceeded smoothly affording product 2a-$D_2$ with an exclusive site-selectivity (Scheme 11a). Regioselective deuteration of $sp^3$ C—H and $sp^2$ C—H is commonly regarded as a long-standing challenge.[21] The approach herein approach serves as an alternative means to access this synthetically challenging product. Moreover, the gram-scale isomerization of 1a was performed with a lower catalyst loading (1 mol %). An isolated yield of 1.24 g (2a) was obtained with a slightly lower E/Z selectivity (64/1, Scheme 11b). Furthermore, a catalyst recycling experiment was also explored and is enabled by virtue of the poor solubility of the catalyst in hexanes.[16] The catalyst could be precipitated from the reaction mixture by treatment with hexanes. A moderately diminished yield and stereoselectivity were observed upon the use of the recycled catalyst (Scheme 11c).

Schemes 11a to 11c. Synthetic utility of the reaction and catalyst-recycling experiment a. Synthesis of Deuterium Labeled Alkene

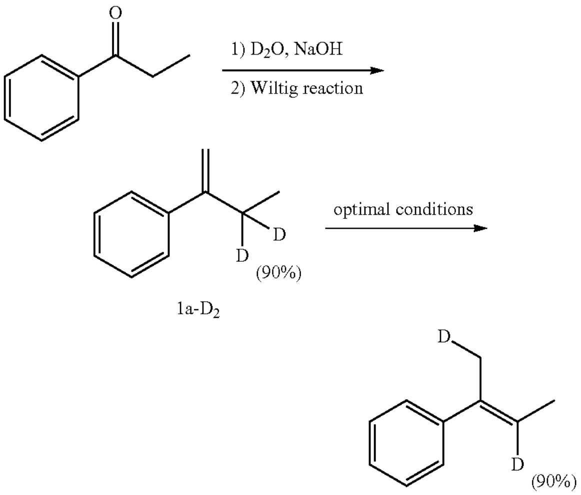

1a-$D_2$

2a-$D_2$
93% yield b. Gram Scale Reaction:

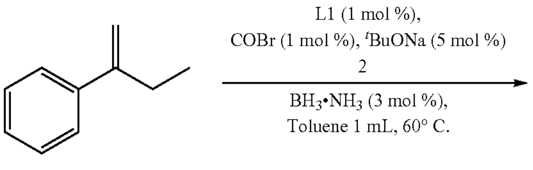

1a
1.32 g, 10 mmol

-continued

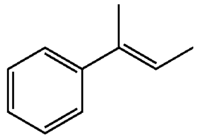

2a
1.24 g, 94% yield,
E/Z = 64/1 c. Catalyst Recycling Experiment:

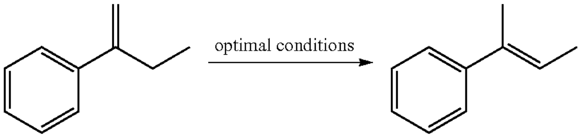

1a

2a
First run: 94% yield,
E/Z = 85/1
Second run: 85% yield,
E/Z = 34/1
Third run:
conversion <25%

Mechanistic studies. There are four main pathways[5i] invoked in transition-metal catalyzed olefin isomerization: a) radical mechanism (Scheme 12a); b) metal hydride mechanism (Scheme 12b); c) 1,3-hydrogen shift mechanism (Scheme 12c); d) oxidative cyclization mechanism (Scheme 12d). These mechanisms can be classified into two types of pathways according to the means of H-transfer: stepwise (pathways a and b) and concerted (pathways c and d).

Schemes 12a to 12d. Four main pathways of the transition-metal catalyzed olefin isomerization (a) Radical Mechanism (Stepwise H-Transfer)

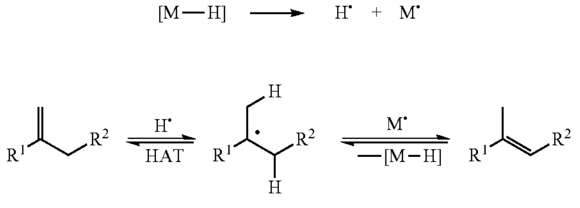

(b) Metal-Hydride Mechanism (Stepwise H-Transfer)

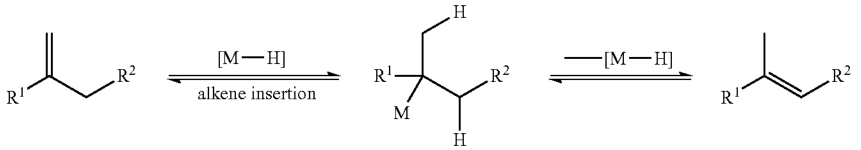

(c) 1,3-H Shift Mechanism (Concerted H-Transfer)

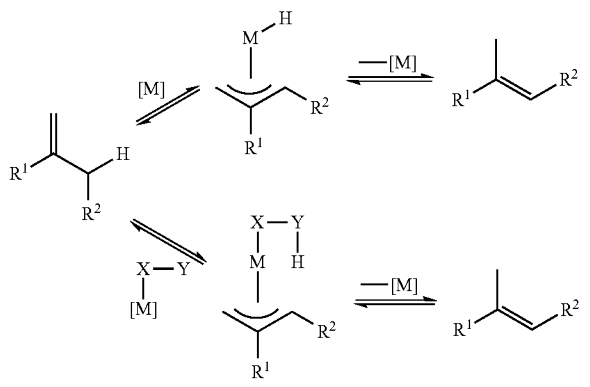

(d) Oxidative Cyclization Mechanism (Concerted H-Transfer)

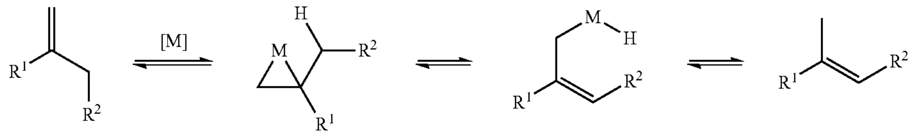

-continued

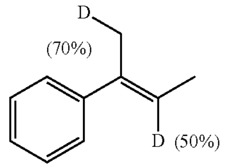

2n

93% yield, 70/1 E/Z

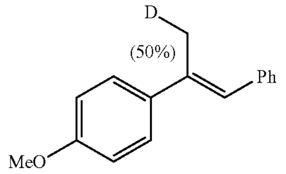

2s

97% yield, 76/1 E/Z

To distinguish the reaction pathway, a series of experiments were carried out with the goal of ruling out certain mechanisms (Schemes 13a and 13b). A crossover experiment using mixed 1a-$D_2$ and 1s was investigated and the crossover deuterated product 2s was observed (Scheme 13a). This result ruled out the concerted H-transfer pathways (pathway c and d).[5i] Subsequently, a common radical scavenger 1,1-diphenylethylene was included in the reaction of 1a, which caused negligible effects on the reaction yield and stereocontrol (Scheme 13b). This observation excluded a possible H radical reaction pathway. Taken together, the metal-hydride pathway emerges as the most plausible reaction mechanism.

Schemes 13a and 13b. Control experiments to distinguish reaction pathway a. Crossover Experiment

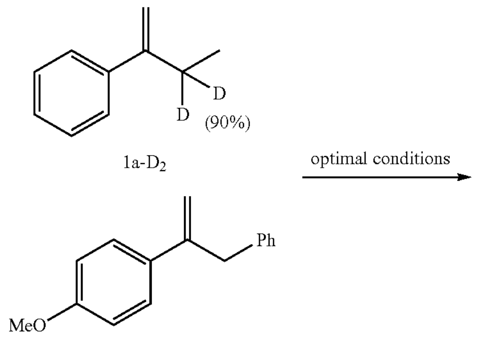

1a-$D_2$

1s b. Radical Trapping Experiment

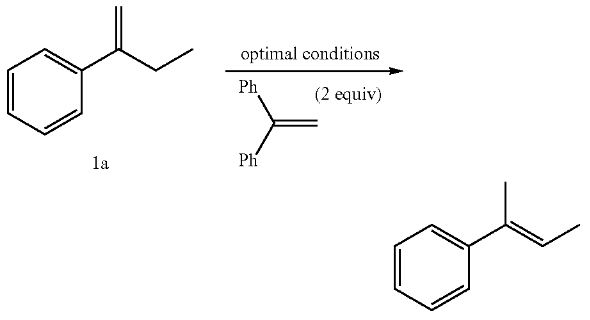

1a

2a

93% yield, E/Z = 65/1

Kinetic isotope effect studies of the isomerization were further studied by using mixed 1a and 1a-$D_2$ (Scheme 14a). The proportion of deuterium in the product suggested 1/1 ratio of $k_H/k_D$, indicating the cleavage of C—H is not the rate-determining step in the reaction. Additionally, mixed isomers of product (Z/E=4.4/1) were tested under more optimized conditions to explore the origin of stereoselectivity in the reaction (Scheme 14b). Although an increase in the ratio of E isomer was detected in the product, the stereoselectivity of the reaction should mainly stem from the isomerization of terminal to internal alkenes, not from the isomerization of E/Z isomers of trisubstituted alkene product. The reaction of las produced product 2a with far less E/Z selectivity (20/1) compared with the reaction of 1a. This result further supports the conclusions on the origins of stereoselectivity. Additionally, T-T stacking effects between the substrate and catalyst were explored by using the aliphatic alkene but-1-en-2-ylcyclohexane (1at) (Scheme 14c). A significantly reduced conversion (45%) and stereoselectivity (3/1) was observed. By way of explanation and not a limitation of the present invention, this observation suggests that the presence of π-π stacking interactions are possibly crucial for both reaction efficiency and selectivity.

Schemes 14a to 14c. KIE study and stereoselectivity origin study a. KIE Study:

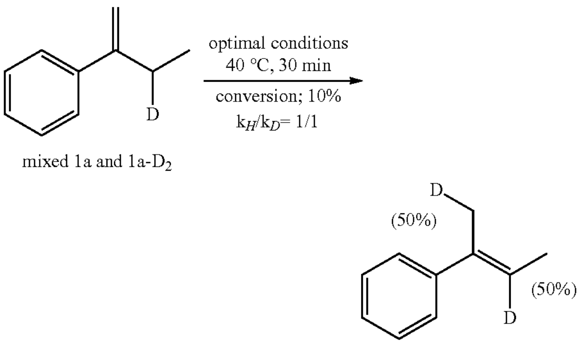

mixed 1a and 1a-$D_2$

2a
E/Z = 132/1 b. Stereoselectivity Origin Study

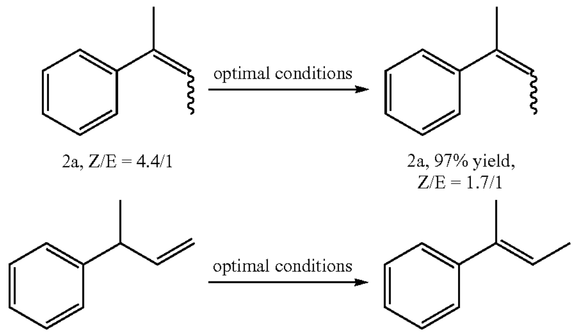

2a, Z/E = 4.4/1

2a, 97% yield, Z/E = 1.7/1

1as 2a, 92% yield, E/Z = 20/1 c. π-π Stacking Effect Investigation

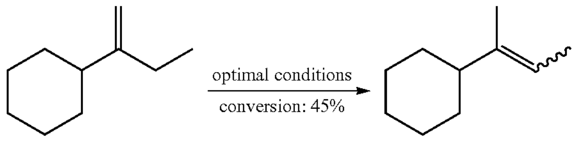

1at

2at, E/Z = 3/1

Figure 5:
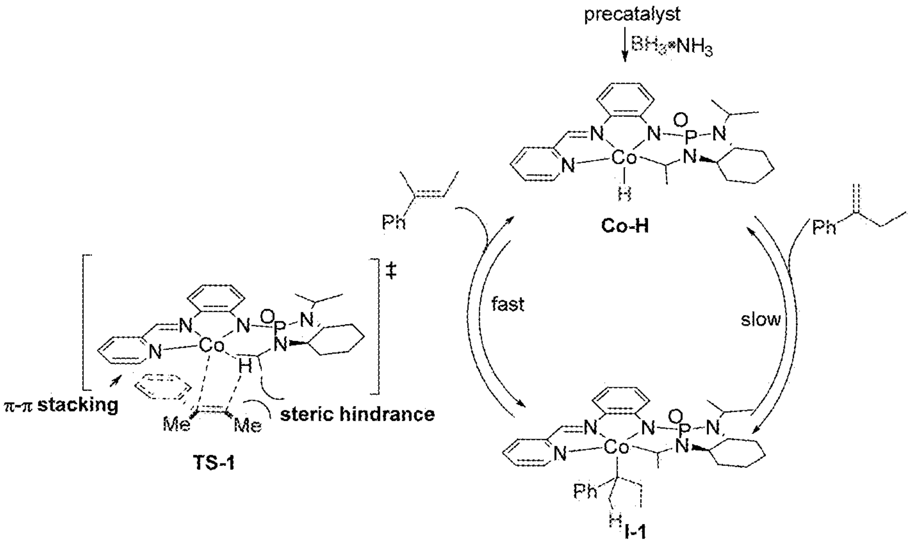
FIG. 5. Proposed catalytic cycle.

By way of explanation, and in no way a limitation of the present invention, based on the experimental observations and the single crystal structure of the precatalyst, a Co-hydride catalytic pathway is proposed as shown in FIG. 5. The active cobalt-hydride catalyst (Co—H) initiates the reaction through a double bond insertion giving an alkyl cobalt intermediate I-1. On the basis of the KIE study, this process should be the rate-determining step. Then the alkyl cobalt species (I-1) experiences a stereoselective β-H elimination through a transition state TS-1. In the transition state, T-T stacking effects between the pyridine (or quinoline) ring and an aromatic ring in the substrate, as well as the steric influence of the phosphamide moiety in the catalyst plays an important role in the high E/Z selectivity of the reaction. This step should be a fast, but a stereoselective process.

This example shows a stereoselective olefin isomerization catalyzed by a novel cobalt-hydride catalyst. The mild reaction conditions and high efficiency allows a scalable access to acyclic trisubstituted alkenes with high stereoselectivity. Moreover, a preliminary catalyst-recycling experiment shows that the catalyst is recyclable. The interesting AIE property of products arising from diene substrates makes this protocol useful in novel material preparation. The synthetic utility of this reaction is also demonstrated by the synthesis of a deuterated trisubstituted alkene. Additionally, a plausible catalytic cycle is proposed to rationalize the mechanistic observations.

Example 3. Homogeneous and Recyclable Palladium Catalysts: Application in Suzuki-Miyaura Cross Coupling Reactions This example demonstrates the use of catalytic systems which take advantage of a metalla-GAP strategy (GAP=Group-Assisted-Purification) in homogeneous catalysis for the first time. This discovery allows simple reclamation and re-use of homogeneous metal catalysts. Homogeneous catalysis has many appealing properties, such as high chemo-, regio- and stereoselectivity, an abundance of suitable catalysts to choose from, and generally mild reaction conditions. However, many homogeneous catalyst systems cannot be used in more practical, industrially relevant settings mostly arising from issues relating to poor separability between products and catalyst. The m-GAP strategy is used in palladium-catalyzed Suzuki-Miyaura cross-coupling reactions. Excellent recyclability and synthetic utility are observed in these palladium catalyzed transformations.

Introduction

Homogenous catalysis is widely used due to the abundance of compounds and complexes that are soluble in organic solvents.[1,2] A key drawback of this approach is separability, with catalysts typically being lost to waste at the end of a reaction as the recovery process is simply not cost effective.[3] As an alternative, heterogeneous catalysts can be employed, as the catalyst and products are in different phases and are easily separated; this allows reclamation of the catalyst to be reused in subsequent reactions, increasing the overall efficiency of the catalytic system.[4] In contrast to homogeneous systems, heterogeneous catalysts typically operate under more extreme reaction conditions (elevated temperature, pressure, etc.) and are often less selective as a result.[5] By making homogenous catalysts recyclable or by designing systems that facilitate better separability this key advantage of heterogeneous catalysis can be incorporated into homogenous systems. Group-assisted purification (GAP) chemistry and metalla-GAP (m-GAP) chemistry were used by the inventors to expand the use of ligands that contain a phosphoramide motif in homogenous catalysis and to further explore their potential as recyclable catalytic systems.

Carbon-carbon bond forming (cross-coupling) reactions are an incredibly important transformation and have wide-ranging applications in many fields including medicinal chemistry and pharmaceutical synthesis.[10] The Suzuki-Miyaura reaction is the most predominately used cross-coupling reaction in industry.[11, 12] The Suzuki-Miyaura reaction was first reported by Akira Suzuki and co-workers in 1979 is one of the most widely used cross coupling reactions for the formation of biphenyls, due to the high functional group tolerance and scalability for use in industrial processes.[11,13,14] Most Suzuki-Miyaura coupling reactions employ palladium catalysts which are highly reactive but expensive due to their scarcity.[15,16,17] Palladium is a non-abundant platinum group metal, as such palladium salts are expensive and natural deposits will eventually be depleted.[18,19] In an effort to improve the sustainability of palladium-catalyzed cross-coupling reactions and make the reactions more environmentally friendly, ideally the palladium content should be recovered at the end of the reaction.[20, 21] Extensive work has focused on methods recovering palladium content from spent catalysts to reduce the excessive costs.[22] Catalyst recycling methodologies have the potential to improve the sustainability of palladium-catalyzed reactions and make the processes "greener".[23, 24] Recycling of palladium catalysts is highly desirable as "active" Pd species can be recovered and re-used and previous reports have described separable heterogeneous and immobilized Suzuki catalysts.[25-32] The present inventors focused on the use of GAP, initially reported by Li and co-workers as ligand architectures for metal catalysts.[8] By way of explanation, it is hypothesized that this could provide an alternative to fully heterogeneous or immobilized catalysts as the transformation occurs in a homogeneous manner with all the advantages associated with homogeneous catalysis. To further extend the use of m-GAP ligands, the inventors applied the approach to palladium-catalyzed Suzuki-Miyaura cross couplings (Scheme 15).

(1)

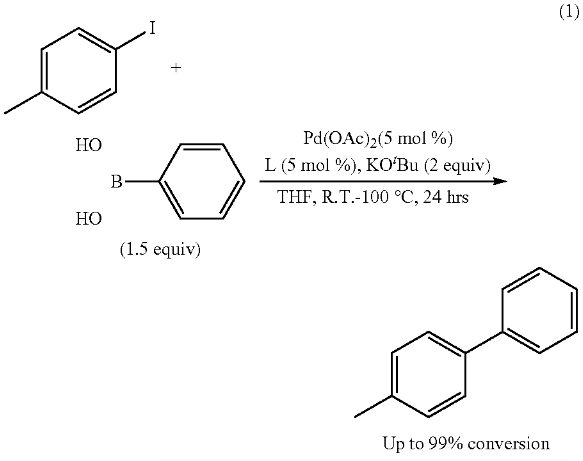

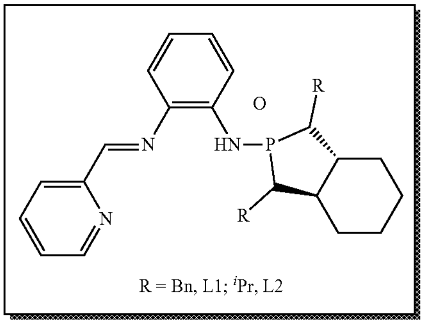

R = Bn, L1; $^{i}$Pr, L2

Figure 6:
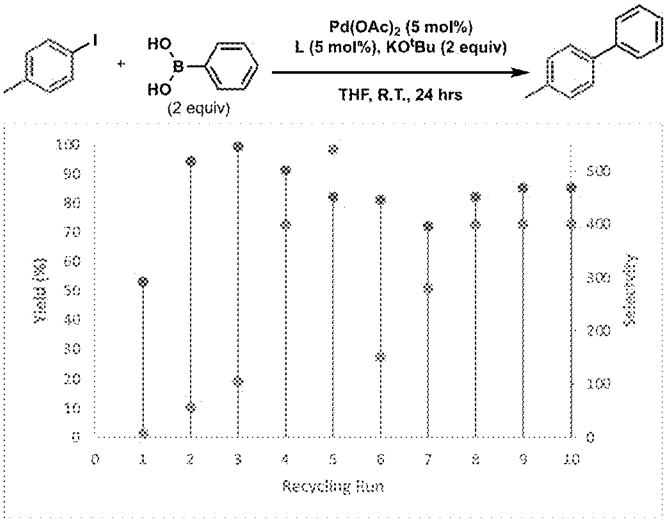
FIG. 6. Palladium GAP catalyst recyclability in the Suzuki-Miyaura coupling between 4-iodotoluene and phenylboronic acid.
Figure 8:
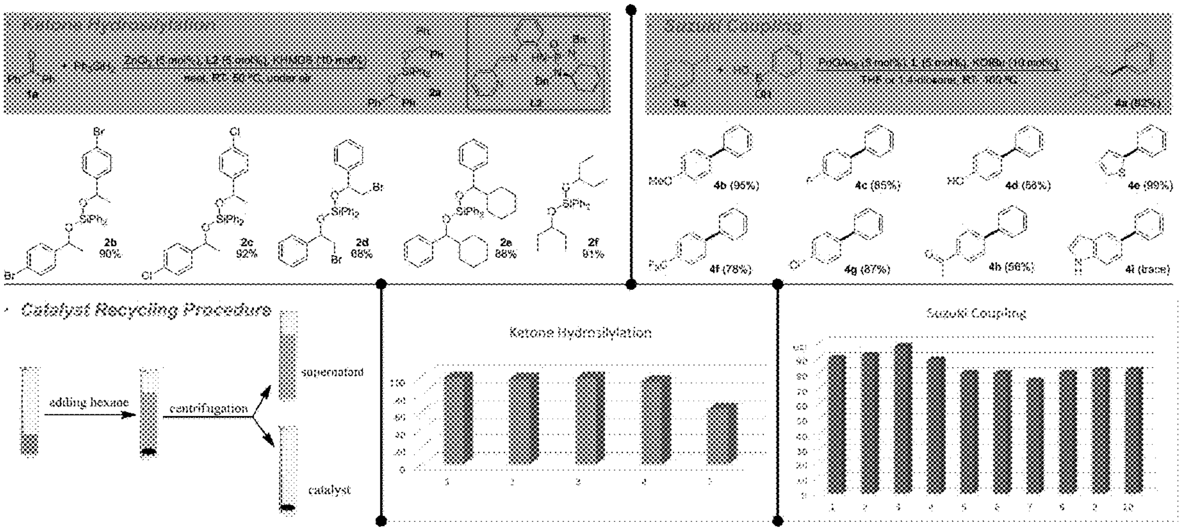
FIG. 8. Optimized conditions and preliminary substrate scope of mGAP-Zn catalyzed double hydrosilylation of ketones; Optimized conditions and preliminary substrate scope of mGAP-Pd catalyzed Suzuki coupling; Catalyst recycling procedure and preliminary results of hydrosilylation and cross-coupling recycling experiments.

In the initial studies, 4-Iodotoluene and phenylboronic acid were used for substrate screening with m-GAP ligands and palladium acetate, to determine the optimal reaction conditions (Scheme 15, Table 4, see also FIGS. 6 and 8). If the presence of the GAP group would have any deleterious impact on catalytic behavior i.e., would this be an effective homogeneous catalyst regardless of any catalyst recycling, was also determined.

Homogeneous Catalysis. The Suzuki-Miyaura coupling between phenylboronic acid and 4-iodotoluene was used as a model reaction with which to evaluate optimal reaction conditions. GAP ligands L1 and L2 were screened under various conditions in the presence of palladium acetate and potassium tert-butoxide as base in an effort to optimize reaction conditions.[8, 9] Under ambient temperature and using THE as a solvent, the catalyst system derived from L1 was found to afford both slightly higher conversion and higher selectivity for cross-vs. homo-coupling products than the catalyst system derived from L2 (Table 4, Entries 1 and 2). Raising the temperature to 60° C. resulted in lower overall conversion albeit with an improved product selectivity (Table 4, Entry 3). Improved results could be obtained using L2 if the reaction time was extended to 48 h and the catalyst mixture was allowed to stir overnight prior to use in the coupling chemistry (Table 4, entry 6). A ligand-free reaction was also performed and revealed that even in the absence of any ligand the reaction still proceeds albeit in diminished conversion. After consideration of the reaction time, solvent employed and temperature, the inventors chose to employ L1, THF and room temperature as perfectly cromulent reaction conditions.

TABLE 4

Optimization of Suzuki-Miyaura cross-coupling with m-GAP complexes.

| Entry[a] | Ligand | Solvent | Temperature (°C) | Yield (%)[d] | Selectivity (2a:2b)[e] |
|---|---|---|---|---|---|
| 1 | L1[b] | THF | R.T. | 53 | 7:1 |
| 2 | L2 | THF | R.T. | 48 | 6:1 |
| 3 | L1 | THF | 60 | 26 | 30:1 |
| 4 | L1 | 1,4-Dioxane | 100 | 92 | 105:1 |
| 5 | L2 | 1,4-Dioxane | R.T. | 45 | 7:1 |
| 6 | L2[b][c] | THF | R.T. | >99 | 8:1 |
| 7 | N/A | THF | R.T. | 32 | 12:1 |

[a]$Pd(OAc)_2$(0.015 mmol), Ligand (0.015 mmol), Iodotoluene (0.3 mmol), Phenylboronic acid (0.6 mmol), Potassium tert-butoxide (0.6 mmol), Solvent = 2 ml, Reaction time = 24 hours.
[b]Catalyst prepared via overnight stirring.
[c]48 hours
[d]Spectroscopic yield calculated with tetramethylsilane as an internal standard.
[e]Ratio of heterocoupled product (4-methyl-1,1-biphenyl (2a)) to homocoupled product (4,4-dimethyl-1,1-biphenyl (2b)).

Next, the inventors turned to an examination of the scope of substrate amenable to optimized conditions, in part to ensure that the m-GAP palladium complex would exhibit a comparable reactivity profile to other Suzuki-Miyaura catalysts. Thus, L1/Pd system was deployed as a catalyst for several Suzuki-Miyaura couplings with a broad range of aryl halide and aryl triflate substrates (Table 5, Scheme 16). It was found that aryl iodide substrates (2a-2f) tended to afford good to excellent yields in coupling reactions with phenylboronic acid; the use of substrates with a second halogen atom (not iodine) (2d-2f) delivered excellent chemoselectivity as C—C bond formation occurs exclusively at the C—I bond of the substrate, with no evidence for "double coupling" observed.[33, 34] To probe the limits of the system, the catalyst was challenged with substrates and functional groups often found to be incompatible with Suzuki-Miyaura conditions. Substrates containing alcohol, primary amine, and indole groups (2g-2k) were less favorable coupling partners in this system. Only trace amounts of product were observed with amino and indole substrates. This is likely a result of amino group coordination and N—H oxidative addition at palladium.[35-37] Poor reactivity is also observed with iodophenols under the previously optimized reactions conditions, however, increasing the reaction temperature to 70° C. gave full conversion. It was found that the Pd-GAP catalyst afforded excellent conversion of the heterocycle 2-iodothiophene (2) to coupled product under the conditions taught herein. Having investigated the scope of Suzuki coupling reactions with aryl iodides the inventors then turned to aryl bromides (2l-2t). To facilitate catalytic turnover the reaction temperature was increased to 70° C. Functional group tolerance of the aryl bromides was consistent with the results obtained for aryl iodides (2l-2o) and good to excellent yields were obtained. 4-bromoacetophenone (2p) proved to be a competent substrate, efficient and highly selective C—C bond formation occurred with no undesired reaction of the ketone group observed.[38] No reaction was observed with 2-bromoacetophenone (2q) which is nominally an $sp_3$-$sp_2$ coupling reaction.[39] 2-bromopyridine, 2,6-dibromopyridine and 4-$^t$butylbromobenzene (1r-1t) gave good conversion with modest yields. The suitability of aryl chloride substrates was examined, which required more forcing conditions to promote catalytic activity (90° C.) (1u-1z). Functional group tolerance remained consistent with the observed reactivity of aryl iodides and aryl bromides. Full conversion was observed with a variety of substrates with the products obtained in good yields (1u-1y). Coupling reactions between $sp_3$ and $sp_2$ centres (1aa-1ad) were unsuccessful. Finally, one pseudo-halide, tosylate, substrate (1ae) was studied, and the desired coupling product was obtained in a modest yield.

TABLE 5

Scheme 16, scope of substrate amenable to (homogeneous) L1/[Pd] catalysed Suzuki-Miyaura reaction.

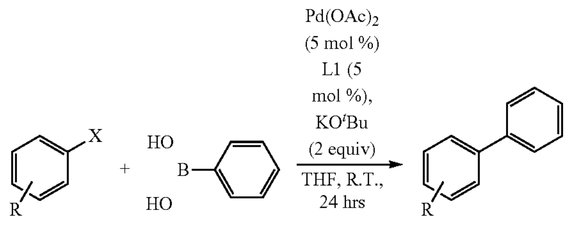

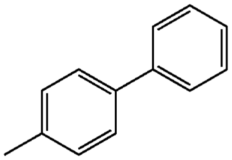

X = I, [99%], (92%)[a]
Br = [99%], (75%)[b]
Cl = [99%], (62%)[c]
OTf = [89%], (56%)[c]

TABLE 5-continued

Scheme 16, scope of substrate amenable to (homogeneous) L1/[Pd] catalysed Suzuki-Miyaura reaction.

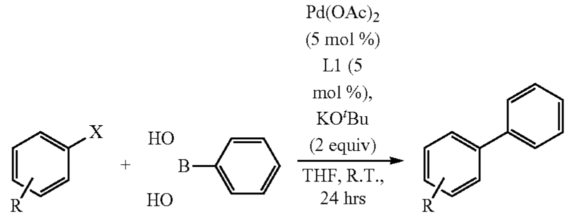

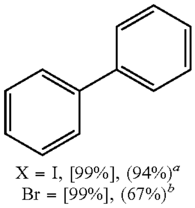

X = I, [99%], (94%)[a]
Br = [99%], (67%)[b]

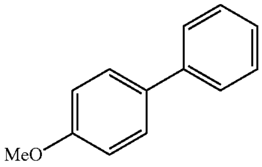

X = I, [99%], (95%)[a]
Br = [99%], (86%)[b]
Cl = [99%], (73%)[c]

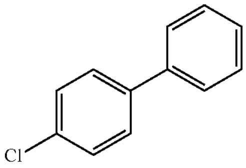

X = I, [99%], (87%)[a]

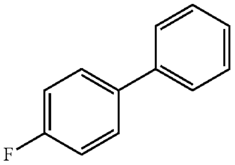

X = I, [99%], (85%)[a]
Br = [99%], (78%)[b]
Cl = [99%], (71%)[c]

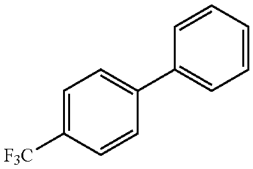

X = I, [99%], (78%)[a]

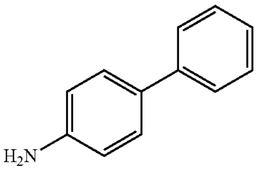

X = I, trace[a]
Cl, trace[c]

TABLE 5-continued

Scheme 16, scope of substrate amenable to (homogeneous) L1/[Pd] catalysed Suzuki-Miyaura reaction.

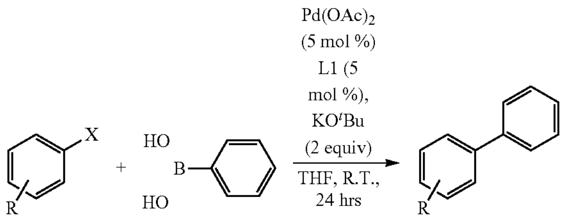

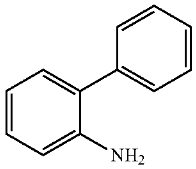

X = I, trace[a]

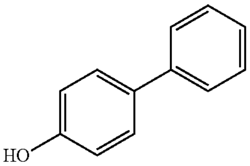

X = I, [99%], (56%)[b]

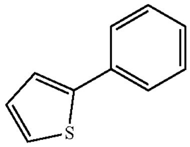

X = I, [99%][a]

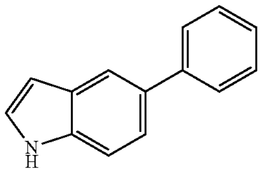

X = I, trace[a]

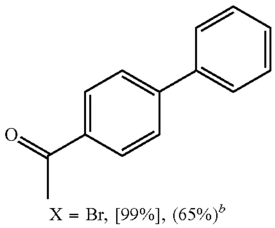

X = Br, [99%], (65%)[b]

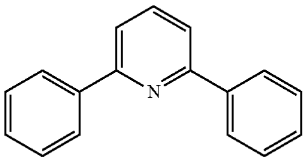

X = Br, [99%], (53%)[b]

TABLE 5-continued

Scheme 16, scope of substrate amenable to (homogeneous) L1/[Pd] catalysed Suzuki-Miyaura reaction.

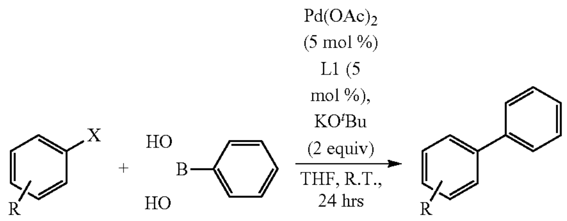

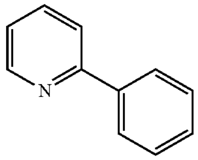

X = Br, [99%]

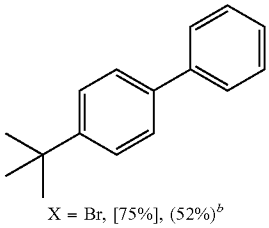

X = Br, [75%], (52%)[b]

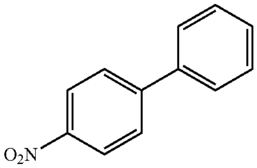

X = Cl, [99%], (68%)[c]

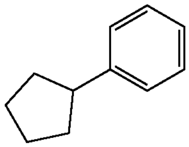

X = Br, N.R.

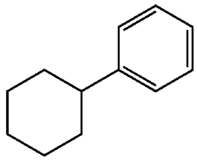

X = Br, N.R.

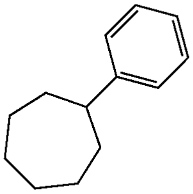

X = Br, N.R.

[a] $Pd(OAc)_2$ (0.015 mmol), Ligand (0.015 mmol), Aryl halide/triflate (0.3 mmol), Phenylboronic acid (0.6 mmol), Potassium tert-butoxide (0.6 mmol), Solvent = 2 ml, Reaction time = 24 hours, Temperature = 50° C. Catalyst prepared via overnight stirring. Spectroscopic yield calculated with tetramethylsilane as an internal standard.

[b] Temperature = 70° C.

[c] Temperature = 90° C.

Reclamation and Recycling Studies. Next, the inventors investigated the viability of the GAP-Pd catalyst as a reusable Suzuki-Miyaura catalyst. Catalyst and product separability was found to be excellent in hexane or pentane, and hence the recovered catalysts were able to be re-used in subsequent catalytic cycles. Recyclability studies were conducted, and the results are detailed below (FIG. 6).

It was observed that while initially catalytic conversion is modest (Cycle 1) repeat reactions with the recycled palladium catalyst give improved reactivity and selectivity. The initial recycling experiment (Cycle 2) gives almost complete conversion, and no significant loss of activity is then observed in subsequent cycles. The catalyst was reused nine times (ten catalytic cycles in total) which is excellent for a homogenous catalyst and activity remains consistent and comparable to previously reported heterogeneous Suzuki-Miyaura catalysts.[21, 29-31] It is possible that the first catalytic cycle serves to attenuate the precatalyst or convert the system into a more active form of the catalyst which results in both higher conversion and increased selectivity for cross-coupled (versus homo-coupled) product.

The importance of the GAP ligand to recyclability was probed by attempting a "ligand free" recycling experiment. Surprisingly, a catalytic system simply employing palladium acetate and potassium tert-butoxide did exhibit limited recyclability. However, elevated temperatures were required, and the system exhibited limited recyclability before becoming inactive. This demonstrated the superiority of the m-GAP system for recyclability applications. Moreover, the nature of the catalyst system was not entirely clear, though strong evidence suggests it is heterogeneous in nature. On the homogeneity of the species present in the reaction it can be remarked that recent literature studies suggest that the active catalytic species present in Suzuki-Miyaura coupling reactions are homogenous in nature, even if nanocomposite structures form in situ.[40-42] Further mechanistic investigations into these reactions will be conducted in due course to determine the active species present.

Figure 7A:
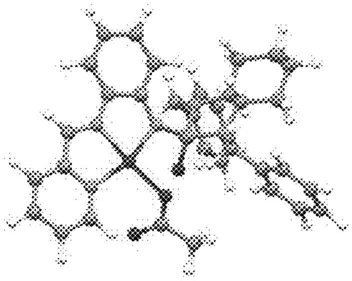
FIGS. 7A and 7B show.
Figure 7B:
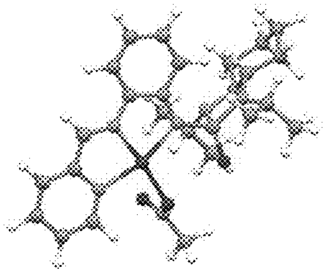

The Pd-GAP complexes were studied computationally via Density Functional Theory (DFT) to determine their optimized structures and hence the coordination chemistry of the complexes.[43,44] FIG. 7A shows an optimized structure of L1-Pd(OAc). FIG. 7B shows an optimized structure of L2—Pd(OAc). Geometries and free enthalpy for the complexes were calculated using exchange correlation functional PBE with zeroth-order regular approximation (ZORA).[45,46] The geometric parameters of the optimized structure were compared to the structures of analogous palladium complexes.[47,48] All of the calculated distances matched the crystallographic distances within three significant figures (Table 4). Spin restricted Kohn-Sham determinants were chosen to describe the closed shell wavefunctions, employing the RI approximation and the tight SCF convergence criteria provided by the ORCA.[49] Atom-pairwise dispersion correction with Becke-Johnson damping scheme (D3) were utilized for the calculation, and the def2-TZVP, def2-TZVPP basis set and SARC/J auxiliary basis set were used for all the atoms.[50-53] Frequency calculations confirmed that the structures are energetic minima and allowed for the calculation of free energies. The predicted structures of 3 and 4 are four coordinate square planar structures with the coordination shell composed of a tridentate GAP ligand and an acetate ligand. The structures were optimized as Pd (II) with a singlet ground state.

This example shows that Palladium-catalyzed Suzuki-Miyaura couplings are fully recyclable with the GAP ligands taught herein over ten catalytic cycles. The m-GAP palladium catalysts are excellent catalysts for the couplings of a wide range of aryl halides with simple boronic acids. Further work will be conducted to expand the scope of m-GAP catalysis, mechanistic studies and the isolation of key reactive intermediates will be reported on in due course.

Figure 10:
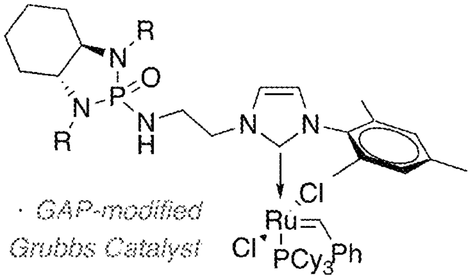
FIG. 10. Incorporation of the GAP moiety into existing catalysts to render them recyclable.
Figure 10:
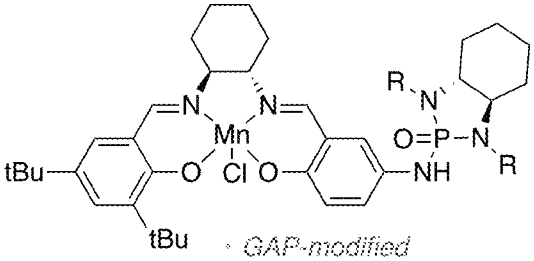

Example 4. Prophetic Novel Ligand Platform for Recycling Transition Metal Catalysis Prophetic new approach to palladium-catalyzed reactions, a mainstay of pharmaceutical chemistry. Transition metal catalysts are crucial to a range of pharmaceutical syntheses.[1-3] Palladium is particularly important, as Pd-catalyzed processes underpin many of the key syntheses in the $1 trillion pharmaceutical industry. Remarkably, Pd-catalyzed cross-coupling reactions account for 17% of all reactions used to build New Molecular Entities (NMEs) by the pharmaceutical industry; ca. 70% of processes used to form new Active Pharmaceutical Ingredients (APIs) involve a Pd-catalyzed step. However, Pd is toxic, and Food and Drug Administration (FDA) regulations dictate that elemental impurities of Pd in drug products must be <100 μg/day for orally administered drug products. These limits create purification, and associated cost, implications for the healthcare industry.[4] The present invention can be used to address an urgent evidence gap in pharmaceutical chemistry: the need for cost- and time-effective routes to remove elemental impurities in organometallic reagents and catalysts. For example, the route to manufacture Ceftolozane features a palladium-mediated C—N cross-coupling reaction that is only two steps from the final drug substance, Ceftolozane sulfate (an antibiotic). Current synthetic routes require treatment with a palladium scavenger, thioglycerol, to reduce palladium content to acceptable levels.[5] A major drawback of scavengers is that they introduce extra steps in reaction processing and do not allow for precious metal recycling and reuse. This prophetic example overcomes this barrier by eliminating the need for such scavengers. Instead, the inventors have developed and validated an entirely new concept in catalysis by applying mGAP methods to transition metal chemistry. The invention uses mGAP to render any homogenous catalyst recyclable and reusable, thus eliminating the need for capture and removal of toxic transition metals from APIs.

mGAP chemistry overcomes significant barriers to expanding use of homogenous catalysis by delivering recoverable and recyclable, homogeneous transition metal catalysts. The inventors have developed an innovative approach based on the application of novel N-phosphonyl imine derived molecules to use as ligands for catalytically relevant metals. GAP chemistry enables purification of reaction products via a simple filtration operation;[6-13] this strategy has been successfully used in many transformations.[14-17] The straightforward preparation of mGAP ligands (L) in high yield using commercially available chiral building blocks as shown in FIG. 10. The inclusion of the GAP moiety in a metal complex will also impart separability of the catalyst from reaction products via straightforward filtration. In contrast to traditional approaches involving generation of a heterogeneous catalyst based upon a successful homogeneous analog, this prophetic approach avoids the need to tether a homogeneous complex to a scaffold such as alumina/silica that can cause unwanted reactions and side products. Therefore, mGAP provides: (i) the complete benefits of a fully homogeneous catalyst, including mild reaction conditions and superior selectivity and, (ii) retention of the advantageous catalyst via simple filtration recovery, a highly desirable feature of heterogeneous catalysts. Both characteristics will confer enormous benefits, making these reactions cheaper, easier to use, and less toxic. Industrial (commodity) catalytic methods currently rely heavily on heterogeneous systems and employ catalysts that are difficult to characterize, often operate under forcing conditions (high temperature and pressures), are inherently less selective than homogeneous systems, and are difficult to modify in a rational, stepwise manner.

The development of new drugs is time-consuming, expensive, and risky. Despite these challenges, the pharmaceutical industry has been remarkably successful in developing a broad range of new medicines to solve ongoing and emerging public health crises. However, a major challenge to exploring novel drug targets is the over-reliance of the pharmaceutical industry on precious-metal-catalysts. This limitation is seriously hampering methodological innovation, and thus the development of new therapies. This prophetic example provides a solution to overcoming this limitation by exploring synthetic avenues that rely on recyclable transition metal catalysts that can be reclaimed and reused. In addition, the prophetic methods taught herein address a serious threat to pharmaceutical chemistry: current methods are not sustainable because they consume precious raw materials needed for catalyst manufacture and the downstream production of drugs.

Homogeneous catalysts—defined as those that exist in the same (usually liquid) phase as the reactants and products—are typically more selective than heterogeneous catalysts. Homogeneous catalysts are also significantly less affected by limitations arising from slow transport of reactants and products to and from an interface, a problem frequently seen in heterogeneous catalysis. However, the separation of homogeneous catalysts from their reaction products can be costly and is often inefficient. Therefore, it is unsurprising that with a few notable exceptions,[18-19] most industrially relevant catalysts are heterogeneous. Unfortunately, compared with their homogeneous counterparts, heterogeneous catalysts often suffer from lower performance and diminished selectivity owing to poorly defined catalytic sites, thus nullifying most benefits.

This new approach provides a novel solution to these problems, by supplying a general blueprint for recycling homogeneous catalysts. In contrast to traditional approaches involving the generation of a heterogeneous catalyst based upon a successful homogeneous analog, this approach avoids the need to tether a homogeneous complex to a non-innocent scaffold like alumina/silica or the incorporation of significant amounts of fluorine into the catalyst structure.

The present invention includes synthesizing well-defined metal complexes using kinetics and stoichiometric studies, with a focus on reactions involving unsaturated substrates, to investigate each step in the catalytic cycle. Investigating decomposition pathways facilitates the preparation of the most robust (recyclable) catalyst architectures.

Identifying characteristics of recyclability in homogeneous complexes to evaluate their utility as reusable catalysts.

Exquisite product selectivity under mild conditions is the hallmark of homogeneous catalysis. However, the difficulty associated with separating homogeneous catalysts from their products leads to inevitable losses because of increased costs and inefficiency. This has stimulated development of strategies that facilitate the recycling of homogeneous catalysts.[20-22] Groundbreaking work reported by Dioumaev and Bullock two decades ago described the use of a tungsten-based complex to catalyze the hydrosilylation of carbonyl groups.[32] The key to their success was the solvent-free nature of the reaction; the depletion of (liquid) substrate and subsequent formation of product resulted in a distinct change of solubility of the tungsten complex, which precipitated from the reaction upon completion. As remarkable as this report was, the process suffered from several drawbacks: 1) limitation to liquid substrates (they provided the 'solvent' for the reaction), 2) limited substrate scope (five ketones and one ester were studied) combined with by-product formation and, 3) catalyst recyclability was not a result of rational design, which limits available options for improvements. Using mGAP-Zinc Complexes as Ketone Hydrosilylation Catalysts. Previous reports by Parkin and co-workers showed that double hydrosilylation of ketones can be achieved employing a zinc catalyst.[33-34] Parkin's system is one of only a handful of reported homogenous catalysts that are highly selective for multiple hydrosilylations of ketones.[35-37] To provide a direct comparison with Bullock's earlier work, the inventors chose to investigate the catalytic hydrosilylation of ketones with the mGAP ligated zinc catalysts. Benzophenone (1a) can be used as a model substrate with which to optimize reaction conditions using diphenylsilane as the reductant; these conditions were used to examine scope of the substrate (FIG. 8, Scheme 17 (Ketone hydrosilylation) and Scheme 15 (Suzuki Coupling)).

mGAP-Palladium Complexes as Suzuki-Miyaura Coupling Catalysts. Carbon-carbon bond coupling reactions are incredibly important reactions in medicinal chemistry and pharmaceuticals. With Suzuki-Miyaura couplings, they are the most common reactions in industry.[38-39] Most Suzuki coupling reactions use palladium catalysts because they are highly reactive, but they are also expensive and often toxic.[40-41] Catalyst recycling methodologies hold potential to improve the sustainability of palladium-catalyzed reactions and make the processes "greener".[42-43] Thus, to further extend the use of mGAP ligands, the inventors used the compounds in palladium-catalyzed Suzuki cross couplings. Iodotoluene (3a) and phenylboronic acid were used for substrate screening with m-GAP ligands and palladium acetate to determine optimal reaction conditions, with subsequent study of substrate scope (Scheme 15).

Recycling mGAP-Metal Complexes. Using a simple procedure, addition of hexanes to the reaction mixture, the precipitated catalyst can be isolated via centrifugation/decanting of the mother liquors (FIG. 8) containing the soluble organic product. In the case of the zinc hydrosilylation catalyst, initial studies have demonstrated a limited recyclability; after five catalytic cycles the isolated yield of hydrosilylation product has decreased to ~60% (from 98% in cycle 1). In contrast, the palladium mGAP catalyst is more robust and is still effective, albeit diminished, after ten catalytic cycles.

Thus, it was possible to incorporate the GAP moiety into a ligand architecture to impart recyclability to a homogeneous transition metal catalyst. It is now possible to manipulate ligand structure to control subsequent activity and recyclability.

Figure 9:
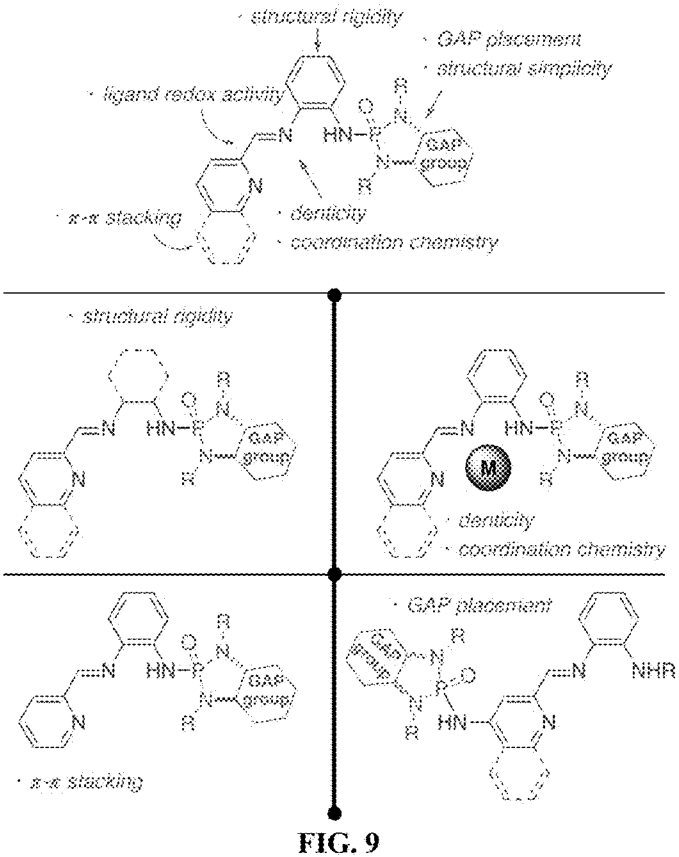
FIG. 9. Systematic modification of the mGAP ligand to probe the impact on catalyst performance and recyclability.

Probing mGAP Ligand Properties. Key to the design of superior mGAP catalysts will be a thorough understanding of structure-function relationships. The inventors can modify the mGAP ligand as shown in FIG. 9 to probe the effects of each highlighted component on catalytic activity and, crucially, recyclability. Each structural difference is achieved through simple modification of the synthetic route. Structural rigidity effects can be examined by changing the backbone from a rigid aromatic group to a more flexible ethane or cyclohexane structure-obtained synthetically from 1,2-diamino ethane or 1,2-diamino cyclohexane, respectively. π-π stacking effects can also be examined through comparison between pyridine and quinoline backbones, which possess an extended x-system. π-π stacking effects are proposed to play a key role in selectivity enhancement of olefin isomerization reactions employing mGAP catalysts.[44] Placement of the GAP moiety plays an important role in determining the activity and stereoselectivity of catalysis using the mGAP complex. Substrates 1b-1e are prochiral, yet the use of an enantiopure GAP group did not lead to any observed enantioselectivity in the hydrosilylation products. Thus, if the GAP unit is moved to a position remote to the metal center, there is no need to use enantiopure diamines as starting materials in mGAP ligand preparation. Coordination chemistry and ligand denticity can be determined by isolation and structural characterization of mGAP complexes using X-ray crystallography. Such solid-state structures can also shed light on any redox behavior of the mGAP ligand as changes in ligand metrical parameters are used routinely to assess degree of redox non-innocence.

Influence of Solvent Effects. Since the recycling strategy is based upon solubility differences between catalyst and reaction products, even subtle changes in structure could play an important role in determining separability of the catalyst. More broadly, the precipitating solvent should also be considered from an environmental/toxicity perspective. Heptane is considered a 'greener' hydrocarbon solvent than hexane(s)[45] and the substitution of hexanes with heptanes for catalyst recovery can be determined. It is also possible to explore the relative solubility of mGAP complexes in a range of typical organic solvents. Changing the "R" groups from short-chain alkyl units to longer chain alkyls or extended ether-type units can confer solubility in both non-polar and polar solvents, whereas the use of aromatic substituents may impart solubility in aromatic solvents.

Installation of GAP group on existing catalysts: A universal approach to recyclability. Using the present invention, it is possible to explore the potential to render any homogeneous catalyst recyclable via the installation of a GAP moiety (FIG. 10). One example is the modification of the well-established Grubbs ($2^{nd}$ generation) catalyst, which is capable of catalyzing metathetical reactions of olefins. The pendant-amine derivative of an N-heterocyclic carbene[46] is synthetically accessible and, via treatment with the GAP group, a GAP-appended carbene can be prepared. The catalytically relevant ruthenium alkylidene species can be synthesized using standard techniques. Similarly, the GAP incorporation into a manganese salen (Jacobsen's catalyst) can be accomplished in a straightforward manner from commercially available precursors and would facilitate recyclable asymmetric epoxidation chemistry.

As a result of the present invention, it is now possible to generate a universal approach to producing recoverable mGAP catalysts for any chemical transformation. Thus, alternative transformations can be accomplished, e.g., stable iron (III) oxo complexes that tend to show high reactivity in alkene hydrophosphination reactions[47-48].

Novel transformations enabled by GAP-based transition metal complexes. Transition metal-catalyzed alkene isomerization has emerged as a fundamental and atom-economic transformation that can readily convert terminal alkenes to internal alkenes.[50-58] Prior reports of alkene isomerization usually rely on noble metals, such as ruthenium, rhodium, palladium, iridium, and platinum.[59-71] Owing to the low abundance and high toxicity of these precious metals, attention has shifted to finding base-metal alternatives.[58] The past few decades have witnessed tremendous progress in this field, particularly in cobalt-catalyzed olefin isomerization. For example, Holland and Weix did impressive work in Z-selective alkene isomerization.[72] In the same year, a radical triggered isomerization and cycloisomerization was reported by Shenvi employing a Co-salen catalyst.[73] Subsequently, Hilt and coworkers unveiled a Co-dppp catalyzed monoisomerization of 1-alkenes to (Z)-2-alkenes.[74] More recently, a kinetically controlled isomerization was achieved by the Liu group, affording the target alkenes in good to excellent regioselectivity.[76]

Despite these impressive developments, the stereoselective alkene isomerization towards the synthesis of acyclic trisubstituted alkenes remains a challenging transformation.[77] Particularly, low reaction efficiency and poor stereoselectivity are significant problems in alkene isomerization because they limit the application of an otherwise atom-economical approach to synthetically useful target molecules.

Using mGAP-Cobalt Complexes as Olefin Isomerization Catalysts. As shown in the previous examples, base-metal catalysis provide a novel co-hydride catalyst supported by an mGAP ligand.[44] The in-situ-generated metal-hydride catalyst could readily facilitate challenging isomerizations to afford a wide range of trisubstituted alkenes and dienes (41 examples) with up to 98% yield and 130/1 (E/Z) stereoselectivity. Various α-ethylstyrene substrates afforded uniformly good to excellent results, regardless of the electronic properties or substitution patterns. Interestingly, 2-norbornaneacetic acid and 5β-cholanic acid derived alkenes underwent the reaction smoothly to afford the products with high stereocontrol. Cyclic alkenes were also found to be amenable substrates. Specifically, high regioselectivity (29/1) was observed and the thermodynamically stable product was obtained as the major product.[82]

Scheme 18

Olefin isomerization is efficiently catalyzed by mGAP cobalt complexes with high degrees of chemo- and stereoselectivity; regioconvergent and regioselective olefin isomerization utilizing an mGAP catalyst strategy.

Regioconvergent Olefin Isomerization

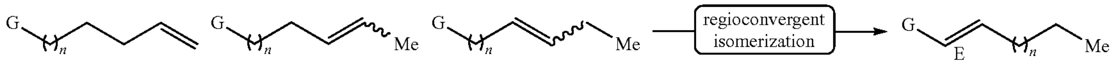

Regioselective Olefin Isomerization

-continued

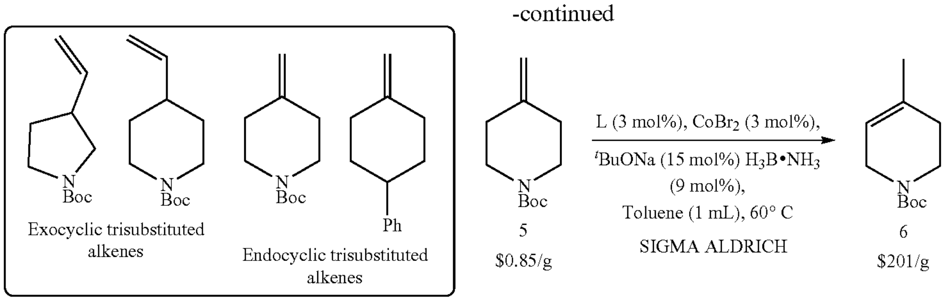

Regioconvergent Conversion of Olefin Mixtures and Regioselective Olefin Isomerization. Most building blocks in the chemical industry come from petroleum raw materials. Unrefined olefins tend to exist as isomeric mixtures which are difficult to separate; a regioconvergent olefin isomerization process would lead to isomerically pure products which are significantly more valuable (Scheme 18). Regioconvergent isomerization has been utilized in tandem with hydrosilylation to afford terminal silanes from mixtures of internal alkenes.[83-84] The successful isomerization of both internal and terminal olefins provides an opportunity to integrate the mGAP into an industrially relevant transformation, the transformation of unrefined isomeric olefin mixtures, to a single alkene product. Mixtures of olefins can be used and the treatment of a 1:1:1 mixture of hexenes (E:Z mixture) with optimized isomerization conditions should give rise to a single reaction product. These regioconvergent olefin isomerizations are an attractive approach to upgrading inexpensive olefin feedstock to more valuable isomerically pure alkenes. In preliminary results, the inventors have demonstrated that mixtures of 1-, 2- and, 3-hexenes are selectively isomerized to the 2-hexene isomer exclusively. Piperidine-derived alkenes (Scheme 18) can also be reacted with the present invention, as each has at least two possible sites that may serve to direct C═C bond migration. In a similar fashion, regiodivergent transformation of both exocyclic and endocyclic trisubstituted alkenes will be examined. In a small (NMR) scale reaction, it was found that BOC-protected piperidine 5 can be exclusively isomerized to internal alkene 6 in quantitative yield. This result represents a particularly attractive conversion to a value-added product.

Beyond Olefin Isomerization. In the absence of an external radical trap, a simple alkene subjected to MHAT can take two main pathways leading to isomerization (described above) or hydrogenation. After an initial HAT, the nascent carbon-centered radical may abstract a second hydrogen atom to give a hydrogenated compound. However, in the presence of appropriate groups, C—O, C—C, C—N and C—X bond formation are also possible.[75, 86-88] MHAT functionalization reactions can also be targeted. For example, the examination of tandem reactions in which olefin isomerization is paired with a second catalytic reaction is another attractive route to pursue, as was the hydrosilylation with mGAP iron and cobalt complexes are effective olefin hydrosilylation catalysts described hereinabove above.

As embodied and broadly described herein, an aspect of the present disclosure relates to a method for recycling transition metal catalysis comprising, consisting essentially of, or consisting of: combining the reactants in a solvent in the presence of a molecule having the formula:

Formula II

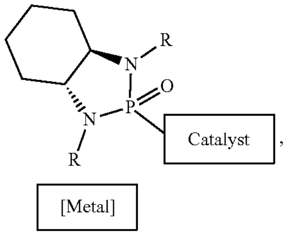

wherein R is selected from methyl, ethyl, propyl, isopropyl, butyl, phenyl, cyclohexyl, fluoro, chloro, methoxy, ethoxy, butoxy, phenoxy, aryl, alkene, alkyne, and heterocyclic, wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

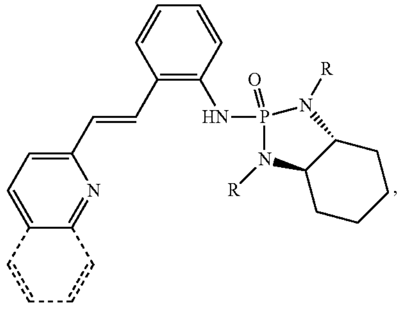

then R is not isopropyl, wherein M is a metal; under conditions that catalyze a reaction; and recycling the molecule of Formula II. In one aspect, the molecule of Formula II is compound 1, which is synthesized by Synthetic route to novel mGAP, tridentate-ligands

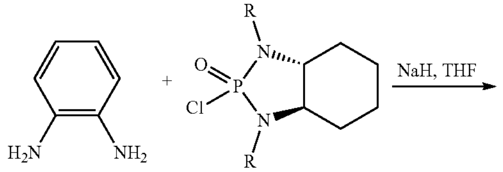

1 2

-continued

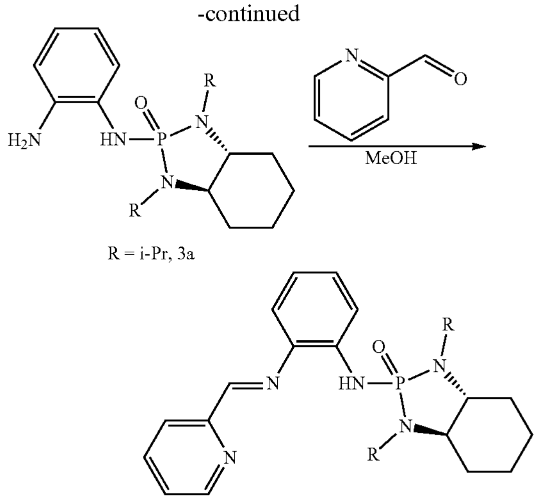

R = i-Pr, 3a

R = Bn, L2
R = p-OMeBn, L3
R = p-$CF_3$Bn, L4
R = 2,4,6-MeBn, L5

In another aspect, the molecule of Formula II is compound 1 that is a ligand made by:

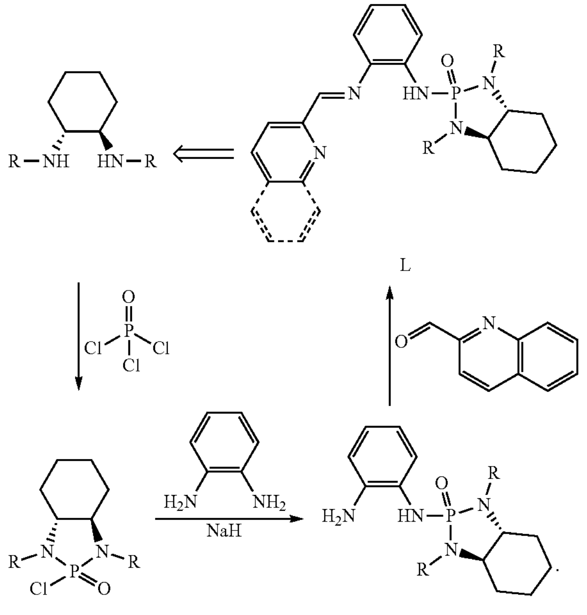

L

In another aspect, R is selected from benzyl, O-methylbenzyl, trifluorobenzyl, or 2,4,6-methyl benzyl. In another aspect, the molecule recycles transition metals selected from at least one of: $1^{st}$-row transition metals, $2^{nd}$-row transition metals, $3^{rd}$-row transition metals, main group metals, lanthanide series transition metals, and actinide series transition metals. In another aspect, the molecule of Formula I recycles transition metals selected from at least one of: platinum, palladium, vanadium, manganese, iron, cobalt, nickel, copper, zinc, zirconium, ruthenium, iridium, rhodium, hafnium. In another aspect, M is at least one of: platinum, palladium, vanadium, manganese, iron, cobalt, nickel, copper, zinc, zirconium, ruthenium, iridium, rhodium, hafnium.

In another aspect, the reaction is an isomerization reaction, a hydrosilylation reaction, a Suzuki-Miyaura coupling, a Negishi coupling, a Sonogashira coupling or a Heck coupling.

As embodied and broadly described herein, an aspect of the present disclosure relates to a tunable tridentate ligand for recyclable homogeneous transition metal catalyst comprising, consisting essentially of, or consisting of: a molecule of Formula I:

Formula I

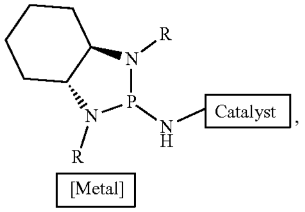

wherein R is selected from methyl, ethyl, propyl, isopropyl, butyl, phenyl, cyclohexyl, fluoro, chloro, methoxy, ethoxy, butoxy, phenoxy, aryl, alkene, alkyne, and heterocyclic, wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

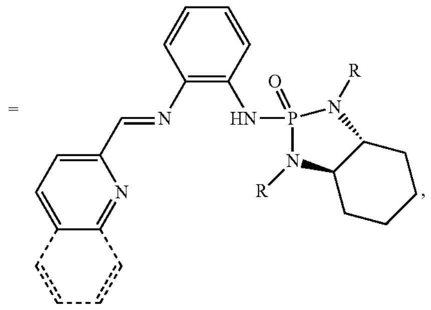

then R is not isopropyl, and optionally M is a metal. The molecule of Formula I is a ligand until the metal is added, at which time the molecule of Formula I becomes the molecule of Formula II, which is a catalyst. In one aspect, the molecule of Formula I is synthesized by Synthetic route to novel mGAP, tridentate-ligands

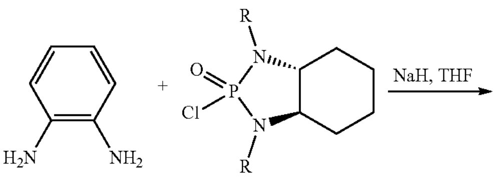

1 2

-continued

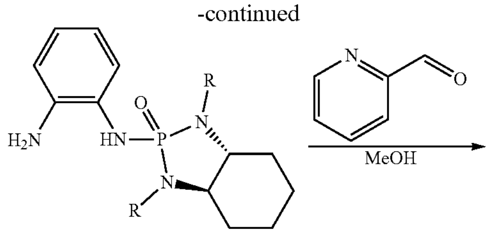

R = i-Pr, 3a

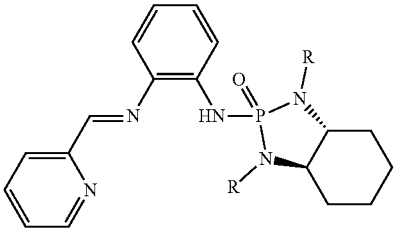

R = Bn, L2
R = p-OMeBn, L3
R = p-CF3Bn, L4
R = 2,4,6-MeBn, L5

In another aspect, the molecule of Formula I is converted into a recyclable catalyst by:

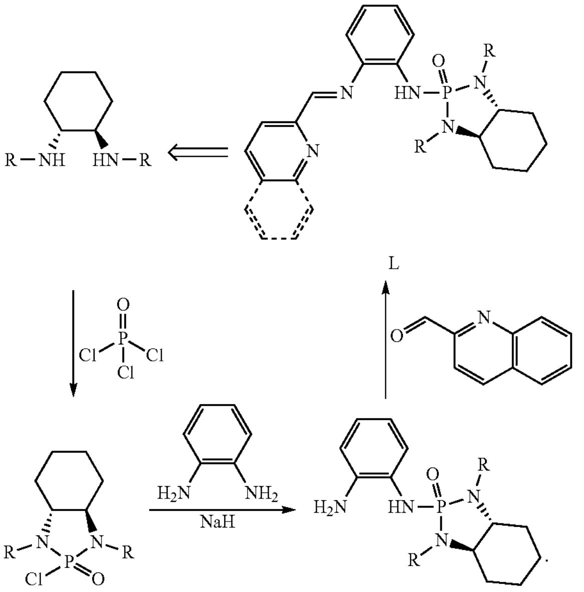

In another aspect, R is selected from isopropyl, benzyl, O-methylbenzyl, trifluorobenzyl, or 2,4,6-methyl benzyl. In another aspect, the molecule of Formula I recycles transition metals selected from at least one of: $1^{st}$-row transition metals, $2^{nd}$-row transition metals, $3^{rd}$-row transition metals, main group metals, lanthanide series transition metals, and actinide series transition metals. In another aspect, the molecule of Formula I recycles transition metals selected from at least one of: platinum, palladium, vanadium, manganese, iron, cobalt, nickel, copper, zinc, zirconium, ruthenium, iridium, rhodium, hafnium.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES—EXAMPLE 1

1. Marciniec, B., Catalysis by transition metal complexes of alkene silylation-recent progress and mechanistic implications. Coordination Chemistry Reviews 2005, 249 (21-22), 2374-2390.
2. Nakajima, Y.; Shimada, S., Hydrosilylation reaction of olefins: recent advances and perspectives. RSC Advances 2015, 5 (26), 20603-20616.
3. Sun, J.; Deng, L., Cobalt Complex-Catalyzed Hydrosilylation of Alkenes and Alkynes. ACS Catalysis 2015, 6 (1), 290-300.
4. Du, X.; Huang, Z., Advances in Base-Metal-Catalyzed Alkene Hydrosilylation. ACS Catalysis 2017, 7 (2), 1227-1243.
5. Obligacion, J. V.; Chirik, P. J., Earth-Abundant Transition Metal Catalysts for Alkene Hydrosilylation and Hydroboration: Opportunities and Assessments. Nat Rev Chem 2018, 2 (5), 15-34.
6. Troegel, D.; Stohrer, J., Recent advances and actual challenges in late transition metal catalyzed hydrosilylation of olefins from an industrial point of view. Coordination Chemistry Reviews 2011, 255 (13-14), 1440-1459.
7. Speier, J. L.; Webster, J. A.; Barnes, G. H., The Addition of Silicon Hydrides to Olefinic Double Bonds. Part II. The Use of Group VIII Metal Catalysts. Journal of the American Chemical Society 1957, 79 (4), 974-979.
8. Karstedt, B. D., Platinum Complexes of Unsaturated Siloxanes and Platinum Containing Organopolysiloxanes. U.S. Patent U.S. Pat. No. 3,775,452A 1973.
9. Marko, I. E.; Sterin, S.; Buisine, O.; Mignani, G.; Branlard, P.; Tinant, B.; Declercq, J. P., Selective and efficient platinum (0)-carbene complexes as hydrosilylation catalysts. Science 2002, 298 (5591), 204-6.
10. Lukin, R. Y.; Kuchkaev, A. M.; Sukhov, A. V.; Bekmukhamedov, G. E.; Yakhvarov, D. G., Platinum-Catalyzed Hydrosilylation in Polymer Chemistry. Polymers (Basel) 2020, 12 (10).
11. Holwell, A. J., Global Release Liner Industry Conference 2008. Platinum Metals Review 2008, 52 (4), 243-246.
12. Bart, S. C.; Lobkovsky, E.; Chirik, P. J., Preparation and molecular and electronic structures of iron (0) dinitrogen and silane complexes and their application to catalytic hydrogenation and hydrosilation. J Am Chem Soc 2004, 126 (42), 13794-807.
13. Wu, J. Y.; Stanzl, B. N.; Ritter, T., A strategy for the synthesis of well-defined iron catalysts and application to regioselective diene hydrosilylation. J Am Chem Soc 2010, 132 (38), 13214-6.
14. Hu, M. Y.; He, Q.; Fan, S. J.; Wang, Z. C.; Liu, L. Y.; Mu, Y. J.; Peng, Q.; Zhu, S. F., Ligands with 1,10-phenanthroline scaffold for highly regioselective iron-catalyzed alkene hydrosilylation. Nat Commun 2018, 9 (1), 221.
15. Chen, C.; Hecht, M. B.; Kavara, A.; Brennessel, W. W.; Mercado, B. Q.; Weix, D. J.; Holland, P. L., Rapid, Regioconvergent, Solvent-Free Alkene Hydrosilylation with a Cobalt Catalyst. J Am Chem Soc 2015, 137 (41), 13244-7.
16. Mo, Z.; Liu, Y.; Deng, L., Anchoring of silyl donors on a N-heterocyclic carbene through the cobalt-mediated silylation of benzylic C—H bonds. Angew Chem Int Ed Engl 2013, 52 (41), 10845-9.
17. Noda, D.; Tahara, A.; Sunada, Y.; Nagashima, H., Non-Precious-Metal Catalytic Systems Involving Iron or Cobalt Carboxylates and Alkyl Isocyanides for Hydrosilylation of Alkenes with Hydrosiloxanes. J Am Chem Soc 2016, 138 (8), 2480-3.
18. Du, X.; Zhang, Y.; Peng, D.; Huang, Z., Base-Metal-Catalyzed Regiodivergent Alkene Hydrosilylations. Angew Chem Int Ed Engl 2016, 55 (23), 6671-5.

19. Chen, J.; Cheng, B.; Cao, M.; Lu, Z., Iron-catalyzed asymmetric hydrosilylation of 1,1-disubstituted alkenes. Angew Chem Int Ed Engl 2015, 54 (15), 4661-4.
20. Cheng, B.; Lu, P.; Zhang, H.; Cheng, X.; Lu, Z., Highly Enantioselective Cobalt-Catalyzed Hydrosilylation of Alkenes. J Am Chem Soc 2017, 139 (28), 9439-9442.
21. Wang, C.; Teo, W. J.; Ge, S., Cobalt-Catalyzed Regiodivergent Hydrosilylation of Vinylarenes and Aliphatic Alkenes: Ligand- and Silane-Dependent Regioselectivities. ACS Catalysis 2016, 7 (1), 855-863.
22. Sang, H. L.; Yu, S.; Ge, S., Cobalt-catalyzed regioselective stereoconvergent Markovnikov 1,2-hydrosilylation of conjugated dienes. Chem Sci 2018, 9 (4), 973-978.
23. Kattuboina, A.; Kaur, P.; Ai, T.; Li, G., Chiral N-phosphonyl imine chemistry: asymmetric aza-Henry reaction. Chem Biol Drug Des 2008, 71 (3), 216-23.
24. Han, J.; Ai, T.; Nguyen, T.; Li, G., Chiral N-phosphonyl imine chemistry: asymmetric additions of ester enolates for the synthesis of beta-amino acids. Chem Biol Drug Des 2008, 72 (2), 120-6.
25. Ai, T.; Han, J.; Chen, Z. X.; Li, G., Chiral N-phosphonyl imine chemistry: asymmetric synthesis of alpha-alkyl beta-amino ketones by reacting phosphonyl imines with ketone-derived enolates. Chem Biol Drug Des 2009, 73 (2), 203-8.
26. Kaur, P.; Wever, W.; Rajale, T.; Li, G., Asymmetric hydrophosphylation of chiral N-phosphonyl imines provides an efficient approach to chiral alpha-amino phosphonates. Chem Biol Drug Des 2010, 76 (4), 314-9.
27. Pindi, S.; Kaur, P.; Shakya, G.; Li, G., N-phosphinyl imine chemistry (I): design and synthesis of novel N-phosphinyl imines and their application to asymmetric aza-Henry reaction. Chem Biol Drug Des 2011, 77 (1), 20-9.
28. An, G.; Seifert, C.; Li, G., N-Phosphonyl/phosphinyl imines and group-assisted purification (GAP) chemistry/technology. Org Biomol Chem 2015, 13 (6), 1600-17.
29. Zhang, S.; Bedi, D.; Cheng, L.; Unruh, D. K.; Li, G.; Findlater, M., Cobalt (II)-Catalyzed Stereoselective Olefin Isomerization: Facile Access to Acyclic Trisubstituted Alkenes. J Am Chem Soc 2020, 142 (19), 8910-8917.
30. Docherty, J. H.; Peng, J.; Dominey, A. P.; Thomas, S. P., Activation and discovery of earth-abundant metal catalysts using sodium tert-butoxide. Nat Chem 2017, 9 (6), 595-600.
31. Zaranek, M.; Pawluc, P., Markovnikov Hydrosilylation of Alkenes: How an Oddity Becomes the Goal. ACS Catalysis 2018, 8 (10), 9865-9876.
32. Zhang, L.; Huang, Z., Synthesis of 1,1,1-Tris(boronates) from Vinylarenes by Co-Catalyzed Dehydrogenative Borylations-Hydroboration. J Am Chem Soc 2015, 137 (50), 15600-3.
33. Atienza, C. C.; Diao, T.; Weller, K. J.; Nye, S. A.; Lewis, K. M.; Delis, J. G.; Boyer, J. L.; Roy, A. K.; Chirik, P. J., Bis(imino)pyridine cobalt-catalyzed dehydrogenative silylation of alkenes: scope, mechanism, and origins of selective allylsilane formation. J Am Chem Soc 2014, 136 (34), 12108-18.

REFERENCES—EXAMPLE 2

(1) (a) Negishi, E.; Huang, Z.-H.; Wang, G.-W.; Mohan, S.; Wang, C.; Hattori, H. Recent Advances in Efficient and Selec-tive Synthesis of Di-, Tri-, and Tetrasubstituted Alkenes via Pd-Catalyzed Alkenylation-Carbonyl Olefination Synergy. Acc. Chem. Res. 2008, 41, 1474-1485; (b) Jordan, V. C. Anti-estrogens and Selective Estrogen Receptor Modulators as Mul-tifunctional Medicines. 2. Clinical Considerations and New Agents. J. Med. Chem. 2003, 46, 1081-1111; (c) Itami, K., Yo-shida, J. Multisubstituted Olefins: Platform Synthesis and Applications to Materials Science and Pharmaceutical Chemis-try. Bull. Chem. Soc. Jpn. 2006, 79, 811-824.
(2) Ma, S.-M.; Zhang, J.-L In Comprehensive Organic Syn-thesis, Vol 4; Knochel, P., Molander, G. A. Eds.; Elsevier Ltd.: Amsterdam, 2014.
(3) For reviews of the alkene synthesis, see: (a) Denmark, S. E.; Amburgey, A New, General, and Stereoselective Method for the Synthesis of Trisubstituted Alkenes. J. Am. Chem. Soc. 1993, 115, 10386-10387; (b) Flynn, A.-B.; Ogilvie, W. W. Stereocontrolled Synthesis of Tetrasubstituted Olefins. Chem. Rev. 2007,107, 4698-4745; (c) Manikandan, R.; Jeganmohan, M. Recent advances in the ruthenium-catalyzed hydroarylation of alkynes with aromatics: synthesis of trisubstituted alkenes. Org. Biomol. Chem. 2015, 13, 10420-10436; (d) Wang, J. Stereoselective Alkene Synthesis; Springer: Berlin, 2012. (e) Ngu-yen, T. T.; Koh, M. J.; Mann, T. J.; Schrock, R. R.; Hoveyda, A. M. Synthesis of E- and Z-Trisubstituted Alkenes by Catalytic Cross-Metathesis. Nature, 2017, 552, 347-354; (f) Mu, Y.-C.; Nguyen, T. T.; Koh, M. J.; Schrock, R. R.; Hoveyda, A. H. E- and Z-, Di- and Tri-substituted Alkenyl Nitriles through Cata-lytic Cross-Metathesis. Nat. Chem. 2019, 11, 478-487; (g) Zhu, C.; Yue, H.; Maity, B.; Atodiresei, I.; Cavallo, L.; Rueping, M. A Multicomponent Synthesis of Stereodefined Olefins via Nickel Catalysis and Single Electron/Triplet Energy Transfer. Nat. Catal. 2019, 2, 678-687.
(4) For reviews of the Wittig olefination, see: (1) Maryanoff, B. E.; Reitz, A. B. The Wittig Olefination Reaction and Modi-fications Involving Phosphoryl-Stabilized Carbanions. Stere-ochemistry, Mechanism, and Selected Synthetic Aspects. Chem. Rev.1989, 89, 863-927; (2) Edmonds, M.; Abell, A. In Modern Carbonyl Olefination, Takeda, T. Ed; WileyVCH: Weinheim, 2004, pp 1-17.
(5) For reviews of the olefin isomerization, see: (a) Uma, R.; Crévisy, C.; Grée, R. Transposition of Allylic Alcohols into Carbonyl Compounds Mediated by Transition Metal Com-plexes. Chem. Rev. 2003, 103, 27-52; (b) Krompiec, S.; Krompiec, M.; Penczek, R.; Ignasiak, H. Double Bond Migra-tion in N-allylic Systems Catalyzed by Transition Metal Com-plexes. Coord. Chem. Rev. 2008, 252, 1819-1841; (c) Donohoe, T. J.; O'Riordan, T. J. C.; Rosa, C. P. Ruthenium-Catalyzed Isomerization of Terminal Olefins: Applications to Synthesis. Angew. Chem., Int. Ed. 2009, 48, 1014-1017; (d) Hilt, G. Double Bond Isomerisation and Migration-New Play-grounds for Transition Metal-Catalysis. ChemCatChem 2014, 6, 2484-2485; (e) Larionov, E.; Li, H.; Mazet, C. Well-Defined Transition Metal Hydrides in Catalytic Isomerizations. Chem. Commun. 2014, 50, 9816-9826; (f) Hassam, M.; Taher, A.; Arnott, G. E.; Green, I. R.; van Otterlo, W. A. L. Isomerization of Allylbenzenes. Chem. Rev. 2015, 115, 5462-5569; (g) Hol-land, P. L. Distinctive Reaction Pathways at Base Metals in High-Spin Organometallic Catalysts. Acc. Chem. Res. 2015, 48, 1696-1702; (h) Vasseur, A.; Bruffaerts, J.; Marek, I. Re-mote Functionalization through Alkene Isomerization. Nat. Chem. 2016, 8, 209-219; (i) Liu, X.-F.; Li, B.; Liu, Q. Base-Metal-Catalyzed Olefin Isomerization Reactions. Synthesis 2019, 51, 1293-1310.
(6) For selected examples of noble metal-catalyzed alkene isomerization: (a) Grotjahn, D. B.; Larsen, C. R.; Gustafson, J. L.; Nair, R.; Sharma, A. Extensive Isomerization of Alkenes Using a Bifunctional Catalyst: An Alkene Zipper. J. Am. Chem. Soc. 2007, 129, 9592-9593; (b) Erdogan, G.; Grotjahn, D. B. Mild and Selective Deuteration and Isomerization of Alkenes by a Bifunctional Catalyst and Deuterium Oxide. J. Am. Chem. Soc. 2009, 131, 10354-10355; (c) Lim, H. J.; Smith, C. R.; RajanBabu, T. V. Facile Pd(II)- and Ni(II)-Catalyzed Isomerization of Terminal Alkenes into 2-Alkenes. J. Org. Chem. 2009, 74, 4565-4572; (d) Scarso, A.; Colladon, M.; Sgarbossa, P.; Santo, C.; Michelin, R. A.; Strukul, G. High-ly Active and Selective Platinum (II)-Catalyzed Isomerization of Allylbenzenes: Efficient Access to (E)-Anethole and Other Fragrances via Unusual Agostic Intermediates. Organometal-lics 2010, 29, 1487-1497; (e) Gauthier, D.; Lindhardt, A. T.; Olsen, E.: P. K.; Overgaard, J.; Skrydstrup, T. In Situ Generated Bulky Palladium Hydride Complexes as Catalysts for the Effi-cient Isomerization of Olefins. Selective Transformation of Terminal Alkenes to 2-Alkenes. J. Am. Chem. Soc. 2010, 132, 7998-8009; (f) Larsen, C. R.; Grotjahn, D. B. Stereoselective Alkene Isomerization over One Position. J. Am. Chem. Soc. 2012, 134, 10357-10360; (g) Clark, J. R.; Griffiths, J. R.; Div-er, S. T. Ruthenium Hydride-Promoted Dienyl Isomerization: Access to Highly Substituted 1,3-Dienes. J. Am. Chem. Soc. 2013, 135, 3327-3330; (h) Zhuo, L.-G.; Yao, Z.-K.; Yu, Z.-X. Synthesis of Z-Alkenes from Rh(I)-Catalyzed Olefin Isomeri-zation of β,y-Unsaturated Ketones. Org. Lett. 2013, 15, 4634-4637; (i) Larionov, E.; Lin, L.; Guénée, L.; Mazet, C. Scope and Mechanism in Palladium-Catalyzed Isomerizations of Highly Substituted Allylic, Homoallylic, and Alkenyl Alco-hols. J. Am. Chem. Soc. 2014, 136, 16882-16894; (j) Larsen, C. R.; Erdogan, G.; Grotjahn, D. B. General Catalyst Control of the Monoisomerization of 1-Alkenes to trans-2-Alkenes. J. Am. Chem. Soc. 2014, 136, 1226-1229; (k) Lin, L.; Romano, C.; Mazet, C. Palladium-Catalyzed Long-Range Deconjugative Isomerization of Highly Substituted α,β-Unsaturated Carbon-yl Compounds. J. Am. Chem. Soc. 2016, 138, 10344-10350; (1) Wang, Y.; Qin, C.; Jia, X.; Leng, X.; Huang, Z. An Agostic Irid-ium Pincer Complex as a Highly Efficient and Selective Cata-lyst for Monoisomerization of 1-Alkenes to trans-2-Alkenes. Angew. Chem. Int. Ed. 2017, 56, 1614-1618; (m) Huang, R.-Z.; Lau, K.-K.; Li, Z.-F.; Liu, T.-L.; Zhao, Y. Rhodium-Catalyzed Enantioconvergent Isomerization of Homoallylic and Bish-omoallylic Secondary Alcohols. J. Am. Chem. Soc. 2018, 140, 14647-14654.

(7) Chen, C.; Dugan, T. R.; Brennessel, W. W.; Weix, D. J.; Holland, P. L. Z-Selective Alkene Isomerization by High-Spin Cobalt (II) Complexes. J. Am. Chem. Soc. 2014, 136, 945-955.

(8) Crossley, S. W. M.; Barabé, F.; Shenvi, R. A. Simple, Chemoselective, Catalytic Olefin Isomerization. J. Am. Chem. Soc. 2014, 136, 16788-16791.

(9) Schmidt, A.; Nödling, A. R.; Hilt, G. An Alternative Mechanism for the Cobalt-Catalyzed Isomerization of Terminal Alkenes to (Z)-2-Alkenes. Angew. Chem. Int. Ed. 2015, 54, 801-804.

(10) Li, G.; Kuo, J. L.; Han, A.; Abuyuan, J. M.; Young, L. C.; Norton, J. R.; Palmer, J. H. Radical Isomerization and Cy-cloisomerization Initiated by H. Transfer. J. Am. Chem. Soc. 2016, 138, 7698-7704.

(11) Liu, X.; Zhang, W.; Wang, Y.; Zhang, Z.-X.; Jiao, L.; Liu, Q. Cobalt-Catalyzed Regioselective Olefin Isomerization Under Kinetic Control. J. Am. Chem. Soc. 2018, 140, 6873-6882.

(12) Cramer, R.; Lindsey, R. V. The Mechanism of Isomeriza-tion of Olefins with Transition Metal Catalysts. J. Am. Chem. Soc. 1966, 88, 3534-3544.

(13) Doherty, N. M.; Bercaw, J. E. Kinetics and Mechanism of the Insertion of Olefins into Transition-Metal-Hydride Bonds. J. Am. Chem. Soc. 1985, 107, 2670-2682.

(14) Cuvigny, T.; du Penhoat, H.; *Julia*, M. Isomérisation cis trans régiosélective de doubles liaison trisubstitutées. Tetra-hedron Lett. 1980, 21, 1331-1334.

(15) (a) Wekesa, F. S.; Arias-Ugarte, R.; Kong, L.; Sumner, Z.; McGovern, G. P.; Findlater, M. Iron-Catalyzed Hydrosilyla-tion of Aldehydes and Ketones under Solvent-Free Condi-tions. Organometallics 2015, 34, 5051-5056; (b) Tamang, S. R.; Findlater, M. Iron Catalyzed Hydroboration of Aldehydes and Ketones. J. Org. Chem. 2017, 82, 12857-12862; (c) Ta-mang, S. R.; Singh, A.; Unruh, D. K.; Findlater, M. Nickel-Catalyzed Regioselective 1,4-Hydroboration of N-Heteroarenes. ACS Catal. 2018, 8, 6186-5191; (d) Tamang, S. R.; Bedi, D.; Shafiei-Haghighi, S.; Smith, C. R.; Crawford, C.; Findlater, M. Cobalt-Catalyzed Hydroboration of Alkenes, Aldehydes, and Ketones. Org. Lett. 2018, 20, 6695-6700.

(16) (a) Kaur, P.; Wever, W.; Rajale, T.; Li, G. Asymmetric Hydrophosphylation of Chiral N-Phosphonyl Imines Provides an Efficient Approach to Chiral a-Amino Phosphonates. Chem. Biol. Drug Des. 2010, 76, 314-319; (b) Kaur, P.; Pindi, S.; Wever, W.; Rajale, T.; Li, G. Asymmetric Catalytic Strecker Reaction of N-Phosphonyl Imines with Et2AlCN Using Ami-no Alcohols and BINOLs as Catalysts. Chem. Commun. 2010, 46, 4330-4332; (c) Kaur, P.; Wever, W.; Pindi, S.; Milles, R.; Gu, P.; Shi, M.; Li, G. The GAP Chemistry for Chiral N-Phosphonyl Imine-Based Strecker Reaction. Green Chem. 2011, 13, 1288-1292; (d) Zhang, H.; Yang, B.; Yang, Z.; Lu, H.; Li, G. Asymmetric Synthesis of Chiral α-Methyl-α,β-diamino Acid Derivatives via Group-Assisted Purification Chemistry Using N-Phosphonyl Imines and a Ni(II)-Complexed Alanine Schiff Base. J. Org. Chem. 2016, 81, 7654-7661; (e) Qiao, S.; Wilcox, C. B.; Unruh, D. K.; Jiang, B.; Li, G. Asymmetric [3+2] Cycloaddition of Chiral N-Phosphonyl Imines with Methyl Isocyanoacetate for Accessing 2-Imidazolines with Switchable Stereoselectivity. J. Org. Chem.2017, 82, 2992-2999; (f) Zhang, H.; Yang, Z.; Zhao, B. N.; Li, G. Group-Assisted Purifi-cation Chemistry for Asymmetric Mannich-type Reaction of Chiral N-Phosphonyl Imines with Azlactones Leading to Syn-theses of a-Quaternary a,B-Diamino Acid Derivatives. J. Org. Chem. 2018, 83, 644-655.

(17) Atzrodt, J.; Derdau, V.; Kerr, W. J.; Reid, M. Deuterium- and Tritium-Labelled Compounds: Applications in the Life Sciences. Angew. Chem. Int. Ed. 2018, 57, 1758-1784.

(18) Zhao, J.; Cheng, B.; Chen, C.; Lu, Z. Cobalt-Catalyzed Migrational Isomerization of Styrenes. Org. Lett. 2020, 22, 837-841.

(19) Mei, J.; Leung, N. L. C.; Kwok, R. T. K.; Lam, J. W. Y.; Tang, B.-Z. Aggregation-Induced Emission: Together We Shine, United We Soar. Chem. Rev. 2015, 115, 11718-11940.

(20) Yang, J; Huang, J.; Li, Q.; Li, Z. Blue AIEgens: ap-proaches to control the intramolecular conjugation and the optimized performance of OLED devices. J. Mater. Chem. C 2016, 4, 2663-2684.

(21) Atzrodt, J.; Derdau, V.; Kerr, W. J.; Reid, M. C—H Func-tionalisation for Hydrogen Isotope Exchange. Angew. Chem. Int. Ed. 2018, 57, 3022-3047.

REFERENCES—EXAMPLE 3

1. G. W. Parshall, Journal of Molecular Catalysis, 1978, 4, 243-270.
2. F. J. Waller, Journal of Molecular Catalysis, 1985, 31, 123-136.
3. P. W. N. M. van Leeuwen, in Encyclopedia of Physical Science and Technology (Third Edition), ed. R. A. Meyers, Academic Press, New York, 2003, pp. 457-490.
4. R. Schlögl, Angewandte Chemie International Edition, 2015, 54, 3465-3520.
5. J. H. Clark and D. J. Macquarrie, Organic Process Research & Development, 1997, 1, 149-162.
6. P. Kaur, W. Wever, T. Rajale and G. Li, Chemical Biology & Drug Design, 2010, 76, 314-319.
7. P. Kaur, S. Pindi, W. Wever, T. Rajale and G. Li, Chemical Communications, 2010, 46, 4330-4332.
8. S. Zhang, D. Bedi, L. Cheng, D. K. Unruh, G. Li and M. Findlater, Journal of the American Chemical Society, 2020, 142, 8910-8917.
9. S. Zhang, J.-S. Liao, D. K. Unruh, G. Li and M. Findlater, Organic Chemistry Frontiers, 2021, 8, 2174-2181.
10. N. Kuuloja, T. Kylmälä, Y. Xu and R. Franzén, Central European Journal of Chemistry, 2008, 6, 390-392.
11. N. Miyaura, K. Yamada and A. Suzuki, Tetrahedron Letters, 1979, 20, 3437-3440.
12. S. E. Hooshmand, B. Heidari, R. Sedghi and R. S. Varma, Green Chemistry, 2019, 21, 381-405.
13. N. Miyaura and A. Suzuki, Journal of the Chemical Society, Chemical Communications, 1979, 866-867.
14. T. E. Jacks, D. T. Belmont, C. A. Briggs, N. M. Horne, G. D. Kanter, G. L. Karrick, J. J. Krikke, R. J. McCabe, J. G. Mustakis, T. N. Nanninga, G. S. Risedorph, R. E. Seamans, R. Skeean, D. D. Winkle and T. M. Zennie, Organic Process Research & Development, 2004, 8, 201-212.
15. N. Miyaura and A. Suzuki, Chemical Reviews, 1995, 95, 2457-2483.
16. R. Martin and S. L. Buchwald, Accounts of Chemical Research, 2008, 41, 1461-1473.
17. LPPM, Palladium Prices Monthly average, http://www.lppm.com/statistics.aspx, 2020).
18. H. Renner, G. Schlamp, I. Kleinwächter, E. Drost, H. M. Lüschow, P. Tews, P. Panster, M. Diehl, J. Lang, T. Kreuzer, A. Knödler, K. A. Starz, K. Dermann, J. Rothaut, R. Drieselmann, C. Peter, R. Schiele, J. Coombes, M. Hosford and D. F. Lupton, in Ullmann's Encyclopedia of Industrial Chemistry, pp. 1-73.
19. A. D. Genkin and T. L. Evstigneeva, Economic Geology, 1986, 81, 1203-1212.
20. K. Sanderson, Nature, 2011, 469, 18-20.
21. H. Dong, J. Zhao, J. Chen, Y. Wu and B. Li, International Journal of Mineral Processing, 2015, 145, 108-113.
22. F. L. Bernardis, R. A. Grant and D. C. Sherrington, Reactive and Functional Polymers, 2005, 65, 205-217.
23. P. T. W. Anastas, J. C., Green Chemistry: Theory and Practice, Oxford University Press: New York,, 1998.
24. Á. Molnár, Chemical Reviews, 2011, 111, 2251-2320.
25. V. Calò, A. Nacci, A. Monopoli and F. Montingelli, The Journal of Organic Chemistry, 2005, 70, 6040-6044.
26. Z. Zhang and Z. Wang, The Journal of Organic Chemistry, 2006, 71, 7485-7487.
27. S. Afewerki, A. Franco, A. M. Balu, C.-W. Tai, R. Luque and A. Córdova, Scientific Reports, 2020, 10, 6407.
28. R. Ghorbani-Vaghei, N. Sarmast and F. Rahmatpour, Comptes Rendus Chimie, 2018, 21, 644-651.
29. T. H. Kwon, K. Y. Cho, K.-Y. Baek, H. G. Yoon and B. M. Kim, RSC Advances, 2017, 7, 11684-11690.
30. S. Kumar, G. K. Rao, A. Kumar, M. P. Singh, F. Saleem and A. K. Singh, RSC Advances, 2015, 5, 20081-20089.
31. M. Charbonneau, G. Addoumieh, P. Oguadinma and A. R. Schmitzer, Organometallics, 2014, 33, 6544-6549.
32. S. Bhat K, V. Lanke, J. D. Prasad and K. R. Prabhu, Applied Catalysis A: General, 2020, 596, 117516.
33. J. Almond-Thynne, D. C. Blakemore, D. C. Pryde and A. C. Spivey, Chemical Science, 2017, 8, 40-62.
34. Y.-K. Jeon, J.-Y. Lee, S.-E. Kim and W.-S. Kim, The Journal of Organic Chemistry, 2020, 85, 7399-7412.
35. R. A. Widenhoefer and S. L. Buchwald, Organometallics, 1996, 15, 3534-3542.
36. R. A. Widenhoefer and S. L. Buchwald, Organometallics, 1996, 15, 2755-2763.
37. T. E. Barder and S. L. Buchwald, Journal of the American Chemical Society, 2007, 129, 12003-12010.
38. Y. Xia, J. Wang and G. Dong, Journal of the American Chemical Society, 2018, 140, 5347-5351.
39. L. Whitaker, H. Y. Harb and A. P. Pulis, Chemical Communications, 2017, 53, 9364-9367.
40. N. T. S. Phan, M. Van Der Sluys and C. W. Jones, Advanced Synthesis & Catalysis, 2006, 348, 609-679.
41. B. Sun, L. Ning and H. C. Zeng, Journal of the American Chemical Society, 2020, 142, 13823-13832.
42. E. Bulatov, E. Lahtinen, L. Kivijärvi, E. Hey-Hawkins and M. Haukka, ChemCatChem, 2020, 12, 4831-4838.
43. F. Neese, 2012, vol. 2, pp. 73-78.
44. F. Neese, The ORCA program system, Wiley Interdisciplinary Reviews: Computational Molecular Science, 2012.
45. J. P. Perdew, K. Burke and M. Ernzerhof, Physical Review Letters, 1996, 77, 3865-3868.
46. E. v. Lenthe, E. J. Baerends and J. G. Snijders, The Journal of Chemical Physics, 1993, 99, 4597-4610.
47. M. Kiani, M. Bagherzadeh, S. Meghdadi, F. Fadaci-Tirani, K. Schenk-Joß and N. Rabiee, Applied Organometallic Chemistry, 2020, 34, e5531.
48. V. N. Shinde, N. Bhuvanesh, A. Kumar and H. Joshi, Organometallics, 2020, 39, 324-333.
49. W. Kohn and L. J. Sham, Physical Review, 1965, 140, A1133-A1138.
50. S. Grimme, S. Ehrlich and L. Goerigk, Journal of Computational Chemistry, 2011, 32, 1456-1465.
51. S. Grimme, J. Antony, S. Ehrlich and H. Krieg, The Journal of Chemical Physics, 2010, 132, 154104.
52. F. Weigend, Physical Chemistry Chemical Physics, 2006, 8, 1057-1065.
53. D. A. Pantazis, X.-Y. Chen, C. R. Landis and F. Neese, Journal of Chemical Theory and Computation, 2008, 4, 908-919.

REFERENCES—EXAMPLE 4

1. Hassan, J.; Sevignon, M.; Gozzi, C.; Schulz, E.; Lemaire, M., Aryl-aryl bond formation one century after the discovery of the Ullmann reaction. Chem Rev 2002, 102 (5), 1359-470.
2. Magano, J.; Dunetz, J. R., Large-scale applications of transition metal-catalyzed couplings for the synthesis of pharmaceuticals. Chem Rev 2011, 111 (3), 2177-250.
3. Watson, W., Transition Metal-Catalyzed Couplings in Process Chemistry: Case Studies from the Pharmaceutical IndustryTransition Metal-Catalyzed Couplings in Process Chemistry: Case Studies from the Pharmaceutical Industry. Edited by JavierMagano and Joshua R.Dunetz. Wiley- VCH: Weinheim, Germany. 2013. 368 pages. Price $190.00, $138.00, $115.00. ISBN 978-3-527-33279-3. *Organic Process Research & Development* 2014, 18 (1), 277-277.
4. Egorova, K. S.; Ananikov, V. P., Toxicity of Metal Compounds: Knowledge and Myths. *Organometallics* 2017, 36 (21), 4071-4090.
5. Jo, J.; Tu, Q.; Xiang, R.; Li, G.; Zou, L.; Maloney, K. M.; Ren, H.; Newman, J. A.; Gong, X.; Bu, X., Metal Speciation in Pharmaceutical Process Development: Case Studies and Process/Analytical Challenges for a Palladium-Catalyzed Cross-Coupling Reaction. *Organometallics* 2018, 38 (1), 185-193.
6. Kaur, P.; Pindi, S.; Wever, W.; Rajale, T.; Li, G., Asymmetric catalytic N-phosphonyl imine chemistry: the use of primary free amino acids and Et2AlCN for asymmetric catalytic Strecker reaction. *J Org Chem* 2010, 75 (15), 5144-50.
7. Kaur, P.; Pindi, S.; Wever, W.; Rajale, T.; Li, G., Asymmetric catalytic Strecker reaction of N-phosphonyl imines with Et2AlCN using amino alcohols and BINOLs as catalysts. *Chem Commun* (*Camb*) 2010, 46 (24), 4330-2.
8. Kaur, P.; Pindi, S.; Wever, W.; Rajale, T.; Li, G. G., Asymmetric catalytic Strecker reaction of N-phosphoryl imines with Et2AlCN using amino alcohols and BINOLs as catalysts. *Chem Commun* 2010, 46 (24), 4330-4332.
9. Kaur, P.; Wever, W.; Pindi, S.; Milles, R.; Gu, P.; Shi, M.; Li, G. G., The GAP chemistry for chiral N-phosphonyl imine-based Strecker reaction. *Green Chem* 2011, 13 (5), 1288-1292.
10. Kaur, P.; Wever, W.; Rajale, T.; Li, G. G., Asymmetric Hydrophosphylation of Chiral
N-Phosphonyl Imines Provides an Efficient Approach to Chiral alpha-Amino Phosphonates. *Chem Biol Drug Des* 2010, 76 (4), 314-319.
11. Qiao, S.; Wilcox, C. B.; Unruh, D. K.; Jiang, B.; Li, G. G., Asymmetric [3+2] Cycloaddition of Chiral N-Phosphonyl Imines with Methyl Isocyanoacetate for Accessing 2-Imidazolines with Switchable Stereoselectivity. *Journal of Organic Chemistry* 2017, 82 (6), 2992-2999.
12. Zhang, H. W.; Yang, B.; Yang, Z.; Lu, H. J.; Li, G. G., Asymmetric Synthesis of Chiral alpha-Methyl-alpha, beta-diamino Acid Derivatives via Group-Assisted Purification Chemistry Using N-Phosphonyl Imines and a Ni(II)-Complexed Alanine Schiff Base. *Journal of Organic Chemistry* 2016, 81 (17), 7654-7661.
13. Zhang, H. W.; Yang, Z.; Zhao, B. N.; Li, G. G., Group-Assisted Purification Chemistry for Asymmetric Mannich-type Reaction of Chiral N-Phosphonyl Imines with Azlactones Leading to Syntheses of alpha-Quaternary alpha,beta-Diamino Acid Derivativest. *Journal of Organic Chemistry* 2018, 83 (2), 644-655.
14. Kattuboina, A.; Kaur, P.; Nguyen, T.; Li, G., Chiral N-phosphonyl imine chemistry: asymmetric 1,2-additions of allylmagnesium bromides. *Tetrahedron Letters* 2008, 49 (23), 3722-3724.
15. Kattuboina, A.; Li, G., Chiral N-phosphonyl imine chemistry: new reagents and their applications for asymmetric reactions. *Tetrahedron Letters* 2008, 49 (10), 1573-1577.
16. Kaur, P.; Shakya, G.; Sun, H.; Pan, Y.; Li, G., Chiral N-phosphonyl imine chemistry: an efficient asymmetric synthesis of chiral N-phosphonyl propargylamines. *Org Biomol Chem* 2010, 8 (5), 1091-6.
17. Kaur, P.; Nguyen, T.; Li, G., ChiralN-Phosphonylimine Chemistry: Asymmetric Synthesis ofN-Phosphonyl B-Amino Weinreb Amides. *European Journal of Organic Chemistry* 2009, 2009 (6), 912-916.
18. Parshall, G. W., Industrial applications of homogeneous catalysis. A review. *Journal of Molecular Catalysis* 1978, 4 (4), 243-270.
19. Waller, F. J., Recent achievements, trends and prospects in homogeneous catalysis. *Journal of Molecular Catalysis* 1985, 31 (2), 123-136.
20. Gladysz, J. A., Introduction: Recoverable Catalysts and Reagents: Perspective and Prospective. *Chemical Reviews* 2002, 102 (10), 3215-3216.
21. Gladysz, J. A., Recoverable catalysts. Ultimate goals, criteria of evaluation, and the green chemistry interface. *Pure and Applied Chemistry* 2001, 73 (8), 1319-1324.
22. Cole-Hamilton, D. J., Homogeneous catalysis--new approaches to catalyst separation, recovery, and recycling. *Science* 2003, 299 (5613), 1702-6.
23. Kragl, U.; Dwars, T., The development of new methods for the recycling of chiral catalysts. *Trends in Biotechnology* 2001, 19 (11), 442-449.
24. Shende, V. S.; Saptal, V. B.; Bhanage, B. M., Recent Advances Utilized in the Recycling of Homogeneous Catalysis. *Chem Rec* 2019, 19 (9), 2022-2043.
25. Dinh, L. V.; Gladysz, J. A., "Catalyst-on-a-tape"-Teflon: a new delivery and recovery method for homogeneous fluorous catalysts. *Angew Chem Int Ed Engl* 2005, 44 (26), 4095-7.
26. Chiu, C. F.; Ho, J. H.; Tessema, E.; Lu, Y.; Shen, C. R.; Lin, C. W.; Lu, N., Short-Chained Platinum Complex Catalyzed Hydrosilylation under Thermomorphic Conditions: Heterogeneous Phase Separation at Ice Temperature. *Molecules* 2021, 26 (2).
27. Mujahed, S.; Valentini, F.; Cohen, S.; Vaccaro, L.; Gelman, D., Polymer-Anchored Bifunctional Pincer Catalysts for Chemoselective Transfer Hydrogenation and Related Reactions. *ChemSusChem* 2019, 12 (20), 4693-4699.
28. Tamang, S. R.; Cozzolino, A. F.; Findlater, M., Iron catalysed selective reduction of esters to alcohols. Organic & Biomolecular Chemistry 2019, 17 (7), 1834-1838.
29. Larson, P. J.; Wekesa, F. S.; Singh, A.; Smith, C. R.; Rajput, A.; McGovern, G. P.; Unruh, D. K.; Cozzolino, A. F.; Findlater, M., Synthesis, characterization, electrochemical properties and theoretical calculations of (BIAN) iron complexes. wPolyhedron 2019, 159, 365-374.
30. Cetin, M. M.; Hodson, R. T.; Hart, C. R.; Cordes, D. B.; Findlater, M.; Casadonte, D. J., Jr.; Cozzolino, A. F.; Mayer, M. F., Characterization and photocatalytic behavior of 2,9-di(aryl)-1,10-phenanthroline copper (i) complexes. Dalton Trans 2017, 46 (20), 6553-6569.
31. Shafiei-Haghighi, S.; Brar, A.; Unruh, D. K.; Cozzolino, A. F.; Findlater, M., Experimental and Computational Studies of Phosphine Ligand Displacement in Iridium-Pincer Complexes Employing Pyridine or Acetonitrile. *Organometallics* 2020.
32. Dioumaev, V. K.; Bullock, R. M., A recyclable catalyst that precipitates at the end of the reaction. *Nature* 2003, 424 (6948), 530-2.
33. Sattler, W.; Ruccolo, S.; Rostami Chaijan, M.; Nasr Allah, T.; Parkin, G., Hydrosilylation of Aldehydes and Ketones Catalyzed by a Terminal Zinc Hydride Complex, [K3-Tptm]ZnH. *Organometallics* 2015, 34 (19), 4717-4731.

34. Sattler, W.; Parkin, G., Zinc Catalysts for On-Demand Hydrogen Generation and Carbon Dioxide Functionalization. *Journal of the American Chemical Society* 2012, 134 (42), 17462-17465.
35. Trovitch, R. J., Comparing Well-Defined Manganese, Iron, Cobalt, and Nickel Ketone Hydrosilylation Catalysts. *Synlett* 2014, 25 (12), 1638-1642.
36. Mukhopadhyay, T. K.; Flores, M.; Groy, T. L.; Trovitch, R. J., A Highly Active Manganese Precatalyst for the Hydrosilylation of Ketones and Esters. *Journal of the American Chemical Society* 2014, 136 (3), 882-885.
37. Chidara, V. K.; Du, G., An Efficient Catalyst Based on Manganese Salen for Hydrosilylation of Carbonyl Compounds. *Organometallics* 2013, 32 (18), 5034-5037.
38. Miyaura, N.; Yamada, K.; Suzuki, A., A new stereospecific cross-coupling by the palladium-catalyzed reaction of 1-alkenylboranes with 1-alkenyl or 1-alkynyl halides. *Tetrahedron Letters* 1979, 20 (36), 3437-3440.
39. Hooshmand, S. E.; Heidari, B.; Sedghi, R.; Varma, R. S., Recent advances in the Suzuki-Miyaura cross-coupling reaction using efficient catalysts in eco-friendly media. *Green Chemistry* 2019, 21 (3), 381-405.
40. LPPM Palladium Prices Monthly average. http://www.lppm.com/statistics.aspx.
41. Martin, R.; Buchwald, S. L., Palladium-Catalyzed Suzuki-Miyaura Cross-Coupling Reactions Employing Dialkylbiaryl Phosphine Ligands. *Accounts of Chemical Research* 2008, 41 (11), 1461-1473.
42. Anastas, P. T. W., J. C., *Green Chemistry: Theory and Practice*. Oxford University Press: New York,, 1998.
43. Molnár, Á., Efficient, Selective, and Recyclable Palladium Catalysts in Carbon-Carbon Coupling Reactions. *Chemical Reviews* 2011, 111 (3), 2251-2320.
44. Zhang, S.; Bedi, D.; Cheng, L.; Unruh, D. K.; Li, G.; Findlater, M., Cobalt (II)-Catalyzed Stereoselective Olefin Isomerization: Facile Access to Acyclic Trisubstituted Alkenes. *J Am Chem Soc* 2020, 142 (19), 8910-8917.
45. Byrne, F. P.; Jin, S.; Paggiola, G.; Petchey, T. H. M.; Clark, J. H.; Farmer, T. J.; Hunt, A. J.; Robert McElroy, C.; Sherwood, J., Tools and techniques for solvent selection: green solvent selection guides. *Sustainable Chemical Processes* 2016, 4 (1).
46. Yao, C.; Liu, D.; Li, P.; Wu, C.; Li, S.; Liu, B.; Cui, D., Highly 3,4-Selective Living Polymerization of Isoprene and Copolymerization with ε-Caprolactone by an Amidino N-Heterocyclic Carbene Ligated Lutetium Bis(alkyl) Complex. *Organometallics* 2014, 33 (3), 684-691.
47. Gallagher, K. J.; Webster, R. L., Room temperature hydrophosphination using a simple iron salen pre-catalyst. *Chemical Communications* 2014, 50 (81), 12109-12111.
48. Gallagher, K. J.; Espinal-Viguri, M.; Mahon, M. F.; Webster, R. L., A Study of Two Highly Active, Air-Stable Iron (III)-μ-Oxo Precatalysts: Synthetic Scope of Hydrophosphination using Phenyl- and Diphenylphosphine. *Advanced Synthesis & Catalysis* 2016, 358 (15), 2460-2468.
49. Yuan, J.; Hu, H.; Cui, C., N-Heterocyclic Carbene-Ytterbium Amide as a Recyclable Homogeneous Precatalyst for Hydrophosphination of Alkenes and Alkynes. *Chemistry—A European Journal* 2016, 22 (16), 5778-5785.
50. Uma, R.; Crevisy, C.; Gree, R., Transposition of allylic alcohols into carbonyl compounds mediated by transition metal complexes. *Chemical Reviews* 2003, 103 (1), 27-51.
51. Krompiec, S.; Krompiec, M.; Penczek, R.; Ignasiak, H., Double bond migration in N-allylic systems catalyzed by transition metal complexes. *Coordin Chem Rev* 2008, 252 (15-17), 1819-1841.
52. Donohoe, T. J.; O'Riordan, T. J. C.; Rosa, C. P., Ruthenium-Catalyzed Isomerization of Terminal Olefins: Applications to Synthesis. *Angew Chem Int Edit* 2009, 48 (6), 1014-1017.
53. Hilt, G., Double Bond Isomerisation and Migration-New Playgrounds for Transition Metal-Catalysis. *Chemcatchem* 2014, 6 (9), 2484-2485.
54. Larionov, E.; Li, H. H.; Mazet, C., Well-defined transition metal hydrides in catalytic isomerizations. *Chem Commun* 2014, 50 (69), 9816-9826.
55. Hassam, M.; Taher, A.; Arnott, G. E.; Green, I. R.; van Otterlo, W. A. L., Isomerization of Allylbenzenes. *Chemical Reviews* 2015, 115 (11), 5462-5569.
56. Holland, P. L., Distinctive Reaction Pathways at Base Metals in High-Spin Organometallic Catalysts. *Accounts Chem Res* 2015, 48 (6), 1696-1702.
57. Vasseur, A.; Bruffaerts, J.; Marek, I., Remote functionalization through alkene isomerization. *Nat Chem* 2016, 8 (3), 209-219.
58. Liu, X. F.; Li, B.; Liu, Q., Base-Metal-Catalyzed Olefin Isomerization Reactions. *Synthesis-Stuttgart* 2019, 51 (6), 1293-1310.
59. Grotjahn, D. B.; Larsen, C. R.; Gustafson, J. L.; Nair, R.; Sharma, A., Extensive isomerization of alkenes using a bifunctional catalyst: An alkene zipper. *J Am Chem Soc* 2007, 129 (31), 9592-+.
60. Erdogan, G.; Grotjahn, D. B., Mild and Selective Deuteration and Isomerization of Alkenes by a Bifunctional Catalyst and Deuterium Oxide. *J Am Chem Soc* 2009, 131 (30), 10354-+.
61. Lim, H. J.; Smith, C. R.; RajanBabu, T. V., Facile Pd(II)—and Ni(II)-Catalyzed Isomerization of Terminal Alkenes into 2-Alkenes. *Journal of Organic Chemistry* 2009, 74 (12), 4565-4572.
62. Scarso, A.; Colladon, M.; Sgarbossa, P.; Santo, C.; Michelin, R. A.; Strukul, G., Highly Active and Selective Platinum (II)-Catalyzed Isomerization of Allylbenzenes: Efficient Access to (E)-Anethole and Other Fragrances via Unusual Agostic Intermediates. *Organometallics* 2010, 29 (6), 1487-1497.
63. Gauthier, D.; Lindhardt, A. T.; Olsen, E. P. K.; Overgaard, J.; Skrydstrup, T., In Situ Generated Bulky Palladium Hydride Complexes as Catalysts for the Efficient Isomerization of Olefins. Selective Transformation of Terminal Alkenes to 2-Alkenes. *J Am Chem Soc* 2010, 132 (23), 7998-8009.
64. Larsen, C. R.; Grotjahn, D. B., Stereoselective Alkene Isomerization over One Position. *J Am Chem Soc* 2012, 134 (25), 10357-10360.
65. Clark, J. R.; Griffiths, J. R.; Diver, S. T., Ruthenium Hydride-Promoted Dienyl Isomerization: Access to Highly Substituted 1,3-Dienes. *J Am Chem Soc* 2013, 135 (9), 3327-3330.
66. Zhuo, L. G.; Yao, Z. K.; Yu, Z. X., Synthesis of Z-Alkenes from Rh(I)-Catalyzed Olefin Isomerization of beta, gamma-Unsaturated Ketones. *Org Lett* 2013, 15 (18), 4634-4637.
67. Larionov, E.; Lin, L. Q.; Guenee, L.; Mazet, C., Scope and Mechanism in Palladium-Catalyzed Isomerizations of Highly Substituted Allylic, Homoallylic, and Alkenyl Alcohols. *J Am Chem Soc* 2014, 136 (48), 16882-16894.

68. Larsen, C. R.; Erdogan, G.; Grotjahn, D. B., General Catalyst Control of the Monoisomerization of 1-Alkenes to trans-2-Alkenes. *J Am Chem Soc* 2014, 136 (4), 1226-1229.

69. Lin, L. Q.; Romano, C.; Mazet, C., Palladium-Catalyzed Long-Range Deconjugative Isomerization of Highly Substituted alpha, beta-Unsaturated Carbonyl Compounds. *J Am Chem Soc* 2016, 138 (32), 10344-10350.

70. Wang, Y. L.; Qin, C.; Jia, X. Q.; Leng, X. B.; Huang, Z., An Agostic Iridium Pincer Complex as a Highly Efficient and Selective Catalyst for Monoisomerization of 1-Alkenes to trans-2-Alkenes. *Angew Chem Int Edit* 2017, 56 (6), 1614-1618.

71. Huang, R. Z.; Lau, K. K.; Li, Z. F.; Liu, T. L.; Zhao, Y., Rhodium-Catalyzed Enantioconvergent Isomerization of Homoallylic and Bishomoallylic Secondary Alcohols. *J Am Chem Soc* 2018, 140 (44), 14647-14654.

72. Chen, C.; Dugan, T. R.; Brennessel, W. W.; Weix, D. J.; Holland, P. L., Z-Selective Alkene Isomerization by High-Spin Cobalt (II) Complexes. *J Am Chem Soc* 2014, 136 (3), 945-955.

73. Crossley, S. W. M.; Barabe, F.; Shenvi, R. A., Simple, Chemoselective, Catalytic Olefin Isomerization. J Am Chem Soc 2014, 136 (48), 16788-16791.

74. Schmidt, A.; Nodling, A. R.; Hilt, G., An Alternative Mechanism for the Cobalt-Catalyzed Isomerization of Terminal Alkenes to (Z)-2-Alkenes. *Angew Chem Int Edit* 2015, 54 (3), 801-804.

75. Li, G.; Kuo, J. L.; Han, A.; Abuyuan, J. M.; Young, L. C.; Norton, J. R.; Palmer, J. H., Radical Isomerization and Cycloisomerization Initiated by H center dot Transfer. *Journal of the American Chemical Society* 2016, 138 (24), 7698-7704.

76. Liu, X. F.; Zhang, W.; Wang, Y. J.; Zhang, Z. X.; Jiao, L.; Liu, Q., Cobalt-Catalyzed Regioselective Olefin Isomerization Under Kinetic Control. *J Am Chem Soc* 2018, 140 (22), 6873-6882.

77. Zhang, S.; Findlater, M., Cobalt catalyzed isomerization of alkenes. Synthesis 2021.

78. Tamang, S. R.; Bedi, D.; Shafiei-Haghighi, S.; Smith, C. R.; Crawford, C.; Findlater, M., Cobalt-Catalyzed Hydroboration of Alkenes, Aldehydes, and Ketones. *Org Lett* 2018, 20 (21), 6695-6700.

79. Tamang, S. R.; Findlater, M., Iron Catalyzed Hydroboration of Aldehydes and Ketones. *Journal of Organic Chemistry* 2017, 82 (23), 12857-12862.

80. Tamang, S. R.; Singh, A.; Unruh, D. K.; Findlater, M., Nickel-Catalyzed Regioselective 1,4-Hydroboration of N-Heteroarenes. *Acs Catal* 2018, 8 (7), 6186-6191.

81. Wekesa, F. S.; Arias-Ugarte, R.; Kong, L.; Sumner, Z.; McGovern, G. P.; Findlater, M., Iron-Catalyzed Hydrosilylation of Aldehydes and Ketones under Solvent-Free Conditions. *Organometallics* 2015, 34 (20), 5051-5056.

82. Zhang, S.; Bedi, D.; Cheng, L. U.; Unruh, D. K.; Li, G.; Findlater, M., Cobalt (II)-Catalyzed Stereoselective Olefin Isomerization: Facile Access to Acyclic Trisubstituted Alkenes. *Journal of the American Chemical Society* 2020.

83. Bart, S. C.; Lobkovsky, E.; Chirik, P. J., Preparation and molecular and electronic structures of iron (0) dinitrogen and silane complexes and their application to catalytic hydrogenation and hydrosilation. *J Am Chem Soc* 2004, 126 (42), 13794-807.

84. Chen, C.; Hecht, M. B.; Kavara, A.; Brennessel, W. W.; Mercado, B. Q.; Weix, D. J.; Holland, P. L., Rapid, Regioconvergent, Solvent-Free Alkene Hydrosilylation with a Cobalt Catalyst. *J Am Chem Soc* 2015, 137 (41), 13244-7.

85. Yu, X.; Zhao, H.; Li, P.; Koh, M. J., Iron-Catalyzed Tunable and Site-Selective Olefin Transposition. *J Am Chem Soc* 2020.

86. Crossley, S. W.; Obradors, C.; Martinez, R. M.; Shenvi, R. A., Mn—, Fe—, and Co-Catalyzed Radical Hydrofunctionalizations of Olefins. *Chem Rev* 2016, 116 (15), 8912-9000.

87. Green, S. A.; Crossley, S. W. M.; Matos, J. L. M.; Vasquez-Cespedes, S.; Shevick, S. L.; Shenvi, R. A., The High Chemofidelity of Metal-Catalyzed Hydrogen Atom Transfer. *Acc Chem Res* 2018, 51 (11), 2628-2640.

88. Shi, S.; Kuo, J. L.; Chen, T.; Norton, J. R., Catalytic Cycloisomerization onto a Carbonyl Oxygen. *Org Lett* 2020, 22 (15), 6171-6176.

89. Zhang, S.; Liao, J.-S.; Unruh, D. K.; Li, G.; Findlater, M., Cobalt- and iron-catalyzed regiodivergent alkene hydrosilylations. *Organic Chemistry Frontiers* 2021.

What is claimed is:

1. A molecule of Formula I is a ligand (L):

Formula I

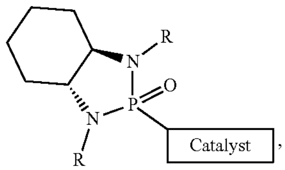

wherein R is selected from methyl, ethyl, propyl, isopropyl, butyl, cyclohexyl, fluoro, chloro, methoxy, ethoxy, butoxy, phenoxy, aryl, alkene, alkyne, and heterocyclic, wherein a catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

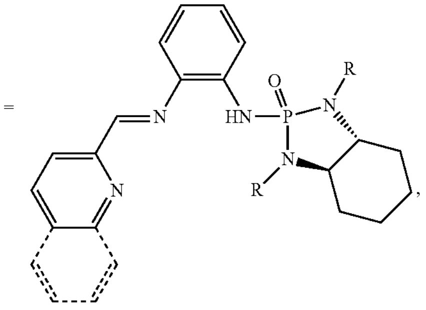

then R is not isopropyl.

2. The molecule of claim 1, the molecule of Formula I is compound 1:

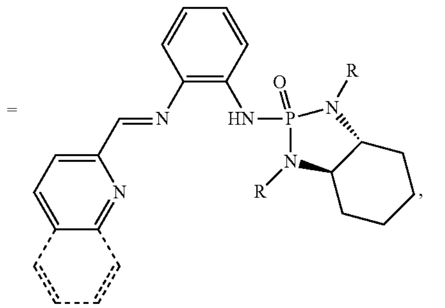

wherein R is not isopropyl that is synthesized by

Synthetic route to novel mGAP, tridentate-ligands

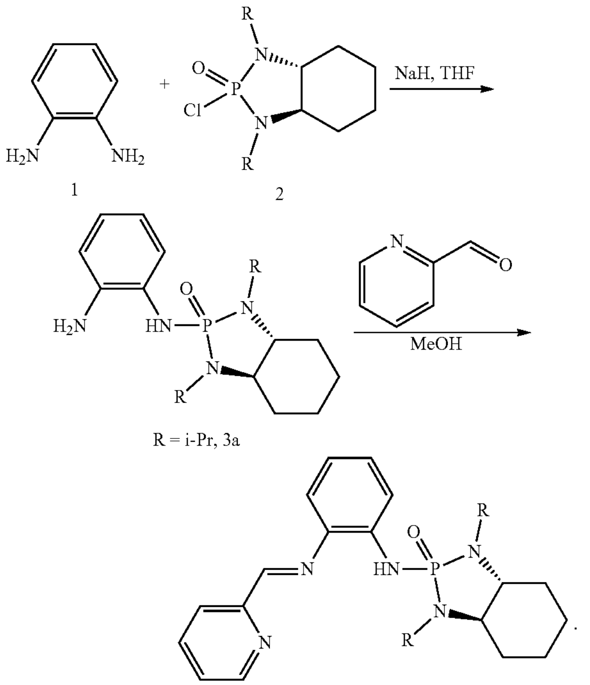

1 2

R = i-Pr, 3a

R

R = Bn, L2
R = p-OMeBn, L3
R = p-CF3Bn, L4
R = 2,4,6-MeBn, L5

3. The molecule of claim 2, the molecule of compound 1 is a ligand made by:

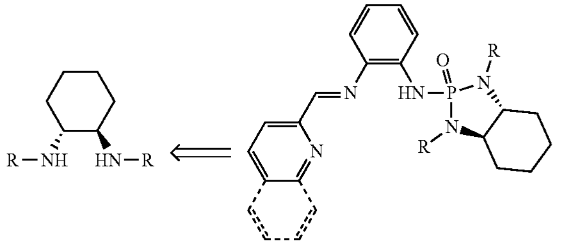

L

-continued

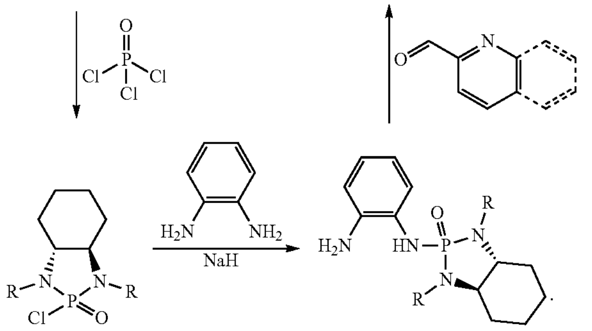

4. The molecule of claim 2, wherein the molecule of compound 1 has R selected from benzyl, O-methylbenzyl, trifluorobenzyl, or 2,4,6-methyl benzyl.

5. The molecule of claim 1, wherein the molecule of Formula I recycles one or more transition metals selected from at least one of: $1^{st}$-row transition metals, $2^{nd}$-row transition metals, $3^{rd}$-row transition metals, main group metals, lanthanide series transition metals, and actinide series transition metals.

6. The molecule of claim 1, wherein the molecule of Formula I recycles one or more transition metals selected from at least one of: platinum, palladium, vanadium, manganese, iron, cobalt, nickel, copper, zinc, zirconium, ruthenium, iridium, rhodium, hafnium.

7. The molecule of claim 1, wherein a substrate/product is:

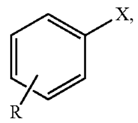

wherein R and X are selected from:

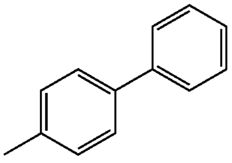

X = I, [99%], (92%)[a]
Br, [99%], (75%)[b]
Cl, [99%], (62%)[c]
OTf, [89%], (56%)[c]

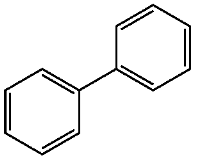 [SMILES: c1ccc(-c2ccccc2)cc1]

X = I, [99%], (94%)[a]
Br, [99%], (67%)[b]

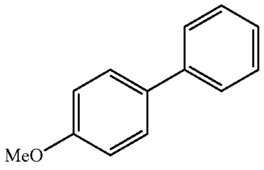 [SMILES: COc1ccc(-c2ccccc2)cc1]

X = I, [99%], (95%)[a]
Br, [99%], (86%)[b]
Cl, [99%], (73%)[c]

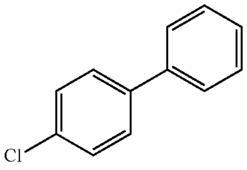 [SMILES: Clc1ccc(-c2ccccc2)cc1]

X = I, [99%], (87%)[a]

-continued
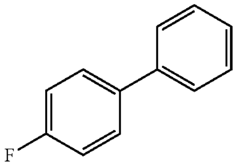 [SMILES: Fc1ccc(-c2ccccc2)cc1]
X = I, [99%], (85%)[a]
Br, [99%], (78%)[b]
Cl, [99%], (71%)[c]
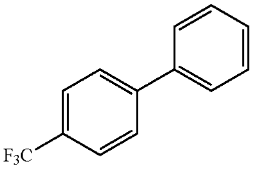 [SMILES: FC(F)(F)c1ccc(-c2ccccc2)cc1]
X = I, [99%], (78%)[a]
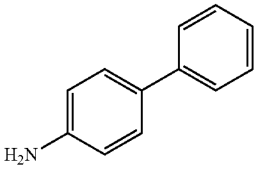
X = I, trace[a]
Cl, trace[c]
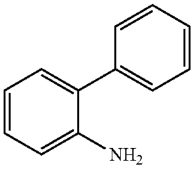 [SMILES: Nc1ccccc1-c1ccccc1]
X = I, trace[a]
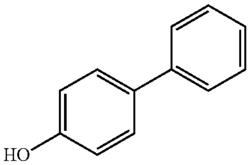 [SMILES: Oc1ccc(-c2ccccc2)cc1]
X = I, [99%], (56%)[b]
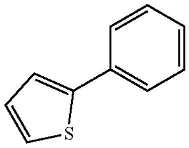 [SMILES: c1ccc(-c2cccs2)cc1]
X = I, [99%][a]
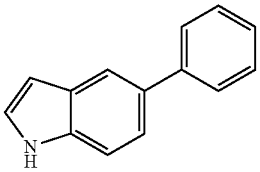 [SMILES: c1ccc(-c2ccc3[nH]ccc3c2)cc1]
X = I, trace[a]
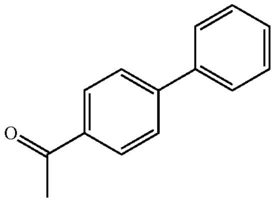
X = Br, [99%], (65%)[b]
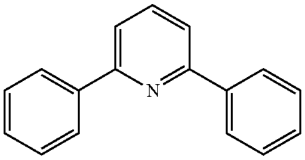 [SMILES: c1ccc(-c2cccc(-c3ccccc3)n2)cc1]
X = Br, [99%], (53%)[b]
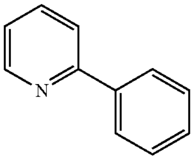 [SMILES: c1ccc(-c2ccccn2)cc1]
X = Br, [99%]
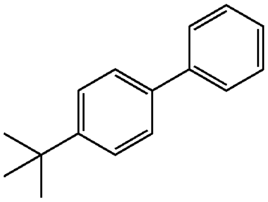 [SMILES: CC(C)(C)c1ccc(-c2ccccc2)cc1]
X = Br, [75%], (52%)[b]
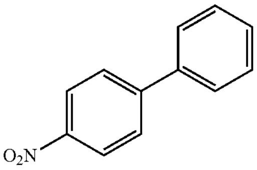 [SMILES: O=[N+]([O-])c1ccc(-c2ccccc2)cc1]
X = Cl, [99%], (68%)[c]
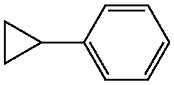
X = Br, N.R.
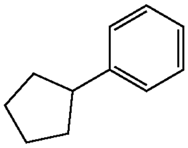 [SMILES: c1ccc(C2CCCC2)cc1]
X = Br, N.R.
-continued
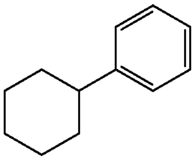 [SMILES: c1ccc(C2CCCCC2)cc1]
X = Br, N.R.
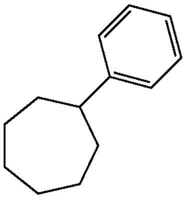
X = Br, N.R.
; or
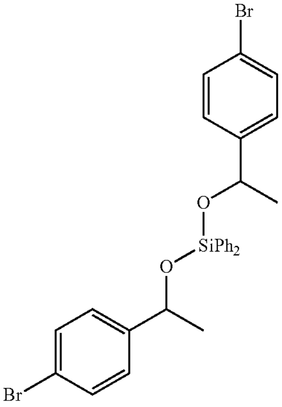
2b
90%
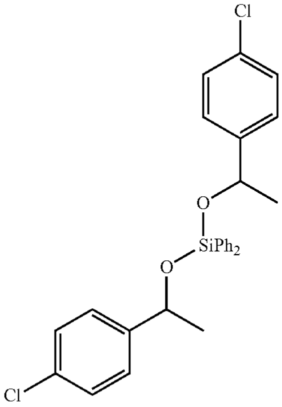
2c
92%
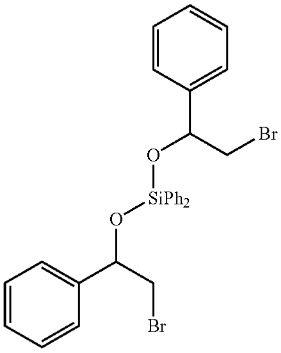
2d
68%
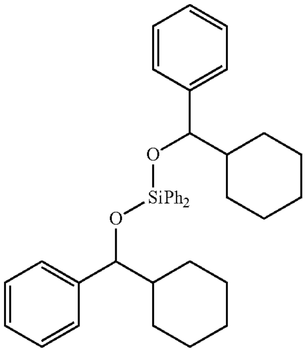
2e
88%
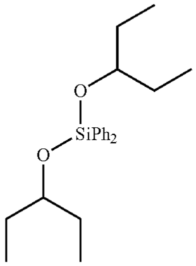
2f
91%

-continued

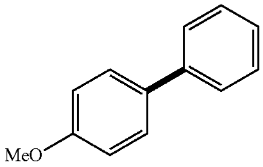

4b (95%)

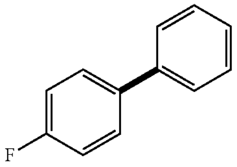

4c (85%)

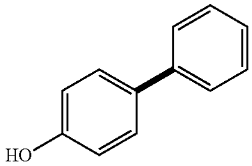

4d (56%)

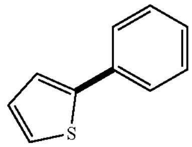

4e (99%)

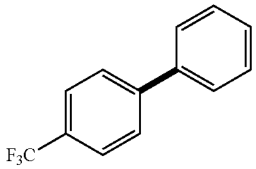

4f (78%)

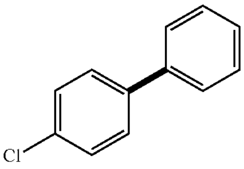

4g (87%)

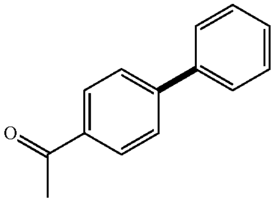

4h (56%)

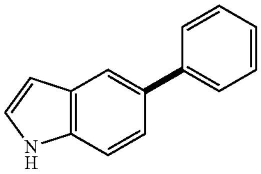

4i (trace)

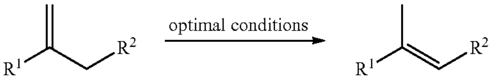

1

2
34 examples

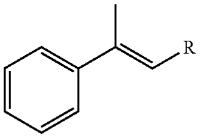

R = Me, 2a, 95% yield, E/Z = 107/1[a]
R = Et, 2b, 80% yield, E/Z = 28/1[a]
R = $^{n}$Pr, 2c, 84% yield, E/Z = 38/1[a]
R = Bn, 2d, 81% yield, E/Z = 35/1[b]

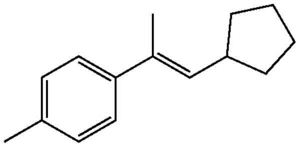

2e, 85% yield, E/Z = 130/1[b]

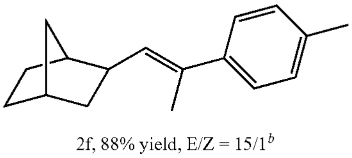

2f, 88% yield, E/Z = 15/1[b]

-continued

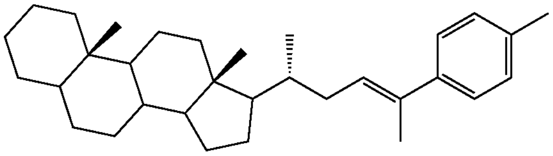

2g, 89% yield, E/Z = 24/1[c]

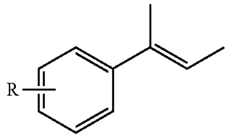

R = 4-Me, 2h, 89% yield, E/Z = 25/1[a]
R = 4-OMe, 2i, 87% yield, E/Z = 20/1[b]
R = 4-F, 2j, 83% yield, E/Z = 21/1[a]
R = 2,3-F, 2k, 85% yield, E/Z = 76/1[b]
R = 4-Cl, 2l, 93% yield, E/Z = 18/1[b]
R = 3-Cl, 2m, 96% yield, E/Z = 79/1[a]
R = 4-Br, 2n, 96% yield, E/Z = 14/1[b]

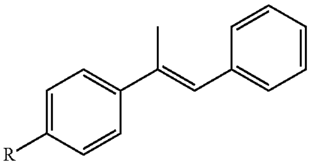

R = H, 2o, 97% yield, E/Z = 61/1[b]
R = Me, 2p, 96% yield, E/Z = 90/1[b]
R = $^{t}$Bu, 2q, 86% yield, E/Z = 78/1[b]
R = Ph, 2r, 91% yield, E/Z = 49/1[b]
R = OMe, 2s, 97% yield, E/Z = 53/1[b]
R = F, 2t, 90% yield, E/Z = 48/1[b]
R = Cl, 2u, 94% yield, E/Z = 21/1[b]

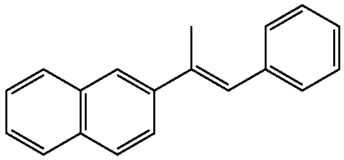

2v, 98% yield, E/Z = 107/1[b]

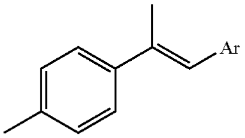

Ar = 1-Naphth, 2ad, 94% yield, E/Z = 48/1[b]
Ar = 2-Naphth, 2ae, 87% yield, E/Z = 87/1[b]

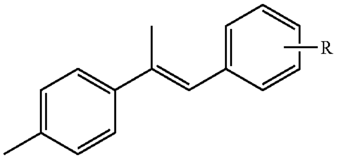

R = 4-Me, 2w, 81% yield, E/Z = 36/1[b]
R = 2-Me, 2x, 91% yield, E/Z = 111/1[b]
R = 3-Me, 2y, 95% yield, E/Z = 112/1[b]
R = 4-Ph, 2z, 91% yield, E/Z = 90/1[b]
R = 4-OMe, 2aa, 89% yield, E/Z = 71/1[b]
R = 4-F, 2ab, 90% yield, E/Z = 54/1[b]
R = 4-Cl, 2ac, 97% yield, E/Z = 58/1[b]

-continued

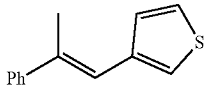

2af, 95% yield, E/Z = 33/1[c]

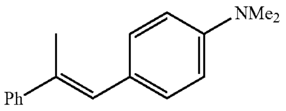

2ag, 76% yield, E/Z = 22/1[c]

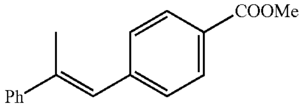

2ah
47% conversion, E/Z = 8/1[c]

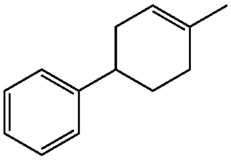

2ai, 90% yield[d]

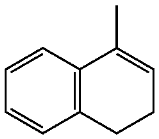

2aj, 95% yield[b]

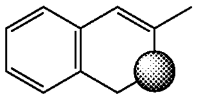

2ak, 85% yield, r.r. 29/1[b];

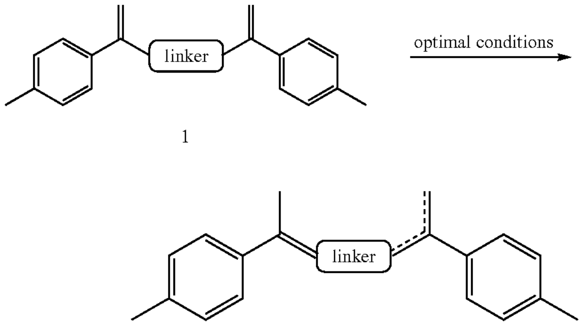

1

2
7 examples

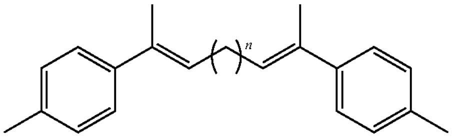

n = 8, 2al, 89% yield, E/Z = 65/1[a]
n = 2, 2am, 93%, E/Z = 34/1[a]
n = 1, 2an, 88% yield, E/Z = 26/1[a]
n = 0, 2ao, 96% yield, E/Z = 52/1[a]

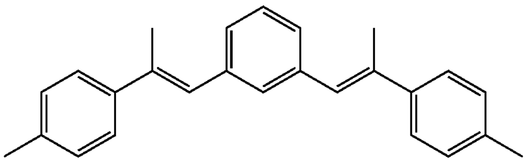

2ap
81% yield, E/Z = 52/1[b]

-continued

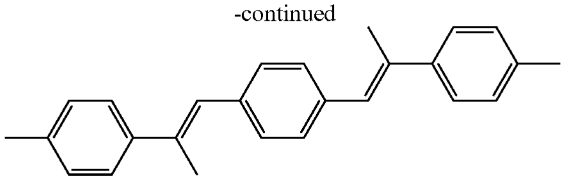

2aq
87% yield, E/Z = 16/1[b]

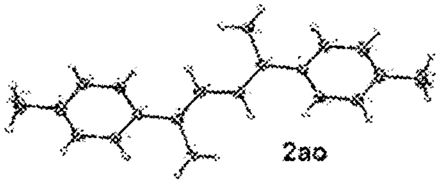

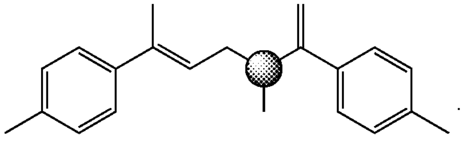

2ar
89% yield, E/Z = 52/1[a]

8. A method for recycling transition metal catalysis comprising:

combining reactants in a solvent in the presence of a molecule having the formula I is a ligand (L):

Formula I

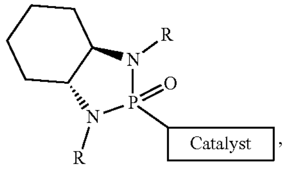

wherein R is selected from methyl, ethyl, propyl, isopropyl, butyl, cyclohexyl, fluoro, chloro, methoxy, ethoxy, butoxy, phenoxy, aryl, alkene, alkyne, and heterocyclic;

wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

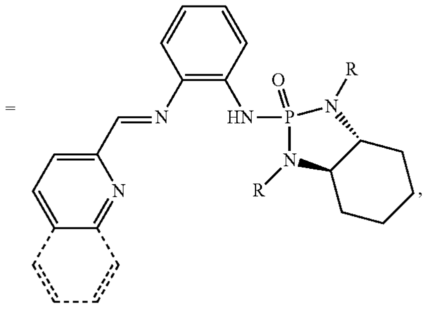

then R is not isopropyl;

under conditions that catalyze a reaction; and recycling the molecule of Formula I.

9. The method of claim 8, wherein the molecule of Formula I is:

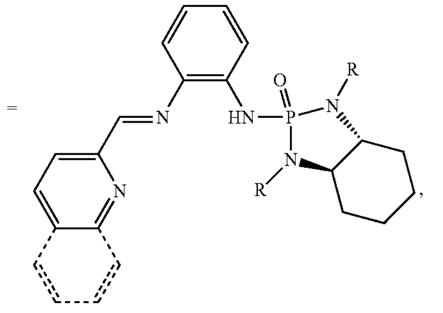

wherein R is not isopropyl that is synthesized by

Synthetic route to novel mGAP, tridentate-ligands

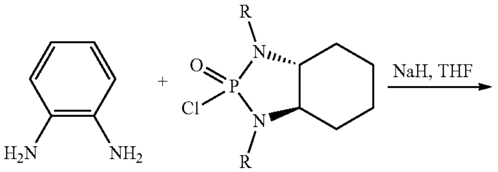

1 2

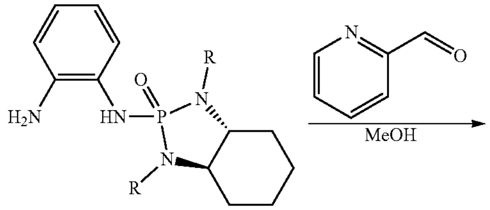

R = i-Pr, 3a

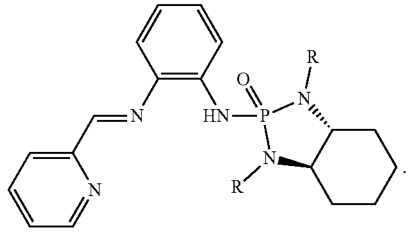

R = Bn, L2
R = p-OMeBn, L3
R = p-$CF_3$Bn, L4
R = 2,4,6-MeBn, L5

10. The method of claim 8, wherein the molecule of Formula I is converted into a recyclable catalyst by:

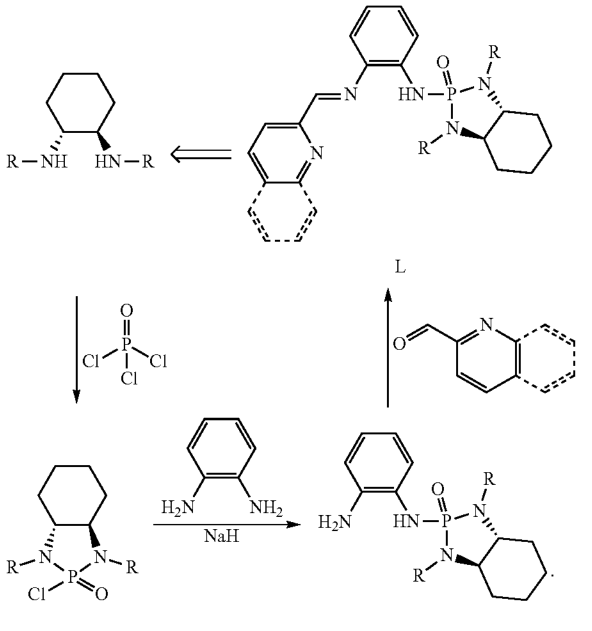

11. The method of claim 8, wherein R is selected from benzyl, O-methylbenzyl, trifluorobenzyl, or 2,4,6-methyl benzyl.

12. The method of claim 8, wherein the molecule of Formula I recycles transition metals selected from at least one of: 1$^{st}$-row transition metals, 2$^{nd}$-row transition metals, 3$^{rd}$-row transition metals, main group metals, lanthanide series transition metals, and actinide series transition metals.

13. The method of claim 8, wherein the molecule of Formula I recycles transition metals selected from at least one of: platinum, palladium, vanadium, manganese, iron, cobalt, nickel, copper, zinc, zirconium, ruthenium, iridium, rhodium, hafnium.

14. The method of claim 8, wherein a substrate/product is:

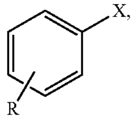

wherein R and X are selected from:

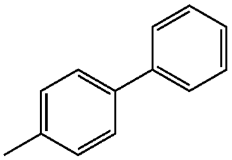

X = I, [99%], (92%)[a]
Br, [99%], (75%)[b]
Cl, [99%], (62%)[c]
OTf, [89%], (56%)[c]

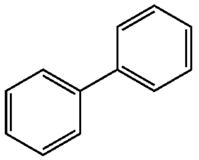

X = I, [99%], (94%)[a]
Br, [99%], (67%)[b]

-continued
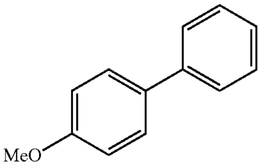
X = I, [99%], (95%)[a]
Br, [99%], (86%)[b]
Cl, [99%], (73%)[c]
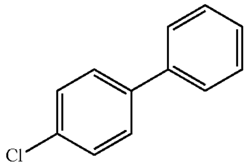
X = I, [99%], (87%)[a]
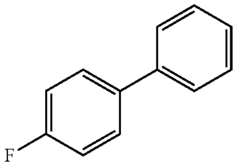
X = I, [99%], (85%)[a]
Br, [99%], (78%)[b]
Cl, [99%], (71%)[c]
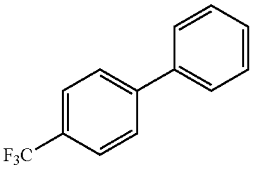
X = I, [99%], (78%)[a]
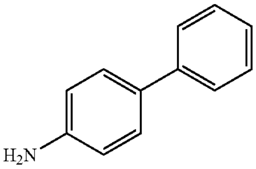
X = I, trace[a]
Cl, trace[c]
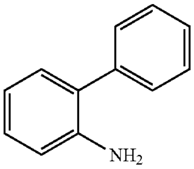
X = I, trace[a]
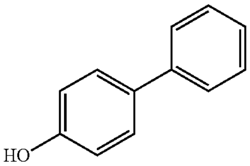
X = I, [99%], (56%)[b]
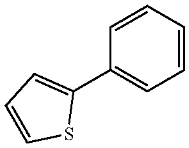
X = I, [99%][a]
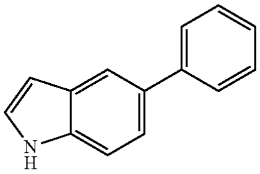
X = I, trace[a]
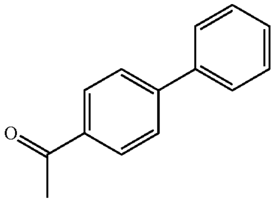
X = Br, [99%], (65%)[b]
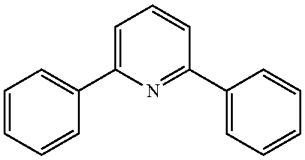
X = Br, [99%], (53%)[b]
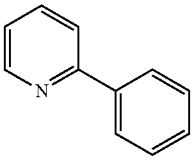
X = Br, [99%]
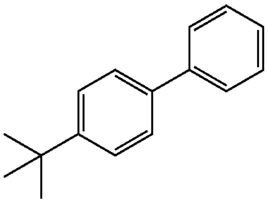
X = Br, [75%], (52%)[b]
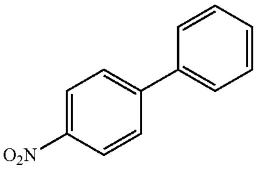
X = Cl, [99%], (68%)[c]
-continued
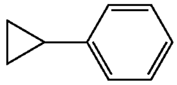
X = Br, N.R.
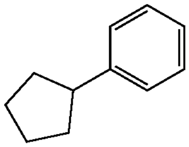
X = Br, N.R.
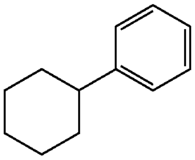
X = Br, N.R.
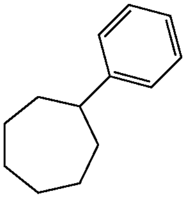
X = Br, N.R.
; or
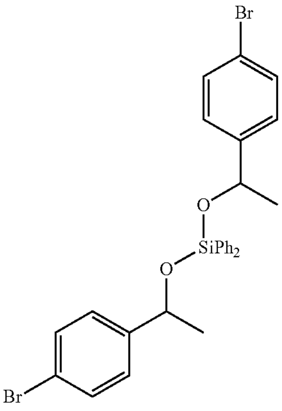
2b
90%
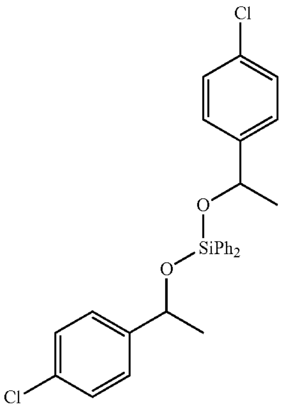
2c
92%
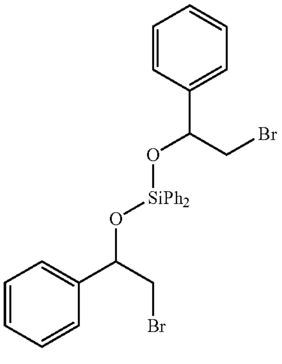
2d
68%
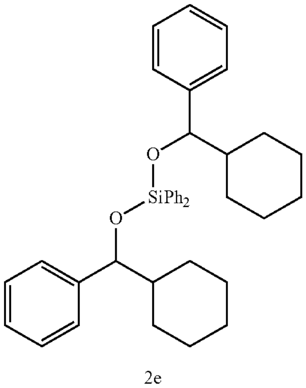
2e
88%
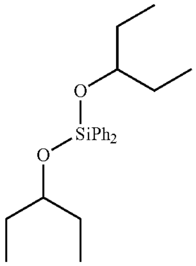
2f
91%

-continued

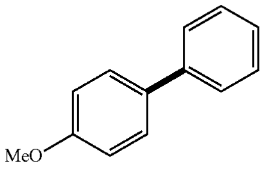

4b (95%)

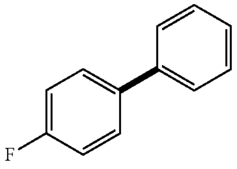

4c (85%)

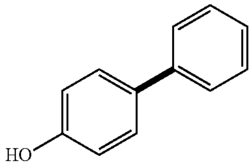

4d (56%)

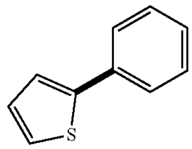

4e (99%)

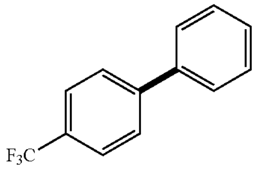

4f (78%)

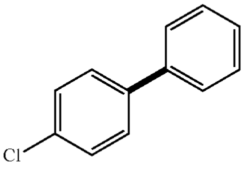

4g (87%)

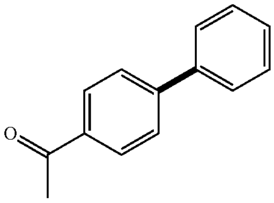

4h (56%)

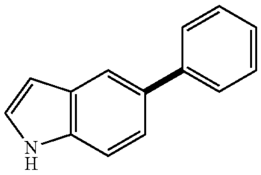

4i (trace)

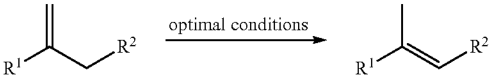

1

2
34 examples

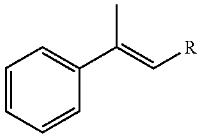

R = Me, 2a, 95% yield, E/Z = 107/1[a]
R = Et, 2b, 80% yield, E/Z = 28/1[a]
R = $^n$Pr, 2c, 84% yield, E/Z = 38/1[a]
R = Bn, 2d, 81% yield, E/Z = 35/1[b]

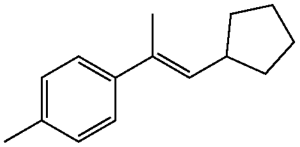

2e, 85% yield, E/Z = 130/1[b]

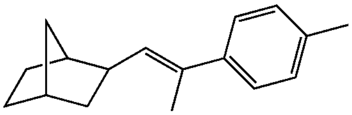

2f, 88% yield, E/Z = 15/1[b]

-continued

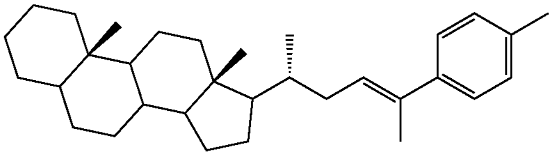

2g, 89% yield, E/Z = 24/1[c]

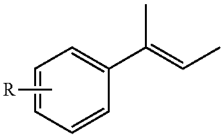

R = 4-Me, 2h, 89% yield, E/Z = 25/1[a]
R = 4-OMe, 2i, 87% yield, E/Z = 20/1[b]
R = 4-F, 2j, 83% yield, E/Z = 21/1[a]
R = 2,3-F, 2k, 85% yield, E/Z = 76/1[b]
R = 4-Cl, 2l, 93% yield, E/Z = 18/1[b]
R = 3-Cl, 2m, 96% yield, E/Z = 79/1[a]
R = 4-Br, 2n, 96% yield, E/Z = 14/1[b]

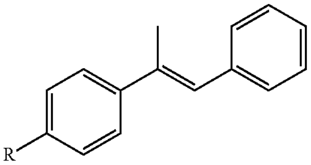

R = H, 2o, 97% yield, E/Z = 61/1[b]
R = Me, 2p, 96% yield, E/Z = 90/1[b]
R = $^t$Bu, 2q, 86% yield, E/Z = 78/1[b]
R = Ph, 2r, 91% yield, E/Z = 49/1[b]
R = OMe, 2s, 97% yield, E/Z = 53/1[b]
R = F, 2t, 90% yield, E/Z = 48/1[b]
R = Cl, 2u, 94% yield, E/Z = 21/1[b]

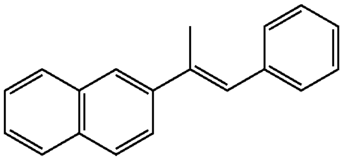

2v, 98% yield, E/Z = 107/1[b]

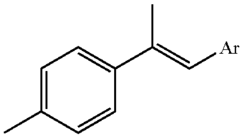

Ar = 1-Naphth, 2ad, 94% yield, E/Z = 48/1[b]
Ar = 2-Naphth, 2ae, 87% yield, E/Z = 87/1[b]

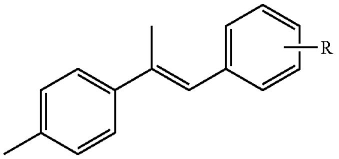

R = 4-Me, 2w, 81% yield, E/Z = 36/1[b]
R = 2-Me, 2x, 91% yield, E/Z = 111/1[b]
R = 3-Me, 2y, 95% yield, E/Z = 112/1[b]
R = 4-Ph, 2z, 91% yield, E/Z = 90/1[b]
R = 4-OMe, 2aa, 89% yield, E/Z = 71/1[b]
R = 4-F, 2ab, 90% yield, E/Z = 54/1[b]
R = 4-Cl, 2ac, 97% yield, E/Z = 58/1[b]

-continued

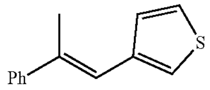

2af, 95% yield, E/Z = 33/1[c]

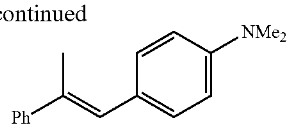

2ag, 76% yield, E/Z = 22/1[c]

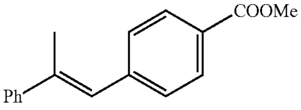

2ah

47% conversion, E/Z = 8/1[c]

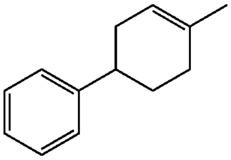

2ai, 90% yield[d]

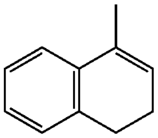

2aj, 95% yield[b]

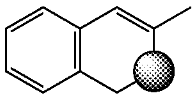

2ak, 85% yield, r.r. 29/1[b];

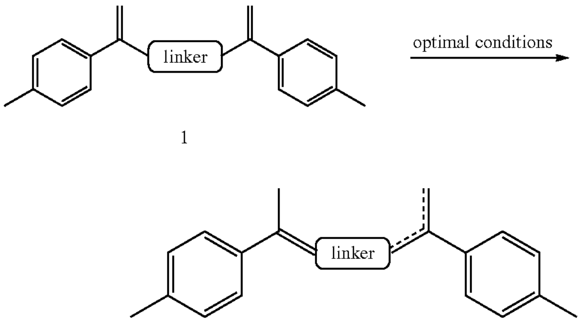

1

2

7 examples

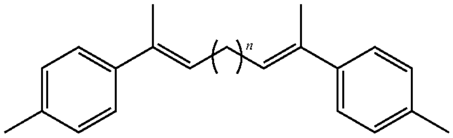

n = 8, 2al, 89% yield, E/Z = 65/1[a]

n = 2, 2am, 93%, E/Z = 34/1[a]

n = 1, 2an, 88% yield, E/Z = 26/1[a]

n = 0, 2ao, 96% yield, E/Z = 52/1[a]

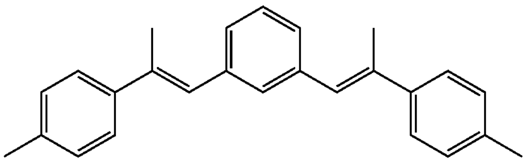

2ap

81% yield, E/Z = 52/1[b]

-continued

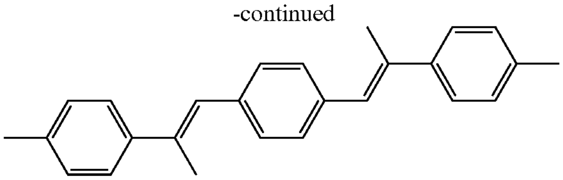

2aq

87% yield, E/Z = 16/1[b]

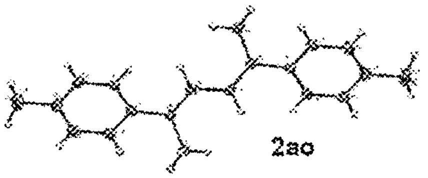

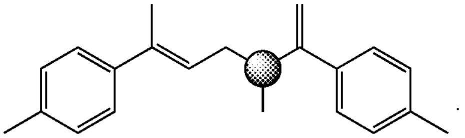

2ar

89% yield, E/Z = 52/1[a]

15. The method of claim 8, wherein the reaction is an isomerization reaction, a hydrosilylation reaction, a Suzuki-Miyaura coupling, a Negishi coupling, a Sonogashira coupling or a Heck coupling.

16. A tunable tridentate ligand for recyclable homogeneous transition metal catalyst comprising a molecule of Formula I is a ligand (L):

Formula I

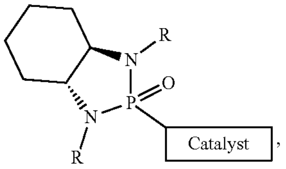

wherein R is selected from methyl, ethyl, propyl, isopropyl, butyl, cyclohexyl, fluoro, chloro, methoxy, ethoxy, butoxy, phenoxy, aryl, alkene, alkyne, and heterocyclic;

wherein the catalyst is selected for an isomerization reaction catalyst, a hydrosilylation reaction catalyst, a Suzuki-Miyaura coupling catalyst, a Negishi coupling catalyst, a Sonogashira coupling catalyst or a Heck coupling catalyst; and wherein if the molecule is:

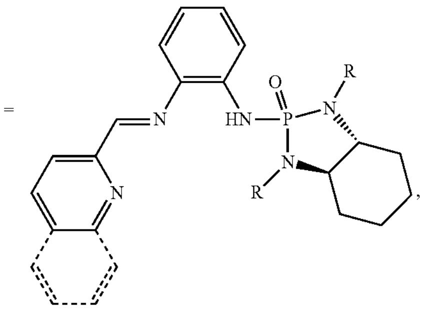

then R is not isopropyl.

17. The tunable tridentate ligand of claim 16, wherein the molecule of Formula I is

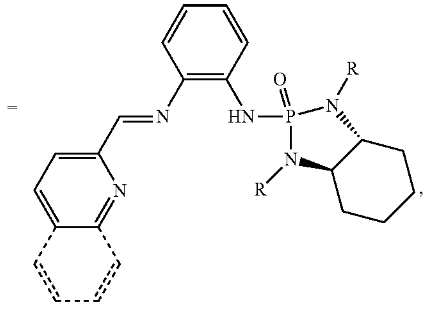

wherein R is not isopropyl that is, and is synthesized by:

Synthetic route to novel mGAP, tridentate-ligands

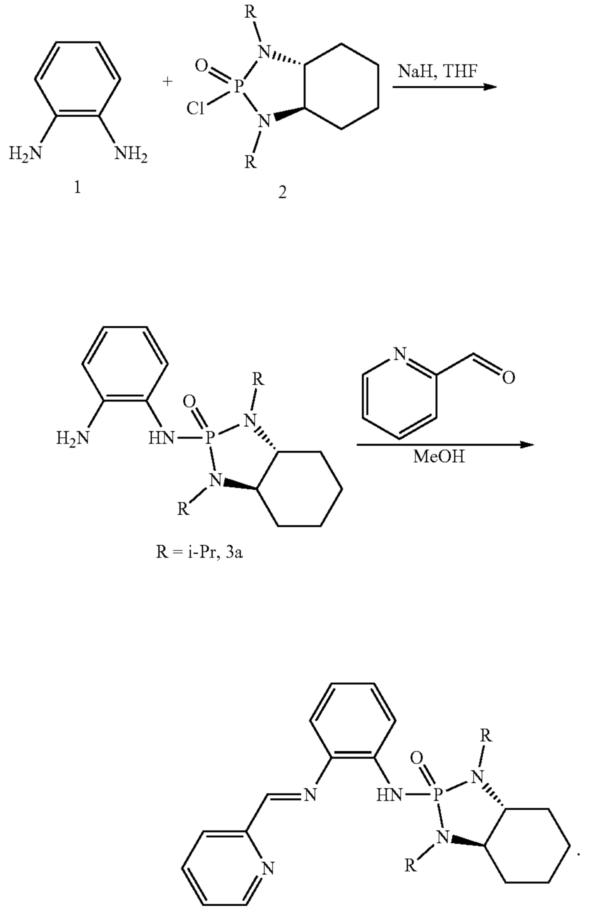

1 2

R = i-Pr, 3a

| | |
|---|---|
| R = i-Pr, | L1 |
| R = Bn, | L2 |
| R = p-OMeBn, | L3 |
| R = p-$CF_3$Bn, | L4 |
| R = 2,4,6-MeBn, | L5 |

18. The tunable tridentate ligand of claim 17, wherein the molecule of Formula I is converted into a recyclable catalyst by:

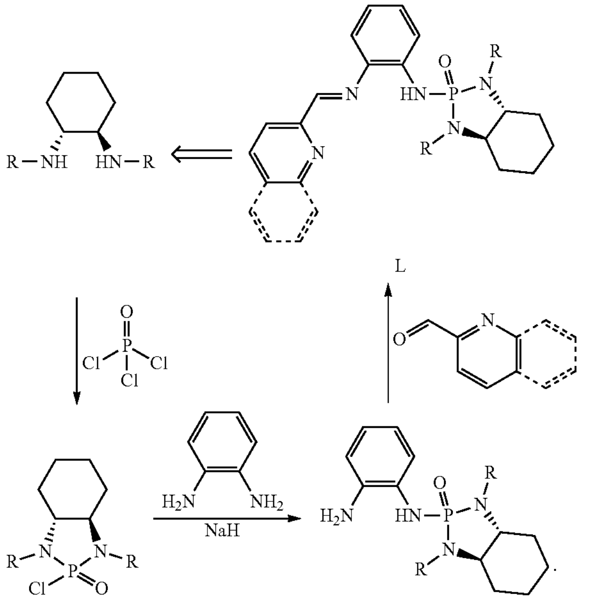

19. The tunable tridentate ligand of claim 16, wherein R is selected from benzyl, O-methylbenzyl, trifluorobenzyl, or 2,4,6-methyl benzyl.

20. The tunable tridentate ligand of claim 16, wherein the molecule of Formula I recycles transition metals selected from at least one of: $1^{st}$-row transition metals, $2^{nd}$-row transition metals, $3^{rd}$-row transition metals, main group metals, lanthanide series transition metals, and actinide series transition metals.

21. The tunable tridentate ligand of claim 16, wherein the molecule of Formula I recycles transition metals selected from at least one of: platinum, palladium, vanadium, manganese, iron, cobalt, nickel, copper, zinc, zirconium, ruthenium, iridium, rhodium, hafnium.

22. The tunable tridentate ligand of claim 16, wherein a substrate/product is:

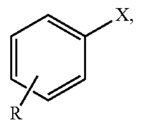

wherein R and X are selected from:

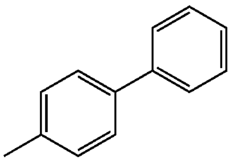

X = I, [99%], (92%)[a]
Br, [99%], (75%)[b]
Cl, [99%], (62%)[c]
OTf, [89%], (56%)[c]

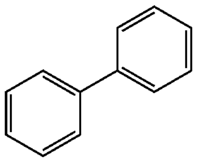

X = I, [99%], (94%)[a]
Br, [99%], (67%)[b]

-continued
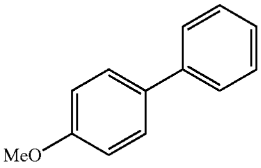
X = I, [99%], (95%)[a]
Br, [99%], (86%)[b]
Cl, [99%], (73%)[c]
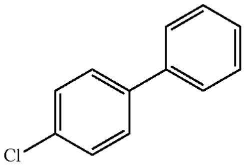
X = I, [99%], (87%)[a]
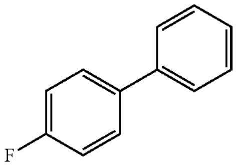
X = I, [99%], (85%)[a]
Br, [99%], (78%)[b]
Cl, [99%], (71%)[c]
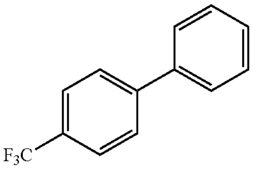
X = I, [99%], (78%)[a]
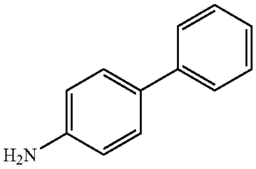
X = I, trace[a]
Cl, trace[c]
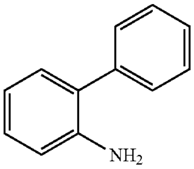
X = I, trace[a]
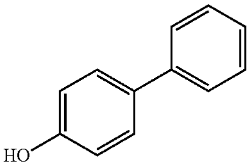
X = I, [99%], (56%)[b]
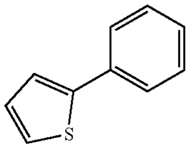
X = I, [99%][a]
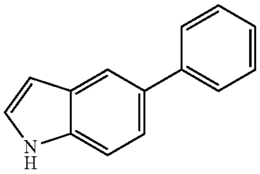
X = I, trace[a]
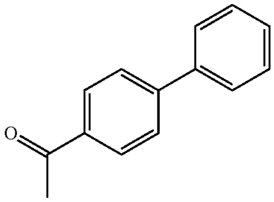
X = Br, [99%], (65%)[b]
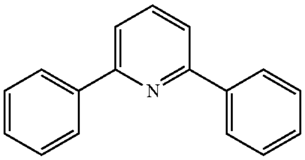
X = Br, [99%], (53%)[b]
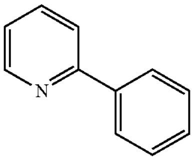
X = Br, [99%]
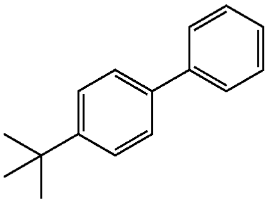
X = Br, [75%], (52%)[b]
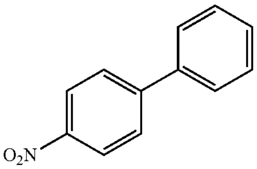
X = Cl, [99%], (68%)[c]
-continued
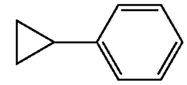
X = Br, N.R.
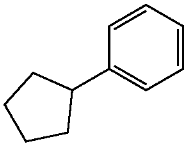
X = Br, N.R.
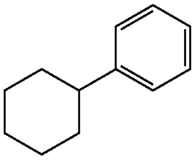
X = Br, N.R.
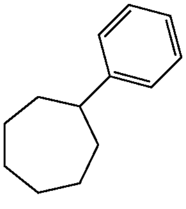
X = Br, N.R.
; or
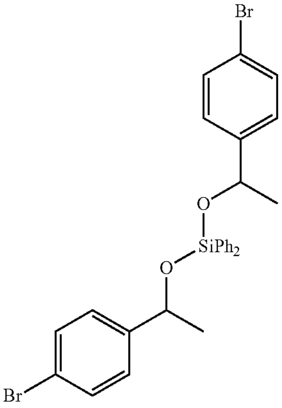
2b
90%
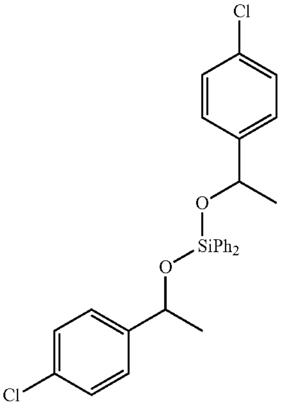
2c
92%
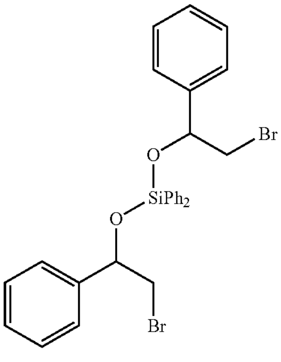
2d
68%
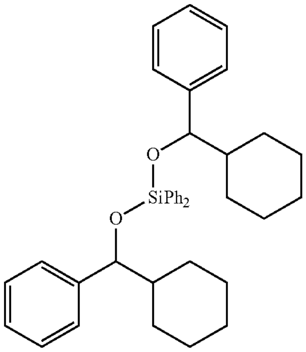
2e
88%
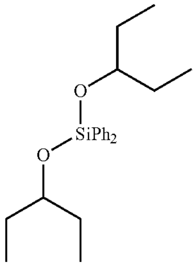
2f
91%

-continued

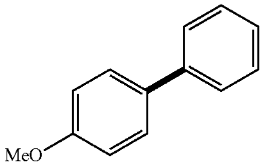

4b (95%)

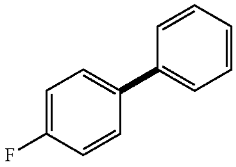

4c (85%)

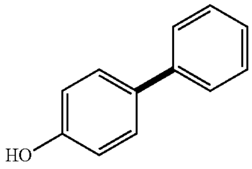

4d (56%)

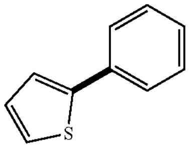

4e (99%)

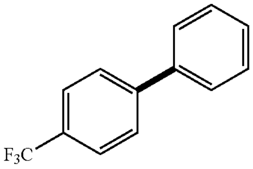

4f (78%)

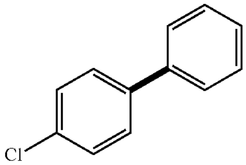

4g (87%)

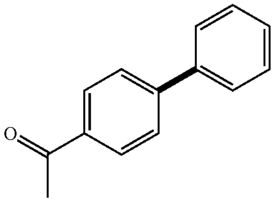

4h (56%)

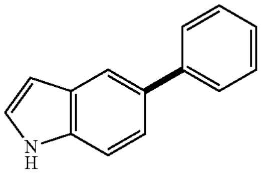

4i (trace)

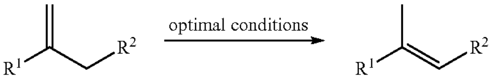

1

2
34 examples

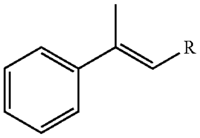

R = Me, 2a, 95% yield, E/Z = 107/1[a]
R = Et, 2b, 80% yield, E/Z = 28/1[a]
R = $^{n}$-Pr, 2c, 84% yield, E/Z = 38/1[a]
R = Bn, 2d, 81% yield, E/Z = 35/1[b]

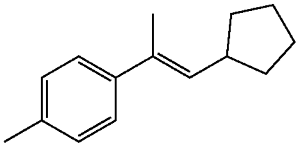

2e, 85% yield, E/Z = 130/1[b]

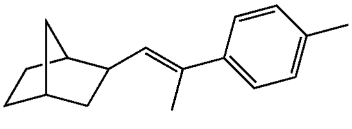

2f, 88% yield, E/Z = 15/1[b]

-continued

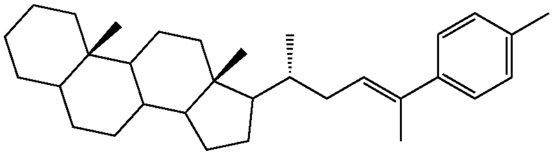

2g, 89% yield, E/Z = 24/1[c]

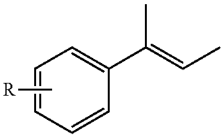

R = 4-Me, 2h, 89% yield, E/Z = 25/1[a]
R = 4-OMe, 2i, 87% yield, E/Z = 20/1[b]
R = 4-F, 2j, 83% yield, E/Z = 21/1[a]
R = 2,3-F, 2k, 85% yield, E/Z = 76/1[b]
R = 4-Cl, 2l, 93% yield, E/Z = 18/1[b]
R = 3-Cl, 2m, 96% yield, E/Z = 79/1[a]
R = 4-Br, 2n, 96% yield, E/Z = 14/1[b]

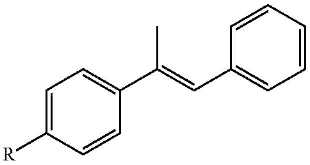

R = H, 2o, 97% yield, E/Z = 61/1[b]
R = Me, 2p, 96% yield, E/Z = 90/1[b]
R = $^{t}$Bu, 2q, 86% yield, E/Z = 78/1[b]
R = Ph, 2r, 91% yield, E/Z = 49/1[b]
R = OMe, 2s, 97% yield, E/Z = 53/1[b]
R = F, 2t, 90% yield, E/Z = 48/1[b]
R = Cl, 2u, 94% yield, E/Z = 21/1[b]

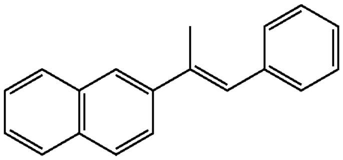

2v, 98% yield, E/Z = 107/1[b]

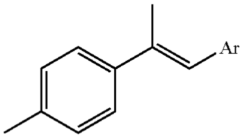

Ar = 1-Naphth, 2ad, 94% yield, E/Z = 48/1[b]
Ar = 2-Naphth, 2ae, 87% yield, E/Z = 87/1[b]

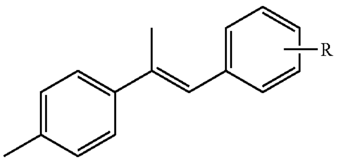

R = 4-Me, 2w, 81% yield, E/Z = 36/1[b]
R = 2-Me, 2x, 91% yield, E/Z = 111/1[b]
R = 3-Me, 2y, 95% yield, E/Z = 112/1[b]
R = 4-Ph, 2z, 91% yield, E/Z = 90/1[b]
R = 4-OMe, 2aa, 89% yield, E/Z = 71/1[b]
R = 4-F, 2ab, 90% yield, E/Z = 54/1[b]
R = 4-Cl, 2ac, 97% yield, E/Z = 58/1[b]

-continued
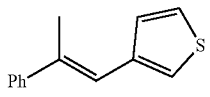
2af, 95% yield, E/Z = 33/1[c]
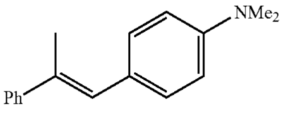
2ag, 76% yield, E/Z = 22/1[c]
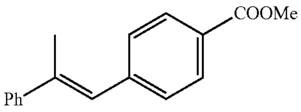
2ah
47% conversion, E/Z = 8/1[c]
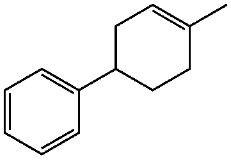
2ai, 90% yield[d]
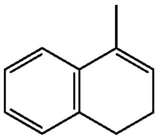
2aj, 95% yield[b]
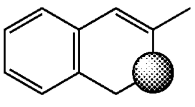
2ak, 85% yield, r.r. 29/1[b];
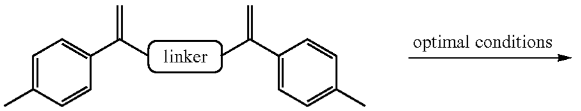
1
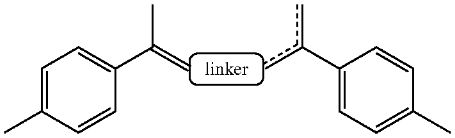
2
7 examples
-continued
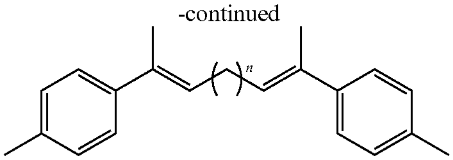
n = 8, 2al, 89% yield, E/Z = 65/1[a]
n = 2, 2am, 93%, E/Z = 34/1[a]
n = 1, 2an, 88% yield, E/Z = 26/1[a]
n = 0, 2ao, 96% yield, E/Z = 52/1[a]
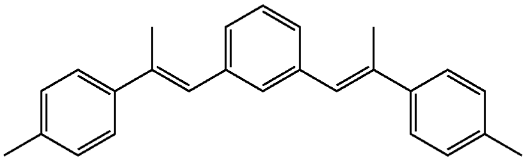
2ap
81% yield, E/Z = 52/1[b]
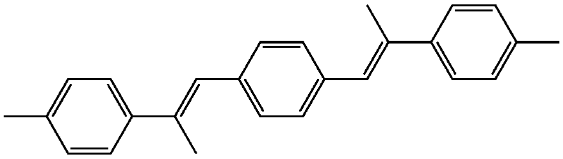
2aq
87% yield, E/Z = 16/1[b]
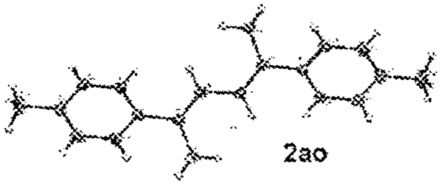
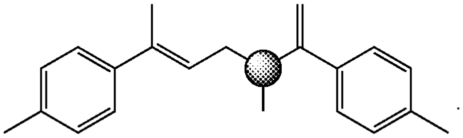
2ar
89% yield, E/Z = 52/1[a]
* * * * *